US008285332B2

(12) United States Patent
Kobayashi et al.

(10) Patent No.: US 8,285,332 B2
(45) Date of Patent: Oct. 9, 2012

(54) COMMUNICATION METHOD, TRANSMISSION APPARATUS AND RECEPTION APPARATUS

(75) Inventors: Kiyotaka Kobayashi, Tokyo (JP);
Yutaka Murakami, Kanagawa (JP);
Masayuki Orihashi, Chiba (JP);
Akihiko Matsuoka, Kanagawa (JP)

(73) Assignee: Panasonic Corporation, Osaka (JP)

( * ) Notice: Subject to any disclaimer, the term of this patent is extended or adjusted under 35 U.S.C. 154(b) by 699 days.

(21) Appl. No.: 11/613,245

(22) Filed: Dec. 20, 2006

(65) Prior Publication Data

US 2007/0087701 A1    Apr. 19, 2007

Related U.S. Application Data

(62) Division of application No. 10/516,936, filed as application No. PCT/JP03/15057 on Nov. 26, 2003, now Pat. No. 7,206,606.

(30) Foreign Application Priority Data

Nov. 26, 2002   (JP) ................. 2002-342019
Dec. 5, 2002    (JP) ................. 2002-354102
Jan. 16, 2003   (JP) ................. 2003-008002
Feb. 19, 2003   (JP) ................. 2003-041133
Mar. 20, 2003   (JP) ................. 2003-078037

(51) Int. Cl.
*H04M 11/00* (2006.01)

(52) U.S. Cl. ............... 455/562.1; 455/67.11; 455/67.13; 455/69; 455/101; 375/267; 370/332; 370/334

(58) Field of Classification Search .................. 455/101, 455/450, 454, 562.1, 452.2, 422.1, 67.11, 455/67.13, 69; 370/332, 338, 334; 375/267
See application file for complete search history.

(56) References Cited

U.S. PATENT DOCUMENTS

| 5,329,555 | A | 7/1994 | Marko et al. |
| 5,440,590 | A | 8/1995 | Birchler et al. |
| 5,999,826 | A | 12/1999 | Whinnett |
| 6,317,466 | B1 | 11/2001 | Foschini et al. |
| 6,351,499 | B1 | 2/2002 | Paulraj et al. |
| 6,369,758 | B1 | 4/2002 | Zhang |
| 6,473,467 | B1 | 10/2002 | Wallace et al. |
| 6,542,736 | B1 * | 4/2003 | Parkvall et al. ............ 455/452.2 |
| 6,628,733 | B1 | 9/2003 | Tomiyoshi et al. |
| 6,636,568 | B2 | 10/2003 | Kadous |

(Continued)

FOREIGN PATENT DOCUMENTS

EP          0807989          11/1997

(Continued)

OTHER PUBLICATIONS

English Language Abstract of JP 2001-237751.

(Continued)

*Primary Examiner* — Kamran Afshar
*Assistant Examiner* — Khalid Shaheed
(74) *Attorney, Agent, or Firm* — Greenblum & Bernstein, P.L.C.

(57) ABSTRACT

A communication method in a communication terminal apparatus includes at least one antenna and performs wireless communication with a base station apparatus including a plurality of transmission antennas. The method includes receiving a signal transmitted from the base station apparatus using the antenna and transmitting a feedback signal regarding transmission antenna selection at the base station apparatus, to the base station apparatus using the antenna.

15 Claims, 44 Drawing Sheets

U.S. PATENT DOCUMENTS

| | | |
|---|---|---|
| 6,683,916 B1 | 1/2004 | Sartori et al. |
| 6,771,706 B2 | 8/2004 | Ling et al. |
| 6,801,790 B2 | 10/2004 | Rudrapatna |
| 6,862,271 B2 | 3/2005 | Medvedev et al. |
| 6,934,320 B2 | 8/2005 | Tujkovic et al. |
| 7,006,848 B2 | 2/2006 | Ling et al. |
| 7,050,776 B2 | 5/2006 | Kim et al. |
| 7,079,514 B2 | 7/2006 | Kim et al. |
| 7,142,864 B2 * | 11/2006 | Laroia et al. ............... 455/450 |
| 7,403,748 B1 | 7/2008 | Keskitalo et al. |
| 2001/0004374 A1 | 6/2001 | Kono |
| 2002/0009156 A1 | 1/2002 | Hottinen et al. |
| 2002/0018530 A1 | 2/2002 | Kim et al. |
| 2002/0105961 A1 | 8/2002 | Hottinen et al. |
| 2003/0112880 A1 * | 6/2003 | Walton et al. ............... 375/260 |
| 2003/0123559 A1 | 7/2003 | Classon et al. |
| 2003/0125040 A1 * | 7/2003 | Walton et al. ............... 455/454 |
| 2003/0147458 A1 | 8/2003 | Hamied et al. |
| 2003/0148770 A1 * | 8/2003 | Das et al. .................... 455/455 |
| 2003/0162519 A1 | 8/2003 | Smith et al. |
| 2003/0185241 A1 | 10/2003 | Lu et al. |
| 2003/0228850 A1 * | 12/2003 | Hwang ......................... 455/101 |
| 2004/0042556 A1 | 3/2004 | Medvedev et al. |
| 2004/0120411 A1 | 6/2004 | Walton et al. |
| 2005/0085197 A1 * | 4/2005 | Laroia et al. ............... 455/101 |
| 2007/0087701 A1 * | 4/2007 | Kobayashi et al. ........ 455/101 |

FOREIGN PATENT DOCUMENTS

| | | |
|---|---|---|
| EP | 1175022 | 1/2002 |
| JP | 2001-237751 | 8/2001 |
| JP | 2003-244045 | 8/2003 |
| JP | 2003-318853 | 11/2003 |
| WO | 00/72464 | 11/2000 |
| WO | 01/78254 | 10/2001 |
| WO | 02/03568 | 1/2002 |

OTHER PUBLICATIONS

English Language Abstract of JP 2003-318853.

English Language Abstract of JP 2003-244045.

"Space-Time Block Codes from Orthogonal Designs", IEEE Transactions of Information Theory, vol. 45, No. 5, Jul. 1999, pp. 1456-1467.

"Space-Time Block Coding for Wireless Communications: Performance Results", IEEE Journal on Selected Areas in Communications, vol. 17, No. 3, Mar. 1999, pp. 451-460.

An article entitled "Guard Interval-cho Tekio Kahengata PDM-COFDM Hoshiki no Kento" by T. Sugiyama et al., Information and Communication Engineers 2002, Mar. 27-30, pp. 616.

An article entitled "Jikukan Block Fugo Gyoretsu O Mochiita Tekio Hencho" by T. Araida et al., Information and Communication Engineers Gijutsu Kenkyu Hokoku, Feb. 27, 2002, vol. 101, No. 676, pp. 31-36.

An article entitled "MIMO System in Okeru Koyuchi o Mochiita BER Tokusei no Kaiseki" by Y. Murakami et al., Information and Communication Engineers Gijutsu Kenkyu Hokoku, Mar. 19, 2003, vol. 102, No. 745, pp. 167-172.

Search report from E.P.O., mail date is May 26, 2011.

* cited by examiner

| | MODULATION SCHEME |
|---|---|
| $0 \leqq X < TH1$ | 16QAM |
| $TH1 \leqq X < TH2$ | QPSK |
| $TH2 \leqq X$ | BPSK |

FIG.6

COMMUNICATION METHOD, TRANSMISSION APPARATUS AND RECEPTION APPARATUS

CROSS-REFERENCE TO RELATED APPLICATION

The present application is a divisional application of pending U.S. patent application Ser. No. 10/516,936, filed on Dec. 14, 2004, which was a National Stage of International Application No. PCT/JP03/15057, filed Nov. 26, 2003, which claims priority based upon Japanese Application Nos. 2002-342019, filed Nov. 26, 2002, 2002-354102, filed Dec. 5, 2002, 2003-008002, filed Jan. 16, 2003, 2003-041133, filed Feb. 19, 2003 and 2003-078037, filed Mar. 20, 2003, the contents of which are expressly incorporated by reference herein in their entirety.

TECHNICAL FIELD

The present invention relates to a communication method, transmission apparatus and reception apparatus in a system where wireless communications is carried out using multi antennas in both transmission and reception.

BACKGROUND ART

In recent years, MIMO (Multiple-Input Multiple-Output) has received attention, as a system for implementing fast transmission using limited frequency bands effectively.

MIMO is a system where multi antennas is used in both transmission and reception, and independent signals are transmitted and received at the same time in the same band using multi eigenvectors. Using MIMO enables increases in transmission capacity without increasing the frequency band.

In this system, in order to improve the throughput, a transmission apparatus controls parameters of adaptive modulation processing and so on based on the reception electric field strength of the entire system estimated in a reception apparatus. For example, the transmission apparatus performs processing for increasing the modulation level of M-ary modulation when the reception electric field strength of the entire system is higher than a predetermined threshold. This is the same as in conventional MIMO.

However, there are cases that the reception electric field strength varies among channels in communications using multi channels, such as MIMO. When the adaptive modulation processing is performed based on the reception electric field strength of the entire system in MIMO, the modulation level is increased even when the reception electric field strength of a single channel is extremely larger than those of other channels. As a result, the reception quality deteriorates in a large number of channels with low reception electric field strength.

DISCLOSURE OF INVENTION

It is an object of the present invention to provide a communication method, transmission apparatus and reception apparatus enabling improved reception quality in a system where wireless communications is performed using multi antennas in both transmission and reception.

In the MIMO system, there is a case that a multiplexed signal cannot be demultiplexed completely due to a state of a channel matrix, and it is not possible to use part of the reception electric field strength of a reception signal in demodulating processing. Hereinafter, referred to as effective reception electric field strength is reception electric field strength which can be used in demodulation processing in a system such as the MIMO system where wireless communications is performed using multi antennas in both transmission and reception.

The above-mentioned object of the present invention is achieved by controlling parameters of a modulation scheme or the like based on the reception electric field strength of the entire system and the effective reception electric field strength.

BRIEF DESCRIPTION OF DRAWINGS

FIG. 6 is a view illustrating a table stored in internal memory of a modulation scheme control section of the base station apparatus according to Embodiment 1;

FIG. 15 is a view illustrating an example of frame structures of transmission signals of the base station apparatus according to Embodiment 7;

BEST MODE FOR CARRYING OUT THE INVENTION

Embodiments of the present invention will specifically be described below with reference to accompanying drawings.

In addition, each of following Embodiments describes the case where a base station apparatus transmits signals in MIMO, and a communication terminal apparatus receives the signals in MIMO.

Further, in each of following Embodiments, an OFDM (Orthogonal Frequency Division Multiplexing) system is used as an example of the multi-carrier system, and a CDMA (Code Division Multiple Access) system is used as an example of the single-carrier system.

Embodiment 1

Embodiment 1 describes the case where in multi-carrier communications using MIMO, a modulation scheme is controlled based on the reception electric field strength of the entire system and effective reception electric field strength.

Figure 1:
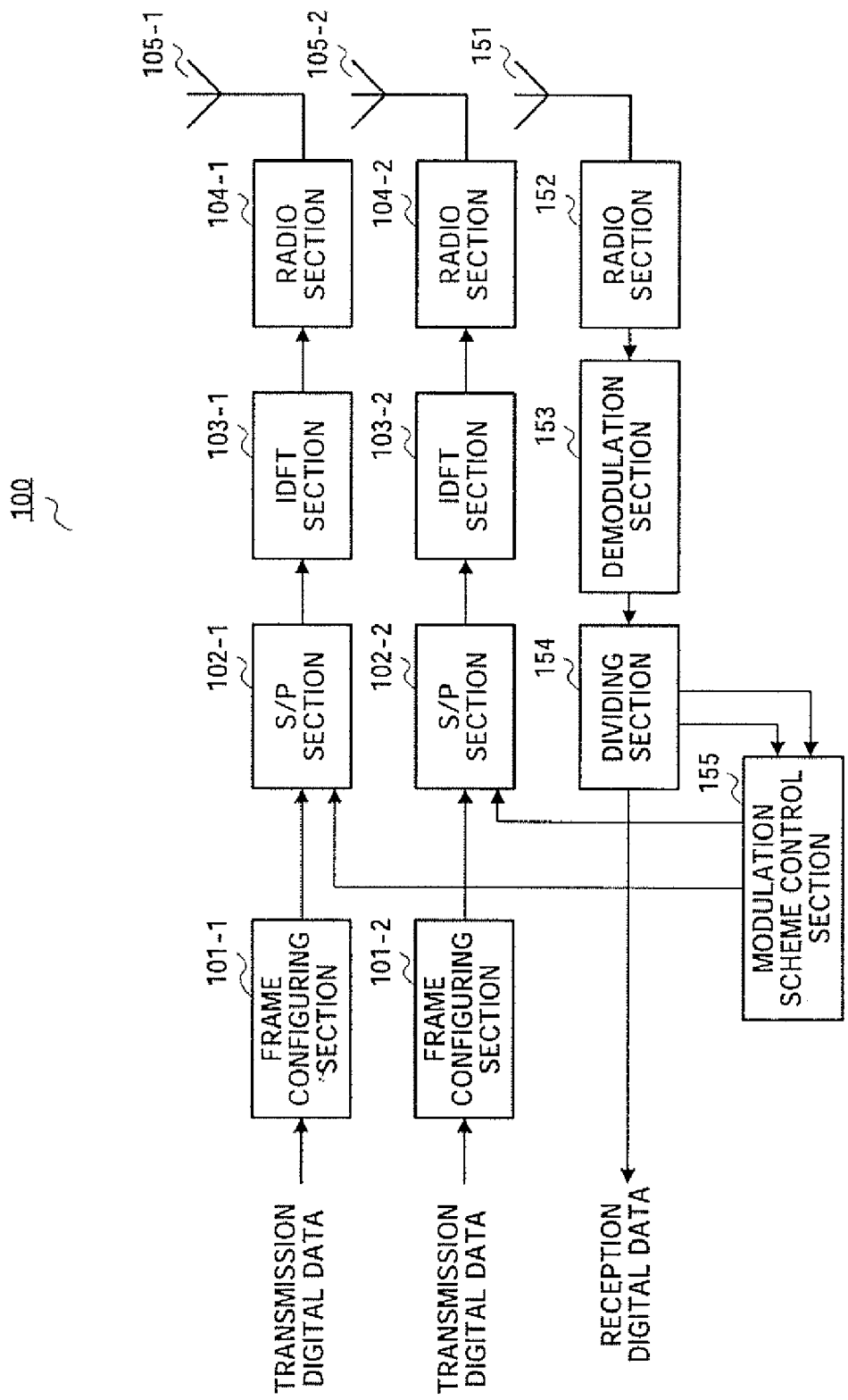
FIG. 1 is a block diagram illustrating a configuration of a base station apparatus according to Embodiment 1.

FIG. 1 is a block diagram illustrating a configuration of a base station apparatus according to Embodiment 1. In FIG. 1, base station apparatus 100 has, on the transmission side, frame configuring sections 101-1 and 101-2, S/P sections 102-1 and 102-2, IDFT sections 103-1 and 103-2, radio sections 104-1 and 104-2, and transmission antennas 105-1 and 105-2. Further, base station apparatus 100 has, on the reception side, reception antenna 151, radio section 152, demodulation section 153, dividing section 154 and modulation scheme control section 155.

Each of frame configuring sections 101-1 and 101-2 receives as its input transmission digital data, inserts a channel estimation symbol and guard symbol to the transmission digital data to generate a transmission digital signal, and outputs the signal to S/P section 102-1 or 102-2, respectively.

In addition, the channel estimation symbol is a symbol to estimate time synchronization, frequency synchronization and distortion due to the channel fluctuation, corresponds to a known symbol such as a pilot symbol, unique word and preamble, and suitably, is a BPSK (Binary Phase Shift Keying) modulated signal. Further, a null symbol is generally inserted as a guard symbol.

S/P section 102-1 receives the transmission digital signal, performs serial/parallel transform processing, further performs adaptive modulation processing according to an instruction from modulation scheme control section 155, and outputs parallel modulated signals to IDFT section 103-1 S/P section 102-2 receives the transmission digital signal, performs the serial/parallel transform processing, further performs the adaptive modulation processing according to the instruction from modulation scheme control section 155, and outputs parallel modulated signals to IDFT section 103-2. In addition, the adaptive modulation processing in S/P sections 102-1 and 102-2 will specifically be described below.

IDFT section 103-1 receives the parallel modulated signals, performs IDFT processing on the signals to generate a transmission baseband signal, and outputs the signal to radio section 104-1. IDFT section 103-2 receives the parallel modulated signals, performs the IDFT processing on the signals to generate a transmission baseband signal, and outputs the signal to radio section 104-2. IFFT (Inverse Fourier Transform) is generally used as the TDFT processing.

Radio section 104-1 receives the transmission baseband signal, upconverts the baseband signal to generate a transmission signal (hereinafter, referred to as a "transmission signal A", and transmits the radio signal from transmission antenna 105-1. Radio section 104-2 receives the transmission baseband signal, upconverts the baseband signal to generate a transmission signal (hereinafter, referred to as a "transmission signal B", and transmits the radio signal from transmission antenna 105-2.

Radio section 152 receives a received signal received in reception antenna 151, downconverts the signal to generate a reception baseband signal, and outputs the resultant to demodulation section 153.

Demodulation section 153 receives the reception baseband signal, demodulates the signal to generate a reception digital signal, and outputs the resultant to dividing section 154.

Dividing section 154 divides the reception digital signal into data symbols (reception digital data), an information symbol (hereinafter, referred to as a "first information symbol") indicative of the reception electric field strength of the entire system and another information symbol (hereinafter, referred to as a "second information symbol") indicative of the mean effective reception electric field strength, and outputs the first and second information symbols to modulation scheme control section 155.

Modulation scheme control section 155 receives the first and second information symbols, reads the reception electric field strength of the entire system from the first information symbol, and further reads a value of the mean effective reception electric field strength from the second information symbol. Then, modulation scheme control section 155 determines a modulation scheme of the transmission signal based on the values, and outputs a control signal (hereinafter, referred to as a "modulation scheme instruction signal") for instructing the determined modulation scheme to S/P sections 102-1 and 102-2. In addition, modulation scheme determination processing in modulation scheme control section 155 will specifically be described below.

Described in the foregoing is the explanation of each component of base station apparatus 100 according to this Embodiment.

Figure 2:
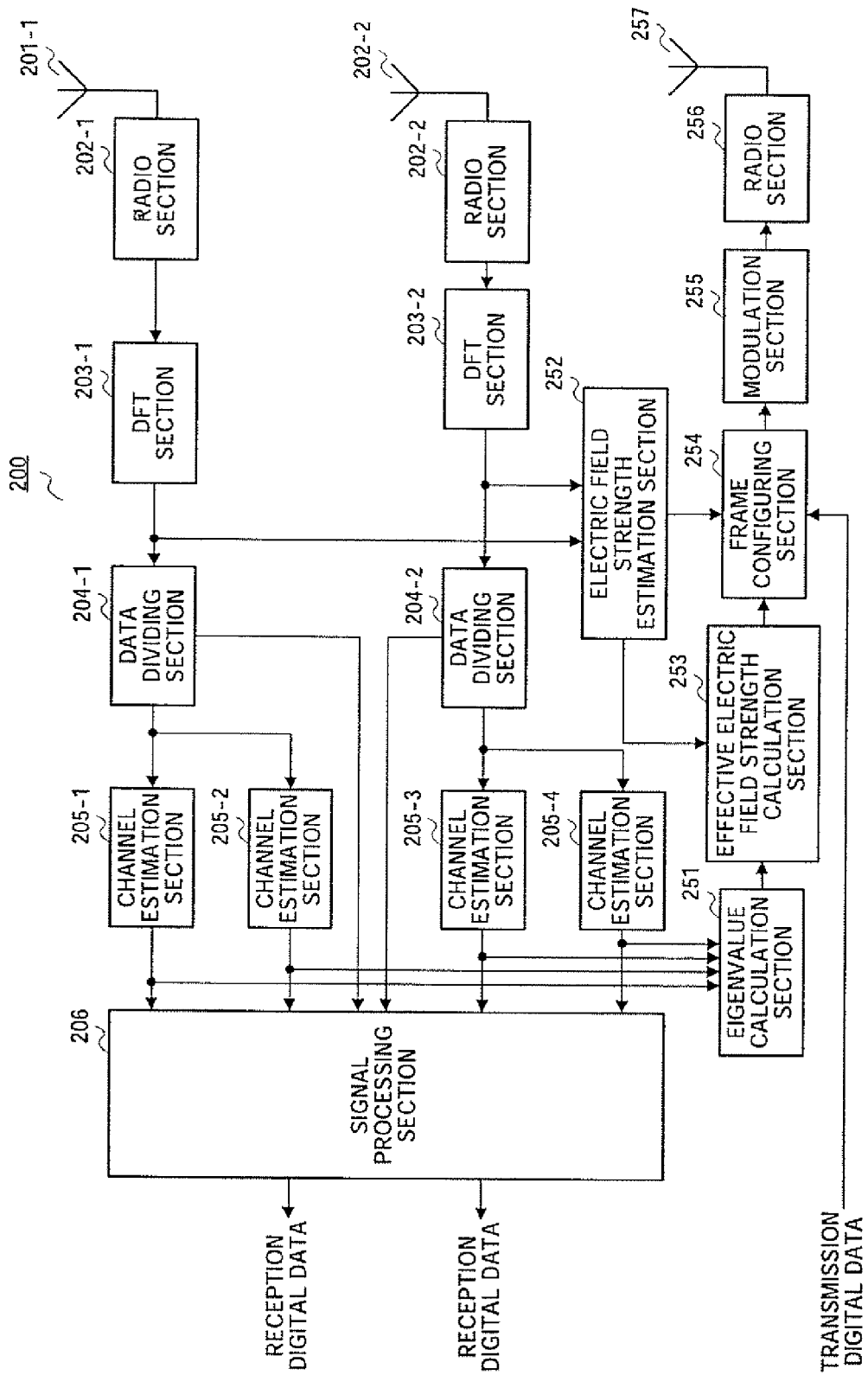
FIG. 2 is a block diagram illustrating a configuration of a communication terminal apparatus according to Embodiment 1.

Next, with reference to a block diagram in FIG. 2, a configuration of a communication terminal apparatus according to this Embodiment will be described below which performs wireless communications with the base station apparatus as shown in FIG. 1. In FIG. 2, communication terminal apparatus 200 has, on the reception side, reception antennas 201-1 and 201-2, radio sections 202-1 and 202-2, DFT sections 203-1 and 203-2, data dividing sections 204-1 and 204-2, channel estimation sections 205-1 to 205-4, and signal processing section 206. Further, communication terminal apparatus 200 has, on the transmission side, eigenvalue calculation section 251, electric field strength estimation section 252, effective electric field strength calculation section 253, frame configuring section 254, modulation section 255, radio section 256 and transmission antenna 257.

Radio section 202-1 receives a received signal received in reception antenna 201-1, downcoverts the signal to generate a reception baseband signal, and outputs the resultant to DFT section 203-1. Radio section 202-2 receives a received signal received in reception antenna 201-2, downcoverts the signal to generate a reception baseband signal, and outputs the resultant to DFT section 203-2.

DFT section 203-1 receives the reception baseband signal, and performs DFT processing on the signal to output to data dividing section 204-1 and electric field strength estimation section 252. DFT section 203-2 receives the reception baseband signal, and performs the DFT processing on the signal to output to data dividing section 204-2 and electric field strength estimation section 252. In addition, FFT (Fast Fourier Transform) is generally used as the DFT processing.

Data dividing section 204-1 divides the DFT-processed reception baseband signal into a channel estimation symbol of the transmission signal A, a channel estimation symbol of the transmission signal B and data symbols, outputs the channel estimation symbol of the transmission signal A to channel estimation section 205-1, outputs the channel estimation symbol of the transmission signal B to channel estimation section 205-2, and further outputs the data symbols to signal processing section 206. Data dividing section 204-2 divides the DFT-processed reception baseband signal into a channel estimation symbol of the transmission signal A, a channel estimation symbol of the transmission signal B and data symbols, outputs the channel estimation symbol of the transmission signal A to channel estimation section 205-3, outputs the channel estimation symbol of the transmission signal B to channel estimation section 205-4, and further outputs the data symbols to signal processing section 206.

Channel estimation section 205-1 receives the channel estimation symbol of the transmission signal A received in reception antenna 201-1, performs each estimation processing (hereinafter, referred to as "channel estimation") of time synchronization, frequency synchronization and distortion due to the channel fluctuation of the transmission signal A, and outputs channel estimation values that are values indicative of processing results to signal processing section 206 and eigenvalue calculation section 251. Channel estimation section 205-2 receives the channel estimation symbol of the transmission signal B received in reception antenna 201-1, performs channel estimation of the transmission signal B, and outputs channel estimation values to signal processing section 206 and eigenvalue calculation section 251.

Channel estimation section 205-3 receives the channel estimation symbol of the transmission signal A received in reception antenna 201-2, performs channel estimation of the transmission signal A, and outputs channel estimation values to signal processing section 206 and eigenvalue calculation section 251. Channel estimation section 205-4 receives the channel estimation symbol of the transmission signal B received in reception antenna 201-2, performs channel estimation of the transmission signal B, and outputs channel estimation values to signal processing section 206 and eigenvalue calculation section 251.

Signal processing section 206 demodulates the data symbols using the channel estimation values, and generates reception digital data. As an example of the demodulation method, there is a method of performing operation of an inverse matrix to a matrix comprised of data symbols using a channel matrix comprised of channel estimation values, a method of performing MLD (Maximum Likelihood Detection), or the like.

Eigenvalue calculation section 251 receives channel estimation values of the transmission signals A and B, calculates an eigenvalue corresponding to a matrix formed of channel estimation values, and outputs the eigenvalue to effective electric field strength calculation section 253. In addition, as a method of calculating an eigenvalue, methods are known such as Jascobi, Givens, Householder, QR, QL, QL with implicit shifts, and inverse iteration. These methods are adopted similarly also in each of following Embodiments.

Electric field strength estimation section 252 receives the DFT-processed reception baseband signal, estimates the reception electric field strength that is a square of amplitude of each reception baseband signal, adds estimated reception electric field strengths to average, and obtains the reception electric field strength of the entire system. Electric field strength estimation section 252 outputs the reception electric field strength corresponding to each reception baseband signal to effective electric field strength calculation section 253, and outputs the reception electric field strength of the entire system to frame configuring section 254.

Effective electric field strength calculation section 253 receives the reception electric field strength corresponding to each reception baseband signal and the eigenvalue, multiplies each reception electric field strength by the minimum power of the eigenvalue to obtain the effective reception electric field strength, averages effective reception electric field strengths to obtain the mean effective reception electric field strength, and outputs the mean effective reception electric field strength to frame configuring section 254. The minimum power of the eigenvalue is a value that is a main factor for determining a BER (Bit Error Rate) characteristic and PER (Packet Error Rate) characteristic of the system.

Frame configuring section 254 receives the transmission digital data, the reception electric field strength of the entire system, and the mean effective reception electric field strength, and generates a first information symbol indicative of the reception electric field strength of the entire system and a second information symbol indicative of the mean effective reception electric field strength. Then, frame configuring section 254 inserts the first and second information symbols into the transmission digital data to generate a transmission digital signal, and outputs the resultant to modulation section 255.

Modulation section 255 receives the transmission digital signal, modulates the signal to generate a transmission baseband signal, and outputs the signal to radio section 256.

Radio section 256 receives the transmission baseband signal, upconverts the signal to generate a transmission signal, and transmits the radio signal from transmission antenna 257.

Described in the foregoing is the explanation of each component of communication terminal apparatus 200 according to this Embodiment.

Figure 3:
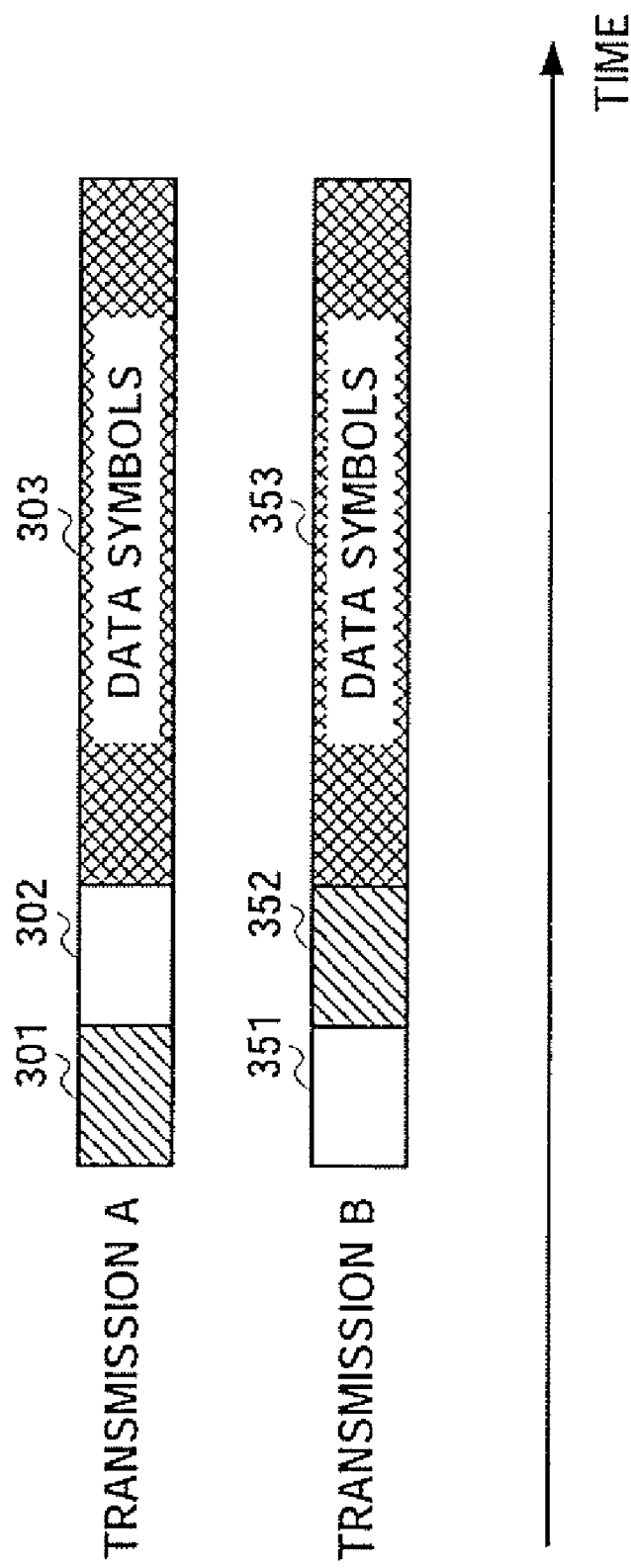
FIG. 3 is a view illustrating an example of frame structures of transmission signals of the base station apparatus according to Embodiment 1.

FIG. 3 is a view illustrating an example of frame structures of transmission signals of the base station apparatus according to this Embodiment. In FIG. 3, in the transmission signal A, a frame is comprised of channel estimation symbol 301, guard symbol 302 and data symbols 303 in this order. In the transmission signal B, a frame is comprised of guard symbol 351, channel estimation symbol 352 and data symbols 353 in this order. Beginnings of respective frames of the transmission signals A and B are of the same timing, and guard symbols 302 and 351 are inserted to prevent channel estimation symbol 301 of the transmission signal A and channel estimation symbol 352 of the transmission signal B from temporally overlapping each other. As a result, channel estimation symbols 301 and 352 are temporally independent of each other.

Figure 4:
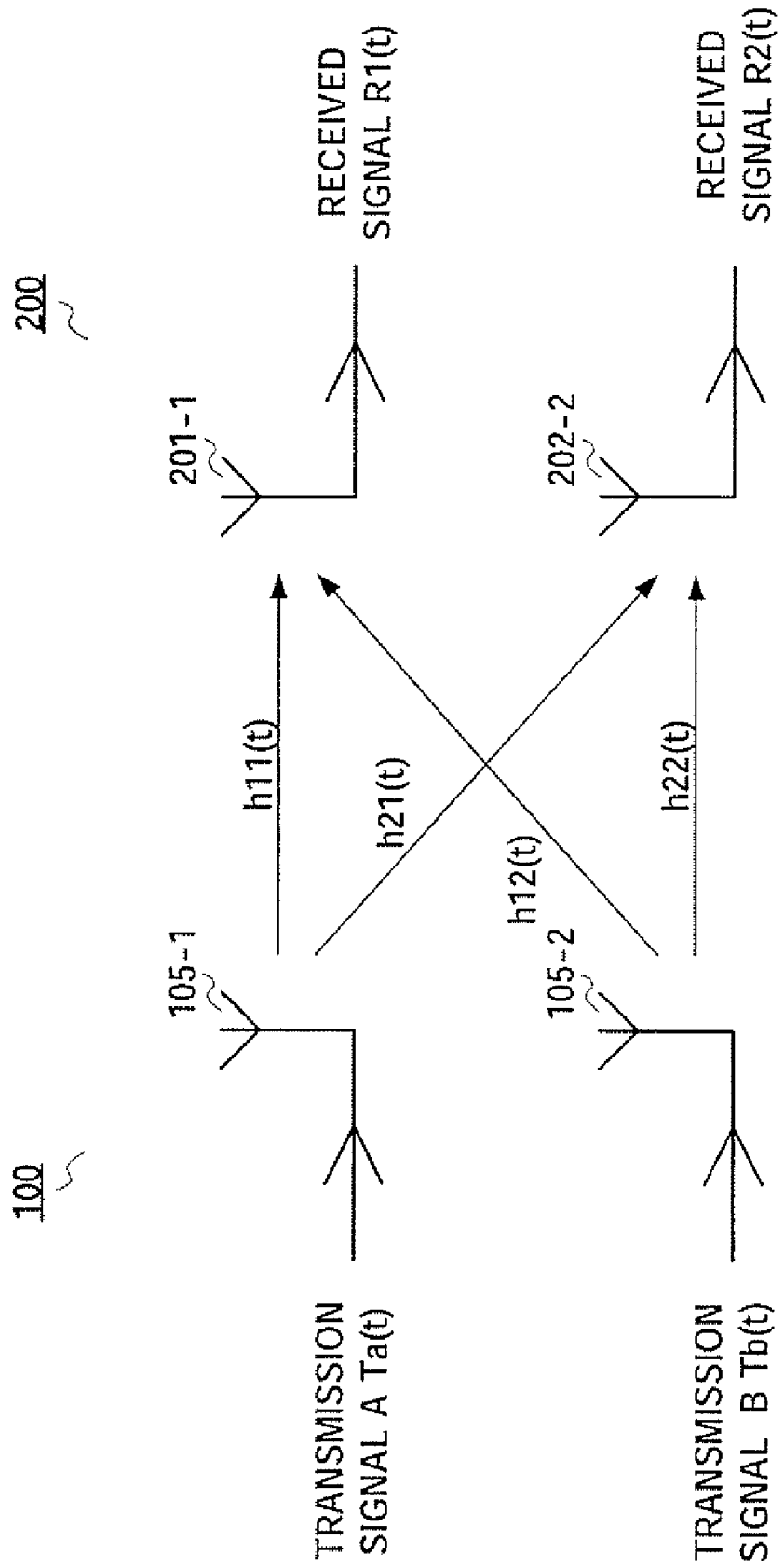
FIG. 4 is a view illustrating propagation channels between the base station apparatus and communication terminal apparatus according to Embodiment 1.

FIG. 4 is a view illustrating propagation channels between the base station apparatus and communication terminal apparatus according to this Embodiment. As shown in FIG. 4, the transmission signal A (Ta(t)) is transmitted from transmission antenna 105-1, while the transmission signal B (Tb(t)) is transmitted from transmission antenna 105-2. Then, reception antenna 201-1 receives a signal (R1(t)) of a combination of the transmission signal A undergoing channel variations h11(t) and transmission signal B undergoing channel variations h12(t). Reception antenna 201-2 receives a signal (R2(t)) of a combination of the transmission signal A undergoing channel variations h21(t) and transmission signal B undergoing channel variations h22(t) As a result, the determinant of following equation (1) is established.

$$\begin{pmatrix} R1(t) \\ R2(t) \end{pmatrix} = \begin{pmatrix} h11(t) & h12(t) \\ h21(t) & h22(t) \end{pmatrix} \begin{pmatrix} Ta(t) \\ Tb(t) \end{pmatrix} \quad (1)$$

A matrix consisting of h11(t), h12(t), h21(t) and h22(t) of eq. (1) is called channel matrix. Eigenvalue calculation section 251 calculates an eigenvalue corresponding to the channel matrix of eq. (1). In addition, in the case of n transmission antennas and n reception antennas, the channel matrix is an n×n matrix.

Figure 5:
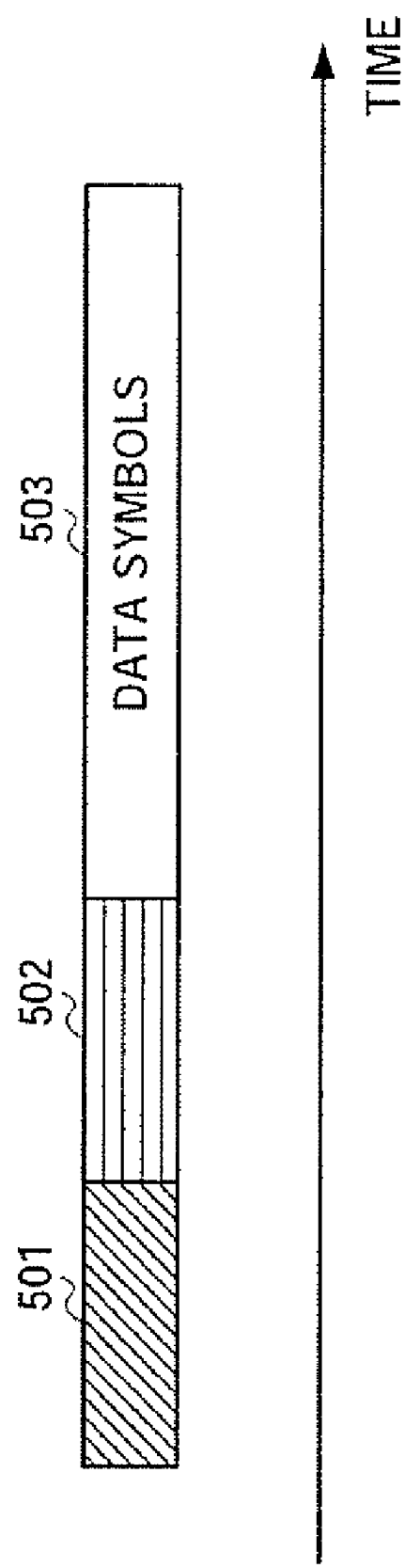
FIG. 5 is a view illustrating an example of a frame structure of a transmission signal of the communication terminal apparatus according to Embodiment 1.

FIG. 5 is a view illustrating an example of a frame structure of a transmission signal of the communication terminal apparatus according to this Embodiment. In FIG. 5 in the transmission signal, a frame is comprised of first information symbol 501, second information symbol 502, and data symbols 503 in this order.

The modulation scheme determination processing in modulation scheme control section 155 will specifically be described below with reference to FIG. 6. FIG. 6 is a view illustrating a table stored in internal memory of modulation scheme control section 155.

Modulation scheme control section 155 calculates a difference X between the reception electric field strength of the entire system and the mean effective reception electric field strength, and based on the relationship in level between the difference X and thresholds TH1 and TH2, determines an optimal modulation scheme from the table as shown in FIG. 6. For example, when the difference X is more than or equal to the threshold TH1 and less than the threshold TH2, modulation scheme control section 155 determines that QPSK modulation is optimal. Then, modulation scheme control section 155 outputs a modulation scheme instruction signal to S/P sections 102-1 and 102-2.

The effective reception electric field strength represents the reception electric field strength based on the relative relationship between elements of the channel matrix, and adaptive modulation processing is carried out based on the effective reception electric field strength. Therefore, when the reception electric field strength of a single channel is extremely larger than those of other channels, the modulation level is not increased, and it is possible to improve the reception quality in a large number of channels with small reception electric field strength.

Figure 7:
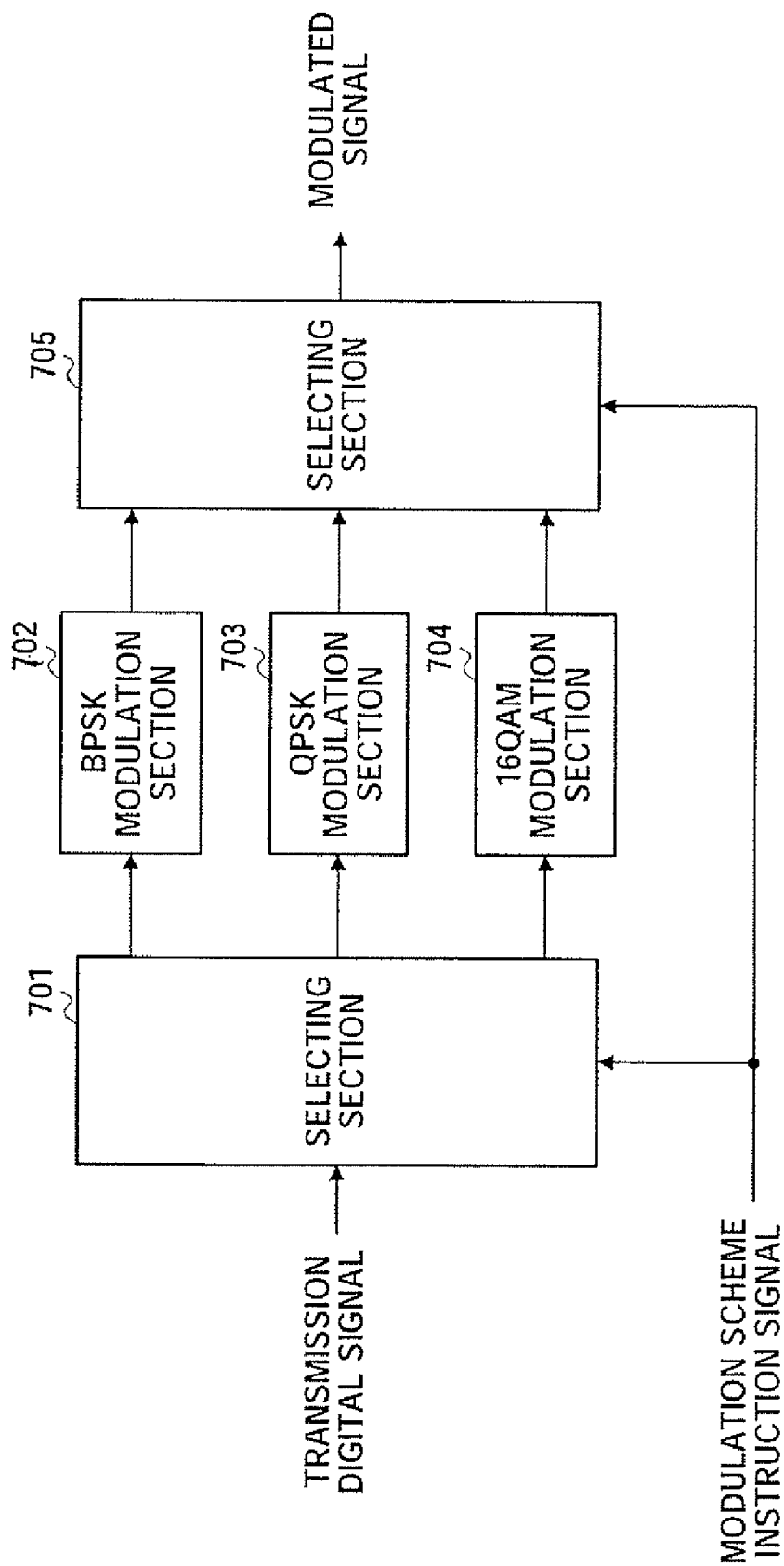
FIG. 7 is a block diagram illustrating an internal configuration of a modulation processing part of an S/P section of the base station apparatus according to Embodiment 1.

The adaptive modulation processing in S/P sections 102-1 and 102-2 will specifically be described below with reference to FIG. 7. FIG. 7 is a view illustrating an internal configuration of a modulation processing part of s/P section 102-1 or 102-2.

Each of S/P sections 102-1 and 102-2 internally has selecting sections 701 and 705, BPSK modulation section 702, QPSK modulation section 703 and 16QAM modulation section 704.

Corresponding to the modulation scheme instruction signal from modulation scheme control section 155' selecting section 701 outputs a transmission digital signal to either BPSK modulation section 702, QPSK modulation section 703 or 16QAM modulation section 704.

BPSK modulation section 702 performs BPSK (Binary Phase Shift Keying) on the transmission digital signal, and outputs a modulated signal to selecting section 705. QPSK modulation section 703 performs QPSK (Quadrature Phase Shift Keying) on the transmission digital signal, and outputs a modulated signal to selecting section 705. 16QAM modulation section 704 performs 16QAM (16 Quadrature Amplitude Modulation) on the transmission digital signal, and outputs a modulated signal to selecting section 705.

Selecting section 705 outputs the modulated signal output from either BPSK modulation section 702, QPSK modulation section 703 or 16QAM modulation section 704, corresponding to the optimal modulation scheme instructed from modulation scheme control section 155, to IDFT sections 103-1 and 103-2.

Thus, in the system where multi antennas is used in both transmission and reception, by controlling a modulation scheme based on the reception electric field strength of the entire system and the effective reception electric field strength, it is possible to perform the control in consideration of relative relationships between channels, and it is thereby possible to improve the reception quality.

Embodiment 2

Embodiment 2 describes the case where in single-carrier communications using MIMO, a modulation scheme is controlled based on the reception electric field strength of the entire system and effective reception electric field strength.

Figure 8:
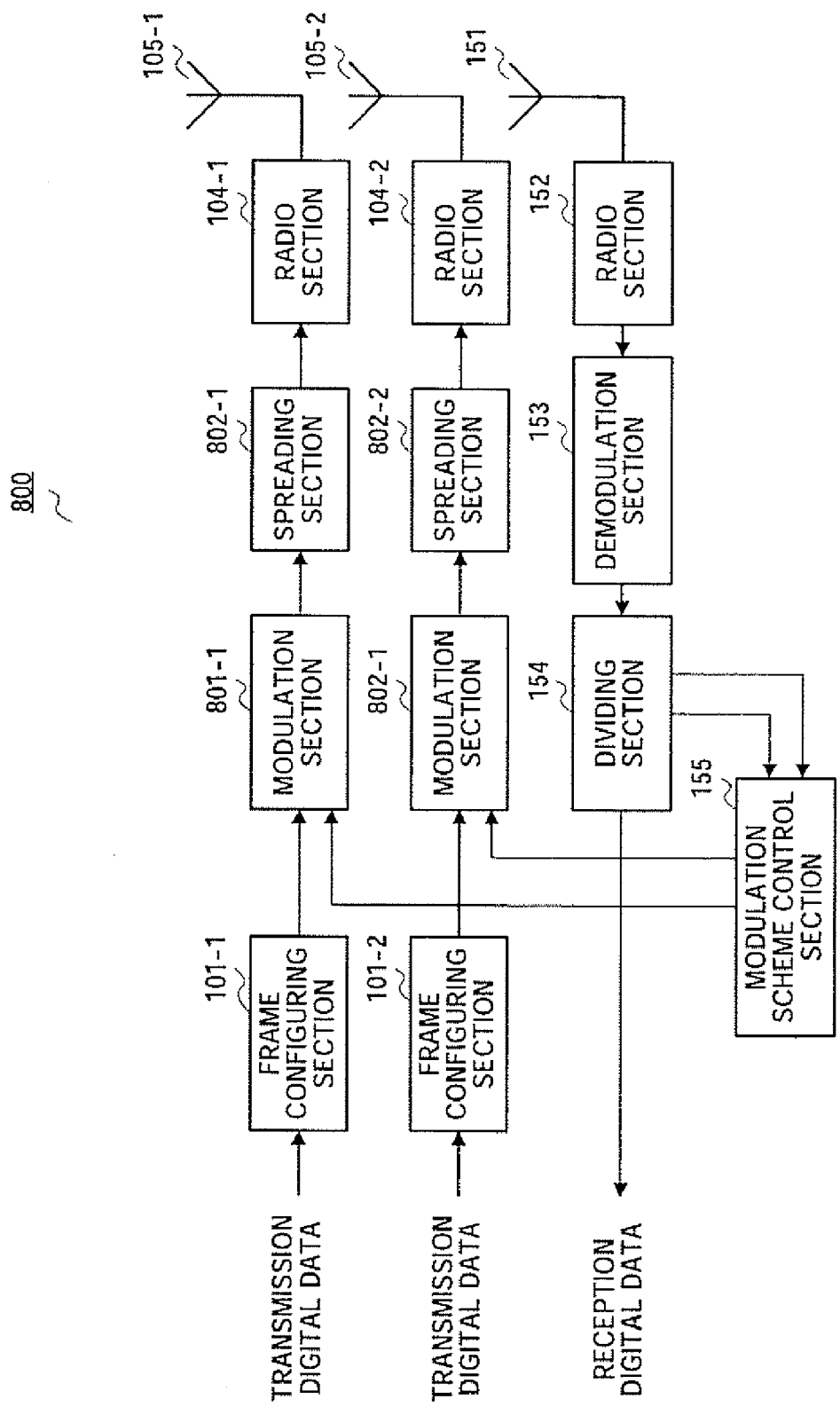
FIG. 8 is a block diagram illustrating a configuration of a base station apparatus according to Embodiment 2.

FIG. 8 is a block diagram illustrating a configuration of a base station apparatus according to Embodiment 2. In addition, in base station apparatus 800 as shown in FIG. 8, structural sections common to base station apparatus 100 as shown in FIG. 1 are assigned the same reference numerals as in FIG. 1 to omit descriptions.

Base station apparatus 800 as shown in FIG. 8 has the same configuration as that of base station apparatus 100 as shown in FIG. 1 except that S/P sections 102-1 and 102-2 and IDFT sections 103-1 and 103-2 are eliminated and that modulation sections 801-1 and 801-2 and spreading sections 802-1 and 802-2 are added.

Each of frame configuring sections 101-1 and 101-2 receives as its input transmission digital data, inserts a channel estimation symbol and guard symbol to the transmission digital data to generate a transmission digital signal, and outputs the signal to modulation section 801-1 or 802-2, respectively.

Modulation scheme control section 155 receives the first and second information symbols, reads the reception electric field strength of the entire system from the first information symbol, and further reads a value of the mean effective reception electric field strength from the second information symbol. Then, modulation scheme control section 155 determines a modulation scheme of the transmission signal based on the values, and outputs a modulation scheme instruction signal for instructing the determined modulation scheme to modulation sections 801-1 and 801-2.

Modulation section 801-1 receives the transmission digital signal to perform the adaptive modulation processing according to the instruction from modulation scheme control section 155, and outputs a modulated signal to spreading section 802-1. Modulation section 801-2 receives the transmission digital signal to perform the adaptive modulation processing according to the instruction from modulation scheme control section 155, and outputs a modulated signal to spreading section 802-2.

Spreading section 802-1 receives the modulated signal to perform spreading processing, and outputs a spread signal to radio section 104-1, Spreading section 802-2 receives the modulated signal to perform spreading processing, and outputs a spread signal to radio section 104-2.

Radio section 104-1 receives the spread signal, upconverts the signal to generate a transmission signal A, and transmits the radio signal from transmission antenna 105-1. Radio section 104-2 receives the spread signal, upconverts the signal to generate a transmission signal B, and transmits the radio signal from transmission antenna 105-2.

Figure 9:
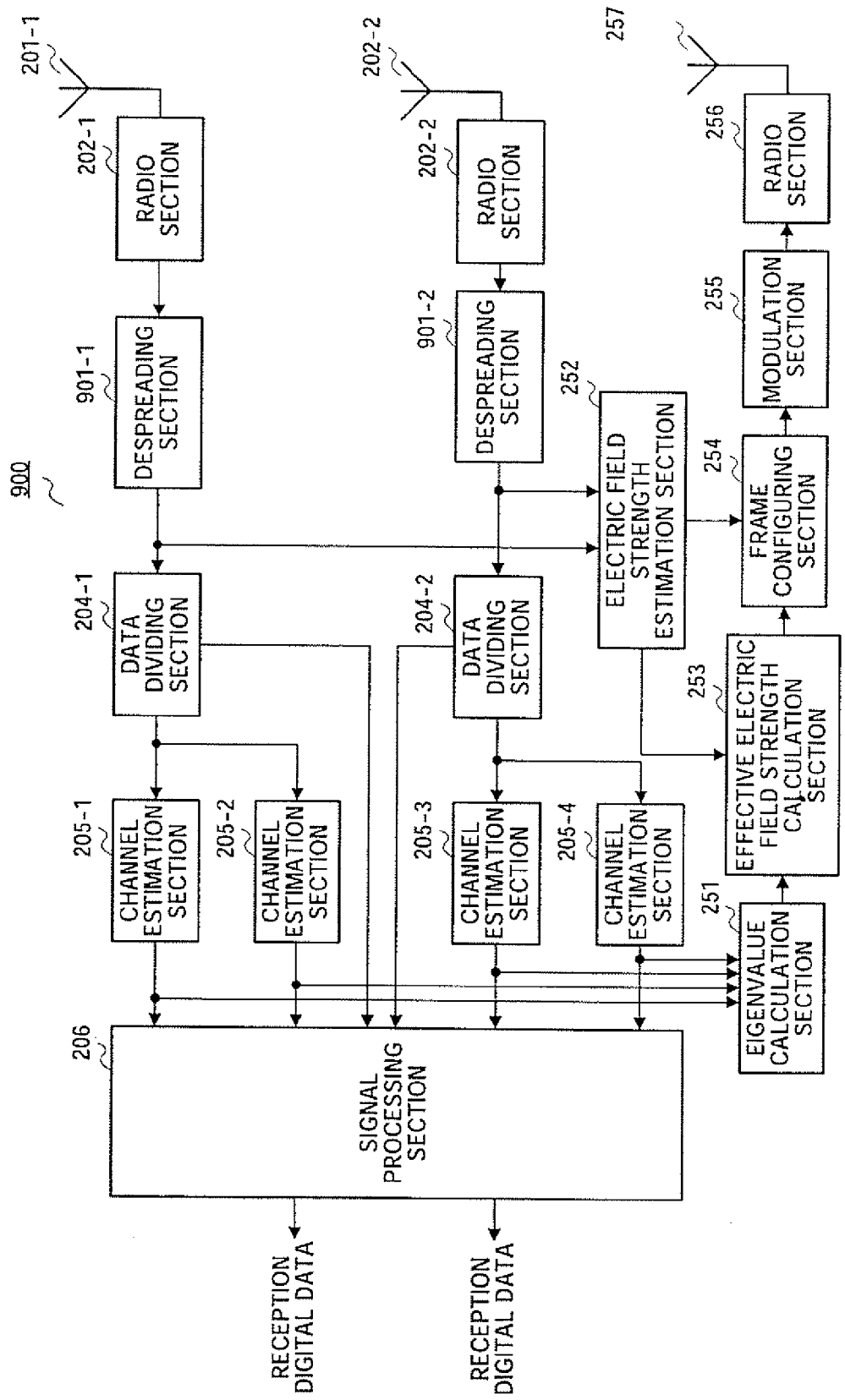
FIG. 9 is a block diagram illustrating a configuration of a communication terminal apparatus according to Embodiment 2.

FIG. 9 is a block diagram illustrating a configuration of a communication terminal apparatus according to Embodiment 2. In addition, in communication terminal apparatus 900 as shown in FIG. 9, structural sections common to communication terminal apparatus 200 as shown in FIG. 2 are assigned the same reference numerals as in FIG. 2 to omit descriptions.

Communication terminal apparatus 900 as shown in FIG. 9 has the same configuration as that of communication terminal apparatus 200 as shown in FIG. 2 except that DFT sections 203-1 and 203-2 are eliminated and that despreading sections 802-1 and 802-2 are added. Radio section 202-1 receives a received signal received in reception antenna 201-1, downcoverts the signal to generate a reception baseband signal, and outputs the resultant to despreading section 901-1. Radio section 202-2 receives a received signal received in reception antenna 201-2, downcoverts the signal to generate a reception baseband signal, and outputs the resultant to despreading section 901-2.

Despreading section 901-1 receives the reception baseband signal to perform despreading processing, and outputs the resultant to data dividing section 204-1 and electric field strength estimation section 252. Despreading section 902-1 receives the reception baseband signal to perform despreading processing, and outputs the resultant to data dividing section 204-2 and electric field strength estimation section 252.

Data dividing section 204-1 divides the despread reception baseband signal into a channel estimation symbol of the transmission signal A, a channel estimation symbol of the transmission signal B and data symbols, outputs the channel estimation symbol of the transmission signal A to channel estimation section 205-1, outputs the channel estimation symbol of the transmission signal B to channel estimation section 205-2, and further outputs the data symbols to signal processing section 206. Data dividing section 204-2 divides the despread reception baseband signal into a channel estimation symbol of the transmission signal A, a channel estimation symbol of the transmission signal B and data symbols, outputs the channel estimation symbol of the transmission signal A to channel estimation section 205-3, outputs the channel estimation symbol of the transmission signal B to channel estimation section 205-4, and further outputs the data symbols to signal processing section 206.

Electric field strength estimation section 252 receives the despread reception baseband signal, estimates the reception electric field strength that is a square of amplitude of each reception baseband signal, adds estimated reception electric field strengths to average, and obtains the reception electric field strength of the entire system. Electric field strength estimation section 252 outputs the reception electric field strength corresponding to each reception baseband signal to effective electric field strength calculation section 253, and outputs the reception electric field strength of the entire system to frame configuring section 254.

Thus, in the system where multi antennas is used in both transmission and reception, by controlling a modulation scheme based on the reception electric field strength of the entire system and the effective reception electric field strength, it is possible to perform the control in consideration of relative relationships between channels, and it is thereby possible to improve the reception quality.

Embodiment 3

Embodiment 3 describes the case where in multi-carrier communications using MIMO, transmission antennas are switched based on the reception electric field strength of the entire system and effective reception electric field strength. In addition, a configuration of a communication terminal apparatus of this Embodiment is the same as that of communication terminal apparatus 200 in FIG. 2 as described in Embodiment 1, and descriptions thereof are omitted.

Figure 10:
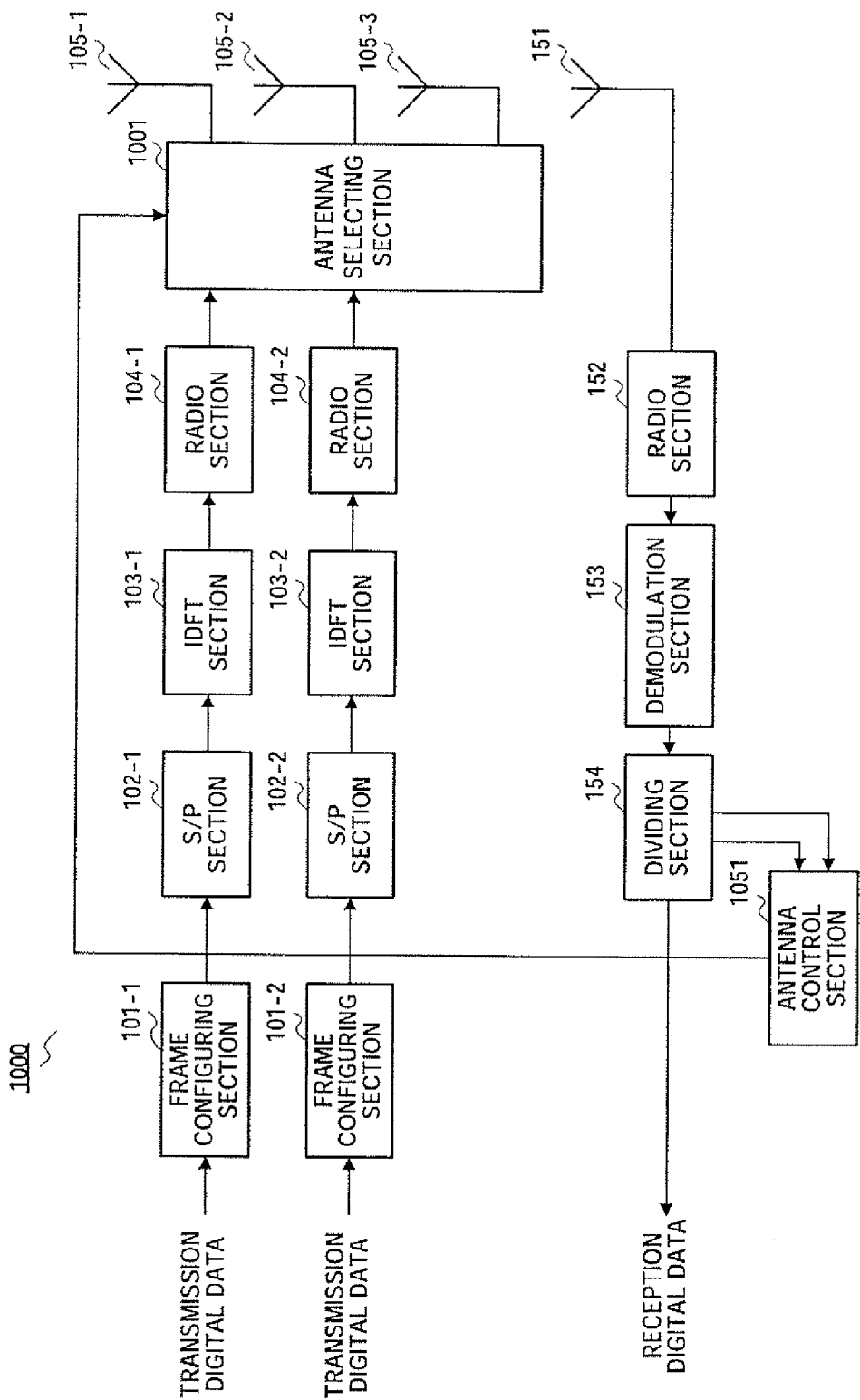
FIG. 10 is a block diagram illustrating a configuration of a base station apparatus according to Embodiment 3.

FIG. 10 is a block diagram illustrating a configuration of a base station apparatus according to Embodiment 3. In addition, in base station apparatus 1000 as shown in FIG. 10, structural sections common to base station apparatus 100 as shown in FIG. 1 are assigned the same reference numerals as in FIG. 1 to omit descriptions.

Base station apparatus 1000 as shown in FIG. 10 has the same configuration as that of base station apparatus 100 as shown in FIG. 1 except that modulation scheme control section 155 is eliminated and that antenna control section 1051, antenna selecting section 1001 and transmission antenna 105-3 are added.

Dividing section 154 outputs the first and second information symbols to antenna control section 1051.

Antenna control section 1051 receives the first and second information symbols, reads the reception electric field strength of the entire system from the first information symbol, and further reads a value of the mean effective reception electric field strength from the second information symbol. Then, antenna control section 1051 determines whether or not to switch transmission antennas based on the values, and determines transmission antennas. More specifically, antenna control section 1051 calculates a difference X between the reception electric field strength of the entire system and the mean effective reception electric field strength, and determines that transmission antennas are not switched when the difference X is less than a predetermined threshold, while determining that the transmission antennas are switched when the difference X is more than or equal to the predetermined threshold. Then, antenna control section 1051 outputs a control signal (hereinafter, referred to as a "transmission antenna instruction signal") for instructing the determined transmission antennas to antenna selecting section 1001.

Radio section 104-1 receives the transmission baseband signal, upconverts the baseband signal to generate a transmission signal A, and outputs the signal to antenna selecting section 1001. Radio section 104-2 receives the transmission baseband signal, upconverts the baseband signal to generate a transmission signal B, and outputs the signal to antenna selecting section 1001.

According to the transmission antenna instruction signal from antenna control section 1051, antenna selecting section 1001 selects two different antennas from transmission antennas 105-1 to 105-3 as respective transmission antennas of transmission signals A and B, and transmits the transmission signals A and B by wireless communications using the selected transmission antennas.

Thus, in the system where multi antennas is used in both transmission and reception, by selecting transmission antennas based on the reception electric field strength of the entire system and the effective reception electric field strength, it is possible to perform the control in consideration of relative relationships between channels, and it is thereby possible to improve the reception quality.

In addition, in this Embodiment, as a method of initial operation at the time of starting communications, the base station apparatus calculates the difference X between the reception electric field strength of the entire system and the mean effective reception electric field strength with respect to each of groups of transmission antennas (105-1 and 105-2), (105-2 and 105-3) and (105-3 and 105-1), and selects a group of transmission antennas that minimizes the difference X. As an easier method, a method is considered of using two antennas such that a distance between antenna elements is the greatest. This is because more spaced antennas generally have lower antenna correlation and lower channel correlation, and are suitable for the MIMO system used in this Embodiment.

Embodiment 4

Embodiment 4 describes the case where in single-carrier communications using MIMO, transmission antennas are switched based on the reception electric field strength of the entire system and effective reception electric field strength. In addition, a configuration of a communication terminal apparatus of this Embodiment is the same as that of communication terminal apparatus 900 in FIG. 9 as described in Embodiment 2, and descriptions thereof are omitted.

Figure 11:
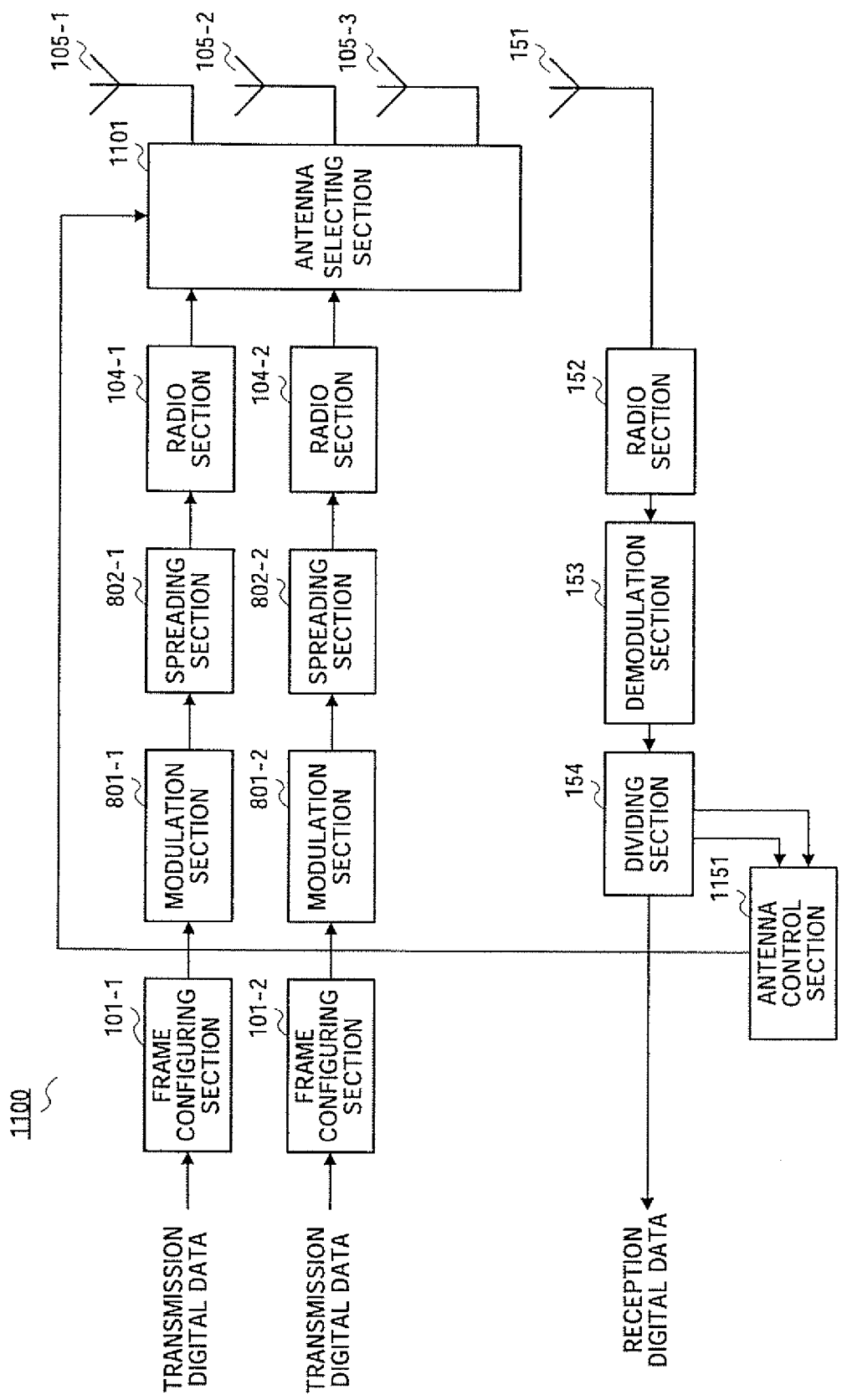
FIG. 11 is a block diagram illustrating a configuration of a base station apparatus according to Embodiment 4.

FIG. 11 is a block diagram illustrating a configuration of a base station apparatus according to Embodiment 4. In addition, in base station apparatus 1100 as shown in FIG. 11, structural sections common to base station apparatus 800 as shown in FIG. 8 are assigned the same reference numerals as in FIG. 8 to omit descriptions.

Base station apparatus 1100 as shown in FIG. 1 has the same configuration as that of base station apparatus 800 as shown in FIG. 8 except that modulation scheme control section 155 is eliminated and that antenna control section 1151, antenna selecting section 1101 and transmission antenna 105-3 are added.

Dividing section 154 outputs the first and second information symbols to antenna control section 1151.

Antenna control section 1151 receives the first and second information symbols, reads the reception electric field strength of the entire system from the first information symbol, and further reads a value of the mean effective reception electric field strength from the second information symbol. Then, antenna control section 1151 determines whether or not to switch transmission antennas based on the values, and determines transmission antennas. More specifically, antenna control section 1151 calculates a difference X between the reception electric field strength of the entire system and the mean effective reception electric field strength, and determines that transmission antennas are not switched when the difference X is less than a predetermined threshold, while determining that the transmission antennas are switched when the difference X is more than or equal to the predetermined threshold. Then, antenna control section 1151 outputs a transmission antenna instruction signal for instructing the determined transmission antennas to antenna selecting section 1101.

Radio section 104-1 receives the transmission baseband signal, upconverts the baseband signal to generate a transmission signal A, and outputs the signal to antenna selecting section 1101. Radio section 104-2 receives the transmission baseband signal, upconverts the baseband signal to generate a transmission signal B, and outputs the signal to antenna selecting section 1101.

According to the transmission antenna instruction signal from antenna control section 1151, antenna selecting section 1101 selects two different antennas from transmission antennas 105-1 to 105-3 as respective transmission antennas of transmission signals A and B, and transmits the transmission signals A and B by wireless communications using the selected transmission antennas.

Thus, in the system where multi antennas is used in both transmission and reception, by selecting transmission antennas based on the reception electric field strength of the entire system and the effective reception electric field strength, it is possible to perform the control in consideration of relative relationships between channels, and it is thereby possible to improve the reception quality.

Embodiment 5

Embodiment 5 describes the case where in multi-carrier communications using MIMO, transmission power is varied based on the reception electric field strength of the entire system and effective reception electric field strength. In addition, a configuration of a communication terminal apparatus of this Embodiment is the same as that of communication terminal apparatus 200 in FIG. 2 as described in Embodiment 1, and descriptions thereof are omitted.

Figure 12:
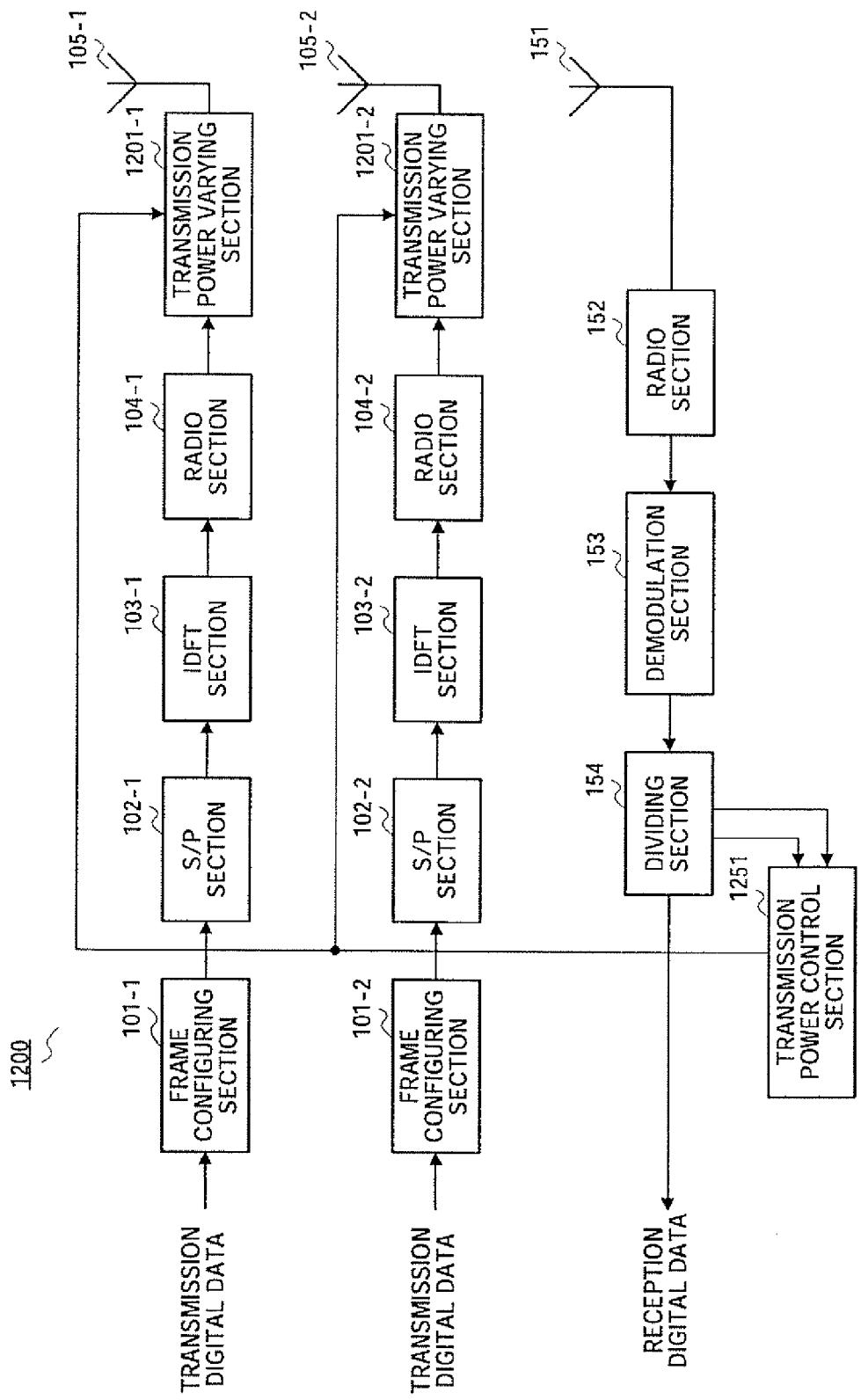
FIG. 12 is a block diagram illustrating a configuration of a base station apparatus according to Embodiment 5.

FIG. 12 is a block diagram illustrating a configuration of a base station apparatus according to Embodiment 5. In addition, in base station apparatus 1200 as shown in FIG. 12, structural sections common to base station apparatus 100 as shown in FIG. 1 are assigned the same reference numerals as in FIG. 1 to omit descriptions.

Base station apparatus 1200 as shown in FIG. 12 has the same configuration as that of base station apparatus 100 as shown in FIG. 1 except that modulation scheme control section 155 is eliminated and that transmission power control section 1251 and transmission power varying sections 1201-1 and 1201-2 are added.

Dividing section 154 outputs the first and second information symbols to transmission power control section 1251.

Transmission power control section 1251 receives the first and second information symbols, reads the reception electric field strength of the entire system from the first information symbol, and further reads a value of the mean effective reception electric field strength from the second information symbol. Then, transmission power control section 1251 determines transmission power based on the values. More specifically, transmission power control section 1251 calculates a difference X between the reception electric field strength of the entire system and the mean effective reception electric field strength, and sets the transmission power higher as the difference is smaller. Then, transmission power control section 1251 outputs a control signal (hereinafter, referred to as a "transmission power instruction signal") for instructing the determined transmission power to transmission power varying sections 1201-1 and 1202-2.

Radio section 104-1 receives the transmission baseband signal, upconverts the baseband signal to generate a transmission signal A, and outputs the signal to transmission power varying section 1201-1. Radio section 104-2 receives the transmission baseband signal, upconverts the baseband signal to generate a transmission signal B, and outputs the signal to transmission power varying section 1201-2.

According to the transmission power instruction signal from transmission power control section 1251, transmission power varying section 12011 varies the transmission power of the transmission signal A, and transmits the transmission signal A with the varied transmission power by wireless communications. According to the transmission power instruction signal from transmission power control section 1251, transmission power varying section 1201-2 varies the transmission power of the transmission signal B, and transmits the transmission signal B with the varied transmission power by wireless communications.

Thus, in the system where multi antennas is used in both transmission and reception, by varying the transmission power based on the reception electric field strength of the entire system and the effective reception electric field strength, it is possible to perform the control in consideration of relative relationships between channels, and it is thereby possible to improve the reception quality.

Embodiment 6

Embodiment 6 describes the case where in single-carrier communications using MIMO, transmission power is varied based on the reception electric field strength of the entire system and effective reception electric field strength. In addition, a configuration of a communication terminal apparatus of this Embodiment is the same as that of communication terminal apparatus 900 in FIG. 9 as described in Embodiment 2, and descriptions thereof are omitted.

Figure 13:
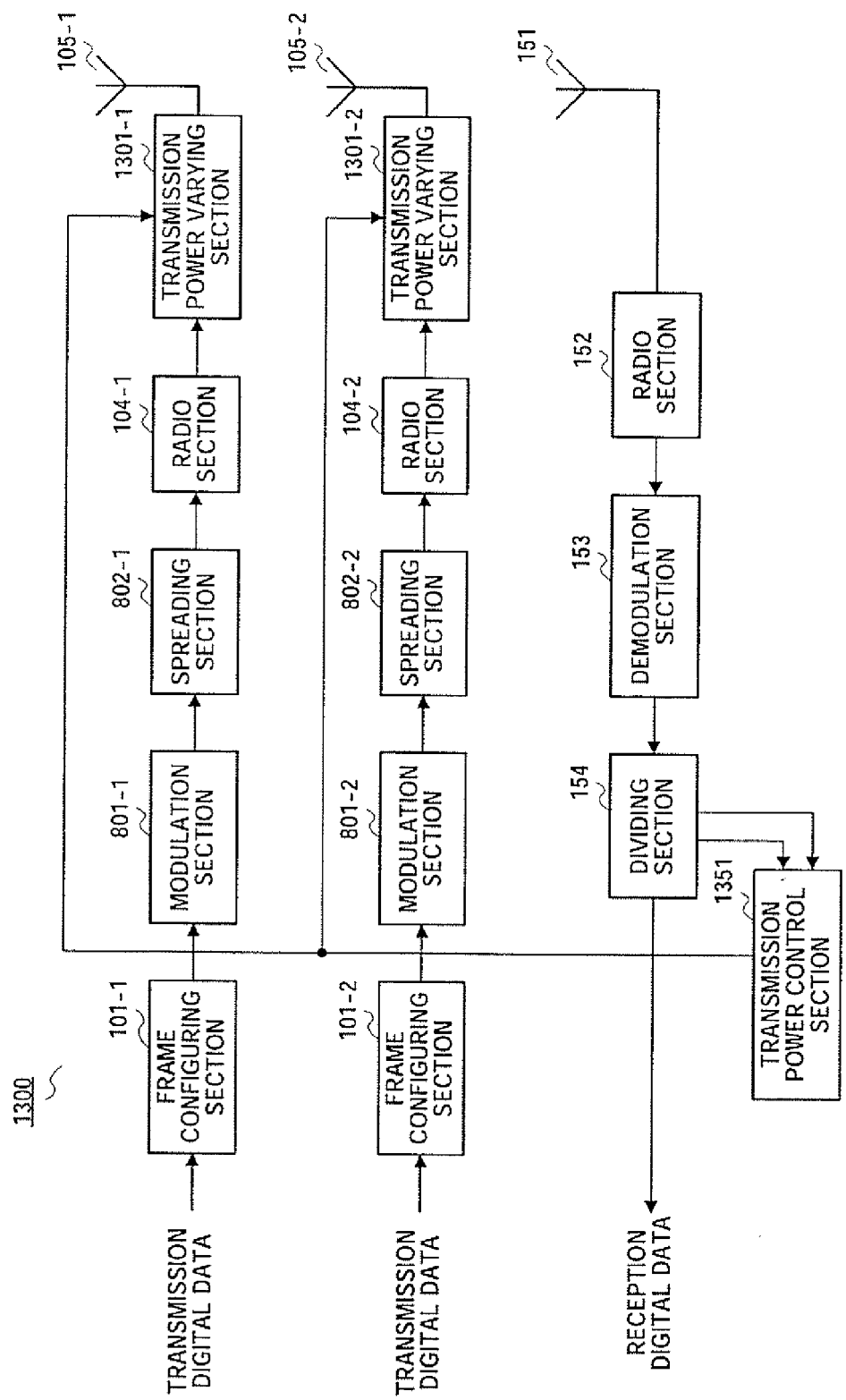
FIG. 13 is a block diagram illustrating a configuration of a base station apparatus according to Embodiment 6.

FIG. 13 is a block diagram illustrating a configuration of a base station apparatus according to Embodiment 6. In addition, in base station apparatus 1300 as shown in FIG. 13, structural sections common to base station apparatus 800 as shown in FIG. 8 are assigned the same reference numerals as in FIG. 8 to omit descriptions.

Base station apparatus 1300 as shown in FIG. 13 has the same configuration as that of base station apparatus 800 as shown in FIG. 8 except that modulation scheme control section 155 is eliminated and that transmission power control section 1351 and transmission power varying sections 1301-1 and 1301-2 are added.

Dividing section 154 outputs the first and second information symbols to transmission power control section 1351.

Transmission power control section 1351 receives the first and second information symbols, reads the reception electric field strength of the entire system from the first information symbol, and further reads a value of the mean effective reception electric field strength from the second information symbol. Then, transmission power control section 1351 determines transmission power based on the values. More specifically, transmission power control section 1351 calculates a difference X between the reception electric field strength of the entire system and the mean effective reception electric field strength, and sets the transmission power higher as the difference is smaller. Then, transmission power control section 1351 outputs a transmission power instruction signal for instructing the determined transmission power to transmission power varying sections 1301-1 and 1302-2.

Radio section 104-1 receives the transmission baseband signal, upconverts the baseband signal to generate a transmission signal A, and outputs the signal to transmission power varying section 1301-1. Radio section 104-2 receives the transmission baseband signal, upconverts the baseband signal to generate a transmission signal B, and outputs the signal to transmission power varying section 1301-2.

According to the transmission power instruction signal from transmission power control section 1351, transmission power varying section 1301-1 varies the transmission power of the transmission signal A, and transmits the transmission signal A with the varied transmission power by wireless communications. According to the transmission power instruction signal from transmission power control section 1351, transmission power varying section 1301-2 varies the transmission power of the transmission signal B, and transmits the transmission signal B with the varied transmission power by wireless communications.

Thus, in the system where multi antennas is used in both transmission and reception, by varying the transmission power based on the reception electric field strength of the entire system and the effective reception electric field strength, it is possible to perform the control in consideration of relative relationships between channels, and it is thereby possible to improve the reception quality.

Embodiment 7

Embodiment 7 describes the case where in multi-carrier communications using MIMO, a communication method is varied based on the reception electric field strength of the entire system and effective reception electric field strength. In addition, a configuration of a communication terminal apparatus of this Embodiment is the same as that of communication terminal apparatus 200 in FIG. 2 as described in Embodiment 1, and descriptions thereof are omitted.

Figure 14:
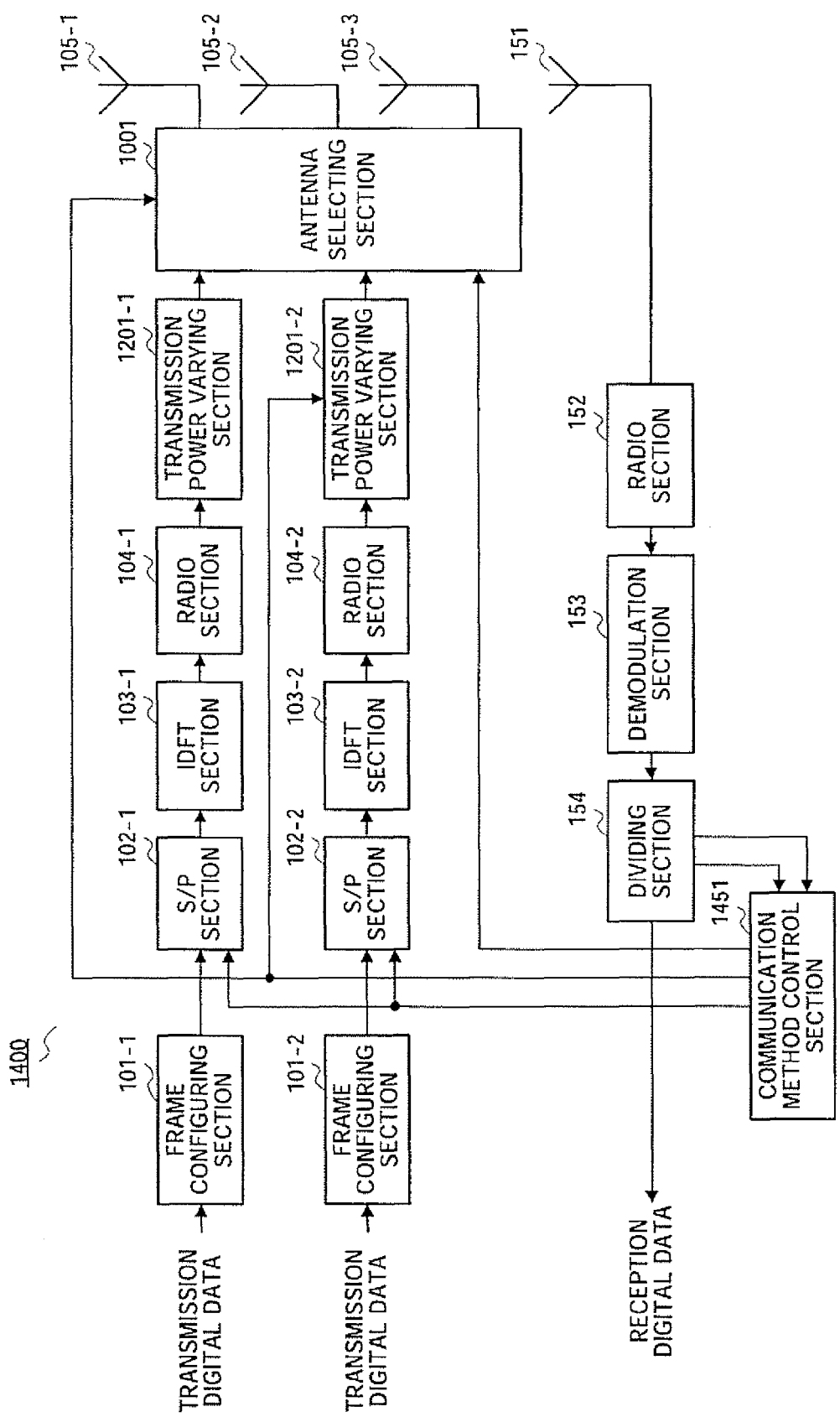
FIG. 14 is a block diagram illustrating a configuration of a base station apparatus according to Embodiment 7.
Figure 5:
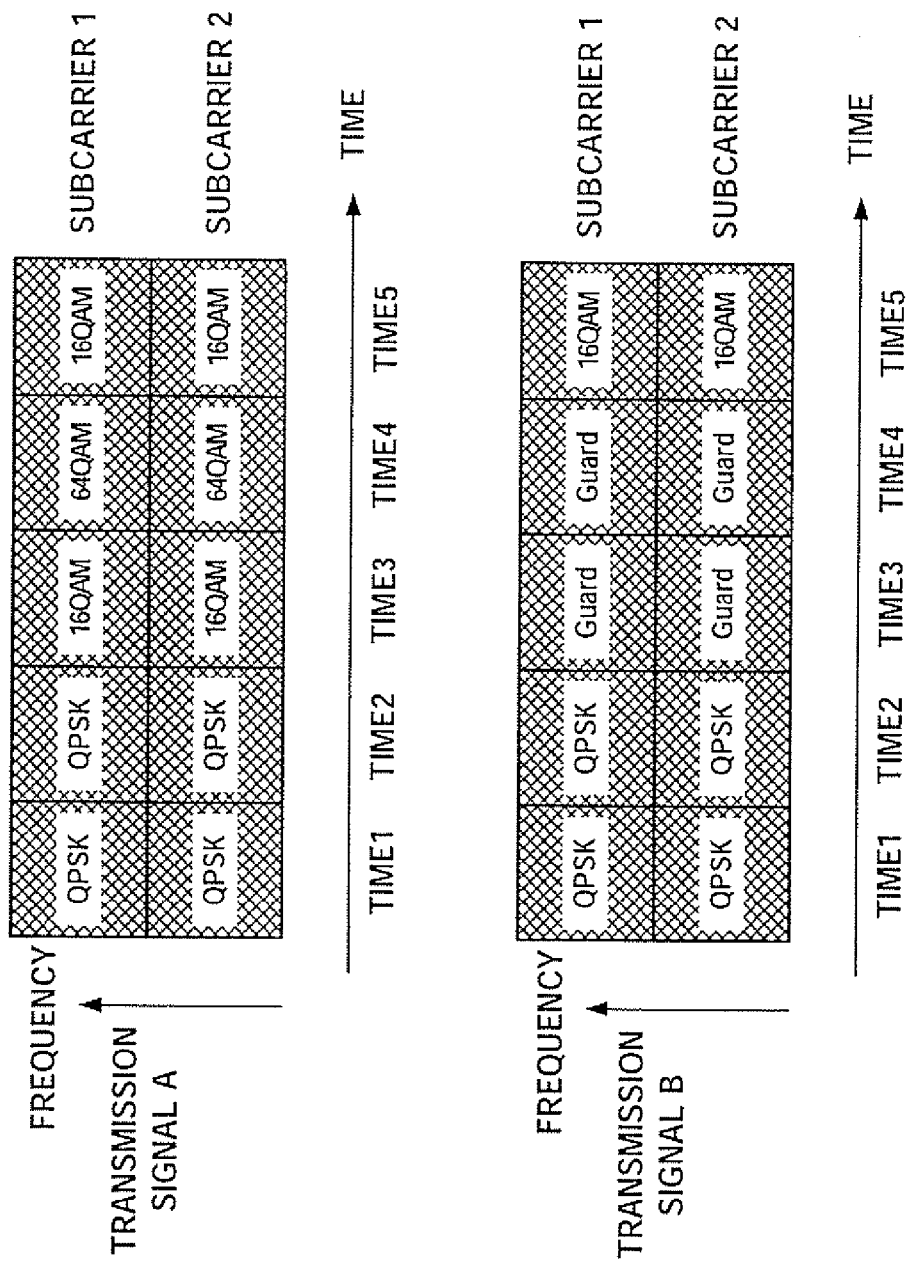

FIG. 14 is a block diagram illustrating a configuration of a base station apparatus according to Embodiment 7. In addition, in base station apparatus 1400 as shown in FIG. 14, structural sections common to base station apparatus 100 as shown in FIG. 1 are assigned the same reference numerals as in FIG. 1 to omit descriptions.

Base station apparatus 1400 as shown in FIG. 14 has the same configuration as that of base station apparatus 100 as shown in FIG. 1 except that modulation scheme control section 155 is eliminated and that communication method control section 1451, transmission power varying sections 1201-1 and 1201-2, antenna selecting section 1001 and transmission antenna 105-3 are added.

Dividing section 154 outputs the first and second information symbols to communication method control section 1451.

Communication method control section 1451 receives the first and second information symbols, reads the reception electric field strength of the entire system from the first information symbol, and further reads a value of the mean effective reception electric field strength from the second information symbol. Then, based on the values, communication method control section 1451 determines a modulation scheme, transmission power and transmission antennas. Communication method control section 1451 outputs a modulation scheme instruction signal to S/P sections 102-1 and 102-2, a transmission antenna instruction signal to antenna selecting section 1001, and a transmission power instruction signal to transmission power varying sections 1201-1 and 1201-2.

S/P section 102-1 receives the transmission digital signal, performs the serial/parallel transform processing, further performs the adaptive modulation processing according to the modulation scheme instruction signal from communication method control section 1451, and outputs parallel modulated signals to IDFT section 103-1. S/P section 102-2 receives the transmission digital signal, performs the serial/parallel transform processing, further performs the adaptive modulation processing according to the modulation scheme instruction signal from communication method control section 1451, and outputs parallel modulated signals to IDFT section 103-2.

Radio section 104-1 receives the transmission baseband signal, upconverts the baseband signal to generate a transmission signal A, and outputs the signal to transmission power varying section 1201-1. Radio section 104-2 receives the transmission baseband signal, upconverts the baseband signal to generate a transmission signal B, and outputs the signal to transmission power varying section 1201-2.

According to the transmission power instruction signal from communication method control section 1451, transmission power varying section 1201-1 varies the transmission power of the transmission signal A, and outputs the transmission signal A with the varied transmission power to antenna selecting section 1001. According to the transmission power instruction signal from communication method control section 1451, transmission power varying section 1201-2 varies the transmission power of the transmission signal B, and outputs the radio transmission signal B with the varied transmission power to antenna selecting section 1001.

According to the transmission antenna instruction signal from communication method control section 1451, antenna selecting section 1001 selects two different antennas from transmission antennas 105-1 to 105-3 as respective transmission antennas of transmission signals A and B, and transmits the transmission signal A and transmission signal B by wireless communications using the selected transmission antennas.

FIG. 15 is a view illustrating an example of frame structures of transmission signals A and B of the base station apparatus in this Embodiment, and the frame of each of the transmission signals A and B is comprised of symbol groups on a time or frequency basis.

Figure 16:
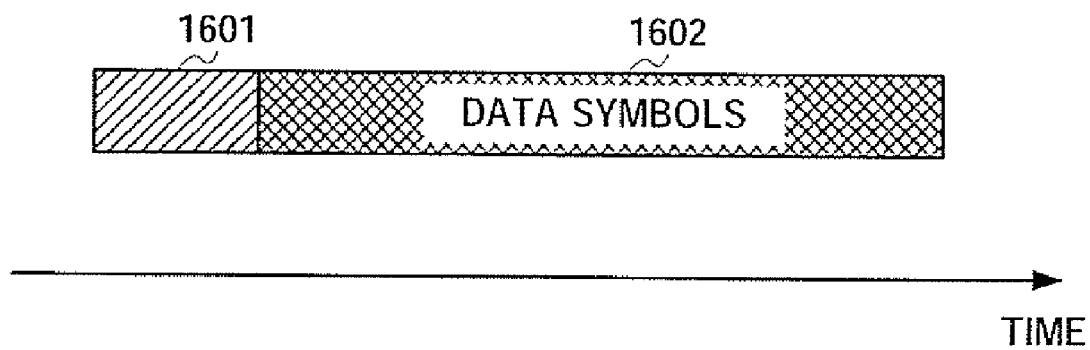
FIG. 16 is a view illustrating an example of a structure of each symbol group of the transmission signals in FIG. 15.

FIG. 16 is a view illustrating an example of a structure of each symbol group of the transmission signals A and B in FIG. 15. Each symbol group of the transmission signals A and B is comprised of channel estimation symbols 1601 and data symbols 1602. Data symbols 1602 are switched between Guard mode where a modulated signal does not exist and modes of QPSK, 16QAM and 64QAM as a modulation scheme.

In FIG. 15, it is assumed that at time 1, symbol groups of the transmission signals A and B are subjected to QPSK modulation, and transmitted in predetermined transmission power from transmission antennas 105-1 and 105-2, respectively.

In this case, communication terminal apparatus 200 calculates the mean effective reception electric field strength and the reception electric field strength of the entire system from channel estimation symbols 1601 as shown in FIG. 16, and transmits the calculated values to base station apparatus 1400.

Communication method control section 1451 of base station apparatus 1400 determines the communication method (modulation scheme, transmission power and transmission antennas), based on the mean effective reception electric field strength and the reception electric field strength of the entire system.

For example, a case is assumed that at time 1, there is little difference between the mean effective reception electric field strength and the reception electric field strength of the entire system, and that the reception electric field strength of the entire system is electric field strength suitable for QPSK modulation. In this case, communication method control section 1451 determines to increase the transmission power of the transmission signals A and B, while not varying the modulation scheme and transmission antennas.

By this means, at time 2, symbol groups of the transmission signals A and B are subjected to QPSK modulation and transmitted with the transmission power higher than that at time 1 from transmission antennas 105-1 and 105-2, respectively.

It is next assumed that at time 2, there is a large difference between the mean effective reception electric field strength and the reception electric field strength of the entire system, and that the reception electric field strength of the entire system is electric field strength suitable for 16QAM. In this case, communication method control section 1451 determines that a modulation scheme of the transmission signal A is 16QAM, the transmission signal B has guard symbols (data symbols 1602 are not transmitted), the transmission power is increased, and the transmission antennas are not varied.

By this means, at time 3, the symbol groups of the transmission signal A are subjected to 16QAM, and transmitted in transmission power higher than that at time 2 from transmission antenna 105-1, and only the channel estimation symbols of the transmission signal B are transmitted in transmission power higher than that at time 2 from transmission antenna 105-2. In addition, as time 3, by transmitting a signal with the increased modulation level from a single transmission antenna, it is possible to improve the reception quality while reserving the transmission capacity, as compared with the state that signals have been transmitted from two transmission antennas.

It is assumed that at time 3, there is a large difference between the mean effective reception electric field strength and the reception electric field strength of the entire system, and that the reception electric field strength of the entire system is electric field strength suitable for 64QAM. In this case, communication method control section 1451 determines that a modulation scheme of the transmission signal A is 64QAM, the transmission signal B has guard symbols, the transmission power is not varied, and the transmission signals A and B are transmitted from transmission antennas 105-1 and 105-3, respectively. By switching the transmission antennas herein, values of elements of the matrix in eq. (1) are varied, an eigenvalue is changed, a possibility is thus arises that the mean effective reception electric field strength is improved, and it is thereby possible to increase the number of multiplexed transmission signals, thus enabling an increased data transmission rate.

By this means, at time 4, the symbol groups of the transmission signal A are subjected to 64QAM, and transmitted in the same transmission power as that at time 3 from transmission antenna 105-1, while only the channel estimation symbols of the transmission signal B are transmitted in the same transmission power as that at time 3 from transmission antenna 105-3.

It is assumed that at time 4, there is a small difference between the mean effective reception electric field strength and the reception electric field strength of the entire system, and that the reception electric field strength of the entire system is electric field strength suitable for 16QAM. In this case, communication method control section 1451 determines that 16QAM is a modulation scheme for the transmission signals A and B, the transmission power is increased, and the transmission signals A and B are transmitted from transmission antennas 105-1 and 105-3, respectively.

By this means, at time 5, symbol groups of the transmission signals A and B are subjected to 16QAM, and transmitted in the transmission power higher than that at time 4 from transmission antennas 105-1 and 105-3, respectively.

Thus, in the system where multi antennas is used in both transmission and reception, by varying the communication method based on the reception electric field strength of the entire system and the effective reception electric field strength, it is possible to perform the control in consideration of relative relationships between channels, and it is thereby possible to improve the reception quality.

Embodiment 8

Embodiment 8 describes the case where in single-carrier communications using MIMO, a communication method is varied based on the reception electric field strength of the entire system and effective reception electric field strength. In addition, a configuration of a communication terminal apparatus of this Embodiment is the same as that of communication terminal apparatus 200 in FIG. 2 as described in Embodiment 1, and descriptions thereof are omitted.

Figure 17:
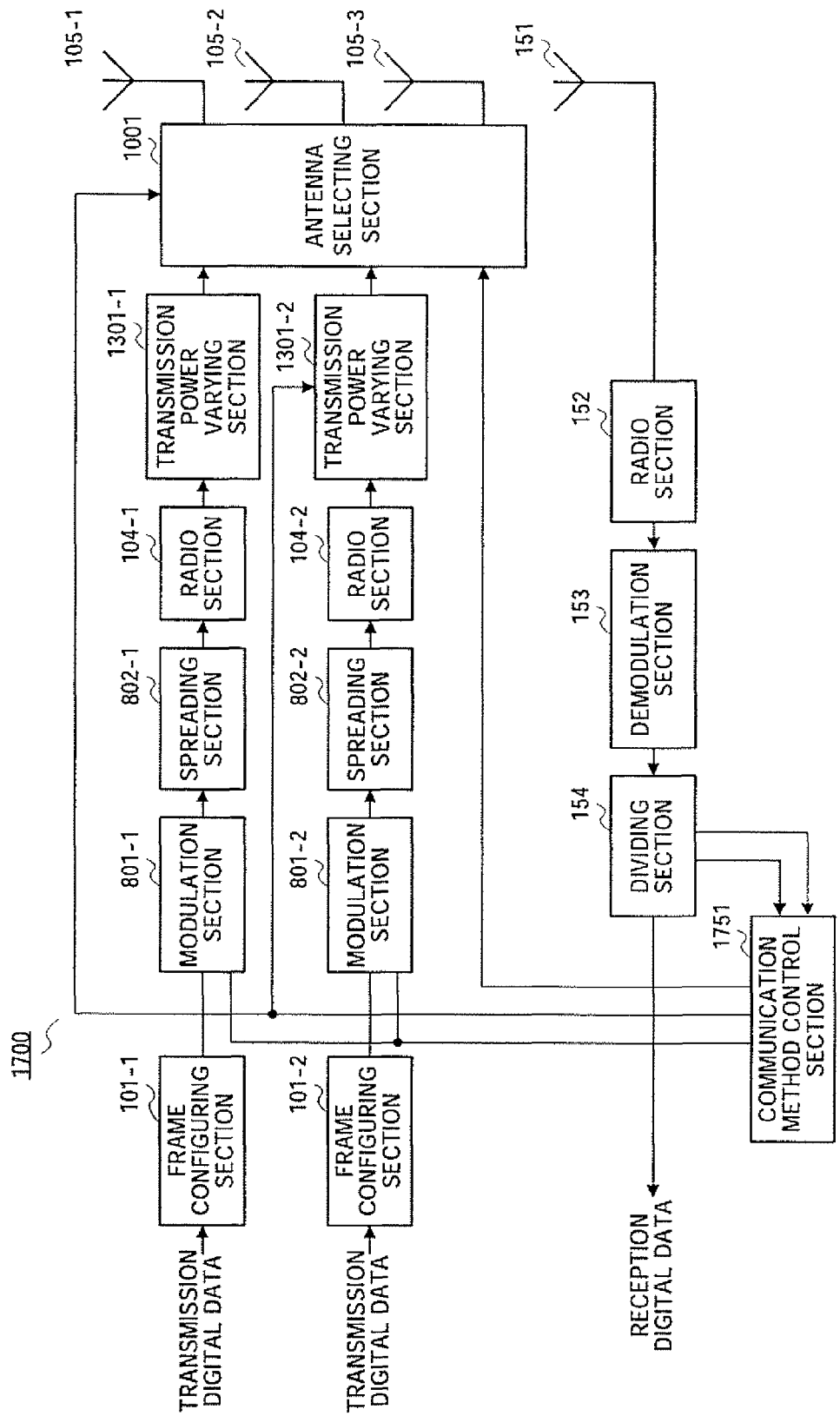
FIG. 17 is a block diagram illustrating a configuration of a base station apparatus according to Embodiment 8.

FIG. 17 is a block diagram illustrating a configuration of a base station apparatus according to Embodiment 8. In addition, in base station apparatus 1700 as shown in FIG. 17, structural sections common to base station apparatus 800 as shown in FIG. 8 are assigned the same reference numerals as in FIG. 8 to omit descriptions.

Base station apparatus 1700 as shown in FIG. 17 has the same configuration as that of base station apparatus 800 as shown in FIG. 8 except that modulation scheme control section 155 is eliminated and that communication method control section 1751, transmission power varying sections 1301-1 and 1301-2, antenna selecting section 1101 and transmission antenna 105-3 are added.

Dividing section 154 outputs the first and second information symbols to communication method control section 1751.

Communication method control section 1751 receives the first and second information symbols, reads the reception electric field strength of the entire system from the first information symbol, and further reads a value of the mean effective reception electric field strength from the second information symbol. Then, based on the values, communication method control section 1751 determines a modulation scheme, transmission power and transmission antennas. Communication method control section 1751 outputs a modulation scheme instruction signal to modulation sections 801-1 and 8012, a transmission antenna instruction signal to antenna selecting section 1101, and a transmission power instruction signal to transmission power varying sections 1301-1 and 1301-2.

Modulation section 801-1 receives the transmission digital signal to perform the adaptive modulation processing according to the modulation scheme instruction signal from communication method control section 1751, and outputs a modulated signal to spreading section 802-1. Modulation section 801-2 receives the transmission digital signal to perform the adaptive modulation processing according to the modulation scheme instruction signal from communication method control section 1751, and outputs a modulated signal to spreading section 802-2.

Radio section 104-1 receives the transmission baseband signal, upconverts the baseband signal to generate a transmission signal A, and outputs the signal to transmission power varying section 1301-1. Radio section 104-2 receives the transmission baseband signal, upconverts the baseband signal to generate a transmission signal B, and outputs the signal to transmission power varying section 1301-2.

According to the transmission power instruction signal from transmission power control section 1751, transmission power varying section 1301-1 varies the transmission power of the transmission signal A, and outputs the transmission signal A with the varied power to antenna selecting section 1101. According to the transmission power instruction signal from transmission power control section 1751, transmission power varying section 1301-2 varies the transmission power of the transmission signal B, and outputs the transmission signal B with the varied transmission power to antenna selecting section 1101.

According to the transmission antenna instruction signal from communication method control section 1751, antenna selecting section 1001 selects two different antennas from transmission antennas 105-1 to 105-3 as respective transmission antennas of transmission signals A and B, and transmits the transmission signals A and B by wireless communications using the selected transmission antennas.

Thus, in the system where multi antennas is used in both transmission and reception, by varying the communication method based on the reception electric field strength of the entire system and the effective reception electric field strength, it is possible to perform the control in consideration of relative relationships between channels, and it is thereby possible to improve the reception quality.

Embodiment 9

Embodiment 9 describes the case where in multi-carrier communications, MIMO communications and communications (hereinafter, referred to as "coding communications") where predetermined coding is carried out are switched based on the reception electric field strength of the entire system and effective reception electric field strength. Coding communications has a lower transmission rate than that of MIMO communications, but is capable of obtaining transmission diversity gain without depending on transmission channels, and therefore, provides increased transmission quality. In addition, the coding method is not limited in the present invention, and either coding is available such as space-time coding, space-frequency coding and space-time-frequency coding.

Figure 18:
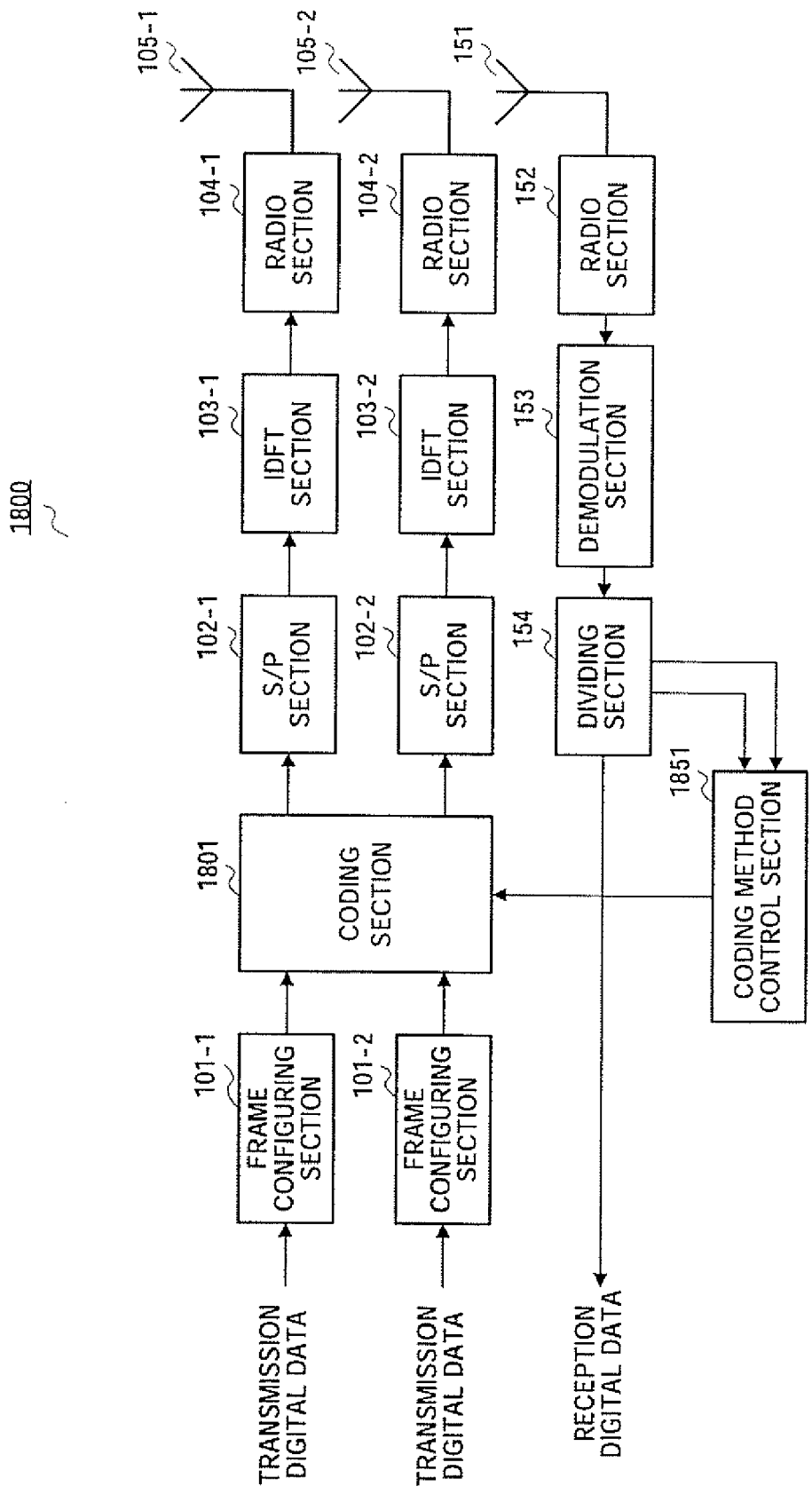
FIG. 18 is a block diagram illustrating a configuration of a base station apparatus according to Embodiment 9.

FIG. 18 is a block diagram illustrating a configuration of a base station apparatus according to Embodiment 9. In addition, in base station apparatus 1800 as shown in FIG. 18, structural sections common to base station apparatus 100 as shown in FIG. 1 are assigned the same reference numerals as in FIG. 1 to omit descriptions.

Base station apparatus 1800 as shown in FIG. 18 has the same configuration as that of base station apparatus 100 as shown in FIG. 1 except that modulation scheme control section 155 is eliminated and that coding method control section 1851 and coding section 1801 are added.

Dividing section 154 outputs the first and second information symbols to coding method control section 1851.

Coding method control section 1851 receives the first and second information symbols, reads the reception electric field strength of the entire system from the first information symbol, and further reads a value of the mean effective reception electric field strength from the second information symbol. Then, based on the values, coding method control section 1851 determines whether to perform MIMO communications or coding communications. More specifically, coding method control section 1851 calculates a difference X between the reception electric field strength of the entire system and the mean effective reception electric field strength, and determines to perform MIMO communications when the difference X is less than a predetermined threshold, while determining to perform coding communications when the difference X is more than or equal to the predetermined threshold. Then, coding method control section 1851 outputs a control signal (hereinafter, referred to as "communication method instruction signal") for instructing the determined communication method to coding section 1801.

Each of frame configuring sections 101-1 and 101-2 receives as its input transmission digital data, inserts a channel estimation symbol and guard symbol to the transmission digital data to generate a transmission digital signal, and outputs the signal to coding section 1801.

Coding section 1801 receives the transmission digital signal, performs coding processing when the coding communications is instructed by the communication method instruction signal from coding method control section 1851, and outputs the coded transmission digital signal to S/P sections 102-1 and 102-2. Meanwhile, coding section 1801 receives the transmission digital signal, does not perform the coding processing when MIMO communications is instructed by the communication method instruction signal from coding method control section 1851, and outputs the transmission digital signal to S/P sections 102-1 and 102-2.

Figure 19:
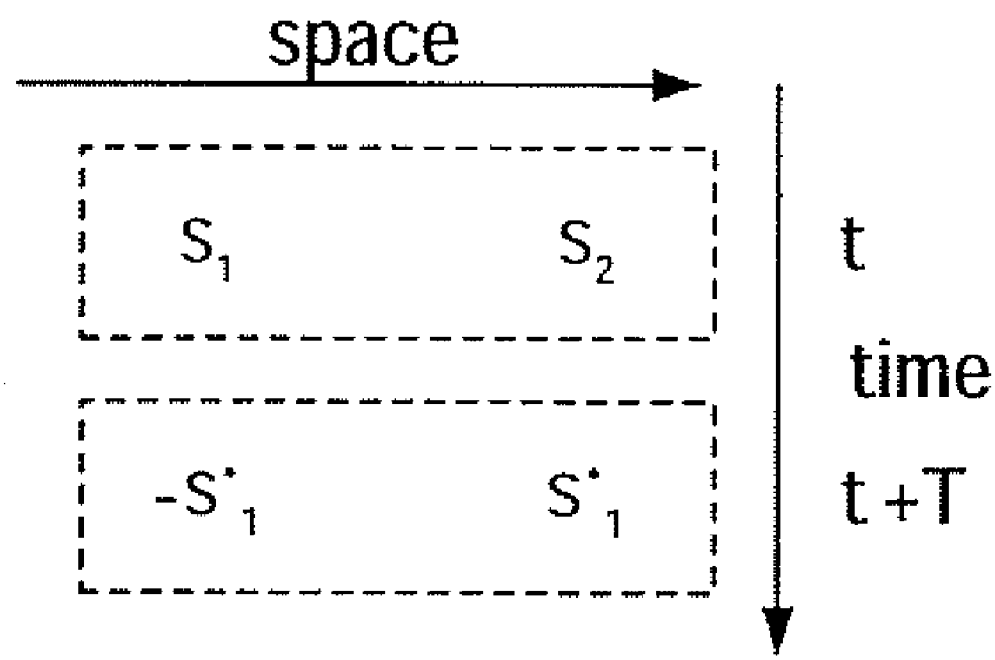
FIG. 19 is a view illustrating an example of a space-time coding method in Embodiment 9.

FIG. 19 is a view illustrating an example of space-time coding in this Embodiment. The space-time coding method is described in "Space-Time Block Codes from Orthogonal Designs", IEEE TRANSACTIONS OF INFORMATION THEORY, pp 1456-1467, vol. 45, no. 5, July 1999".

In the case of FIG. 19, base station apparatus 1800 transmits a signal $S_1$ from transmission antenna 105-1 and a signal $S_2$ from transmission antenna 105-2 at time t, and further transmits a signal $-S_2^*$ from transmission antenna 105-1 and a signal $S_1^*$ from transmission antenna 105-2 at time t+T (* indicates a complex conjugate).

Figure 20:
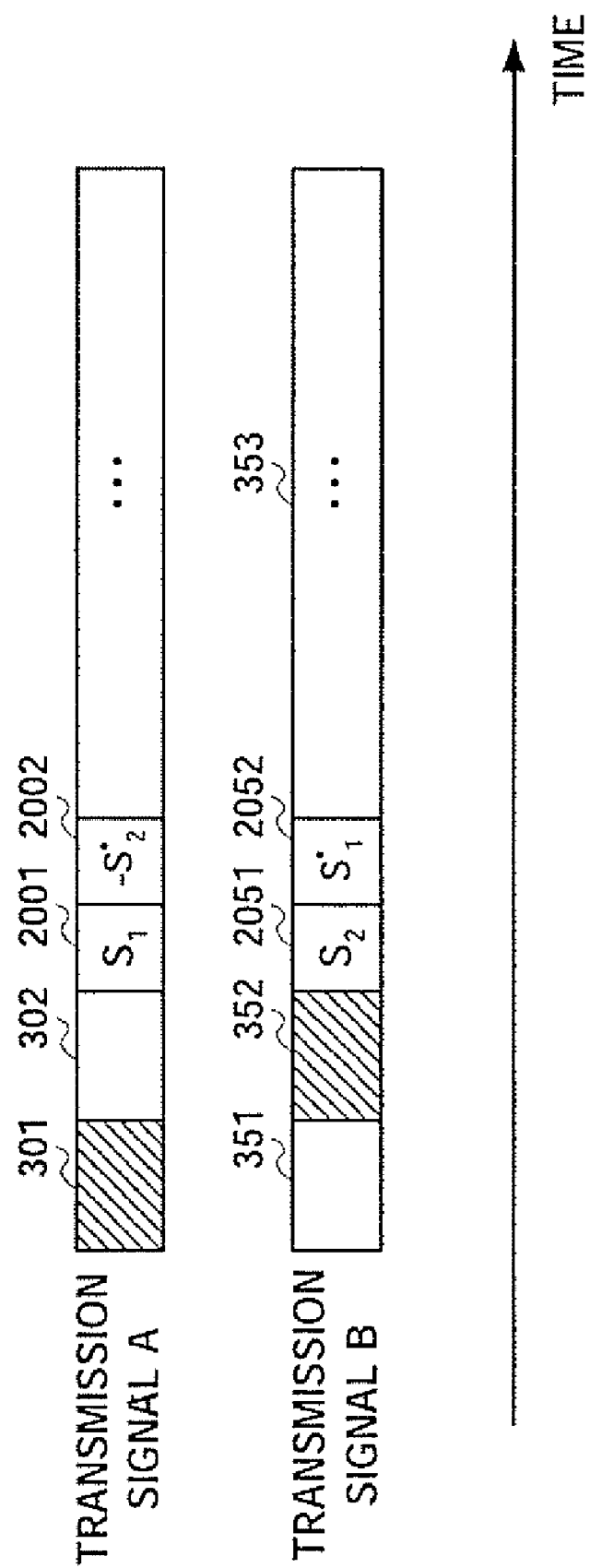
FIG. 20 is a view illustrating an example of frame structures of transmission signals in the case of performing coding as shown in FIG. 19.

FIG. 20 is a view illustrating an example of frame structures of transmission signals in the case where base station apparatus 1800 performs coding as shown in FIG. 19. In addition, in FIG. 20, portions common to FIG. 3 are assigned the same reference numerals as in FIG. 3 to omit descriptions.

In FIG. 20, in the transmission signal A, a frame is comprised of channel estimation symbol 301, guard symbol 302, coded signal 2001 and coded signal 2002 in this order. Meanwhile, in the transmission signal B, a frame is comprised of guard symbol 351, channel estimation symbol 352, coded signal 2051 and coded signal 2052 in this order.

When it is assumed that $h1(t)$ is channel variations the signal $S_1$ and signal $-S_2^*$ of the transmission signal A of FIG. 20 undergo on the transmission path, and that $h2(t)$ is channel variations the signal $S_2$ and signal $S_1^*$ of the transmission signal B of FIG. 20 undergo on the transmission path, the communication terminal apparatus receives a signal (R1) obtained by combining the signals $S_1$ and $S_2$ at time t, and further receives a signal (R2) obtained by combining the signals $-S_2^*$ and $S_1^*$ at time t+T. As a result, the determinant of following equation (2) is established.

$$\begin{pmatrix} R1 \\ -R2^* \end{pmatrix} = \begin{pmatrix} h1 & h2 \\ -h2^* & h1^* \end{pmatrix} \begin{pmatrix} S1 \\ S2 \end{pmatrix} \qquad (2)$$

The communication terminal apparatus of this Embodiment has the same configuration as that of communication terminal apparatus 200 in FIG. 2 as described in Embodiment 1 except details of the processing in signal processing section 206.

At the time of coding communications, for example, signal processing section 206 in the communication terminal apparatus calculates an inverse matrix of the channel matrix of eq. (2) multiplies the both sides of eq. (2) by the inverse matrix from the left side to decode, and demodulates the transmission signals $S_1$ and $S_2$.

By the base station apparatus thus encoding signals to transmit, transmission signal vectors from the transmission antennas become orthogonal to one another, and the communication terminal apparatus is capable of demodulating received signals without amplifying noises.

In addition, in this Embodiment, also at the time of coding communications, the communication terminal apparatus calculates an eigenvalue corresponding to the channel matrix of eq. (1), and obtains the reception electric field strength of the entire system and the mean effective reception electric field strength to transmit to the base station apparatus.

Figure 21:
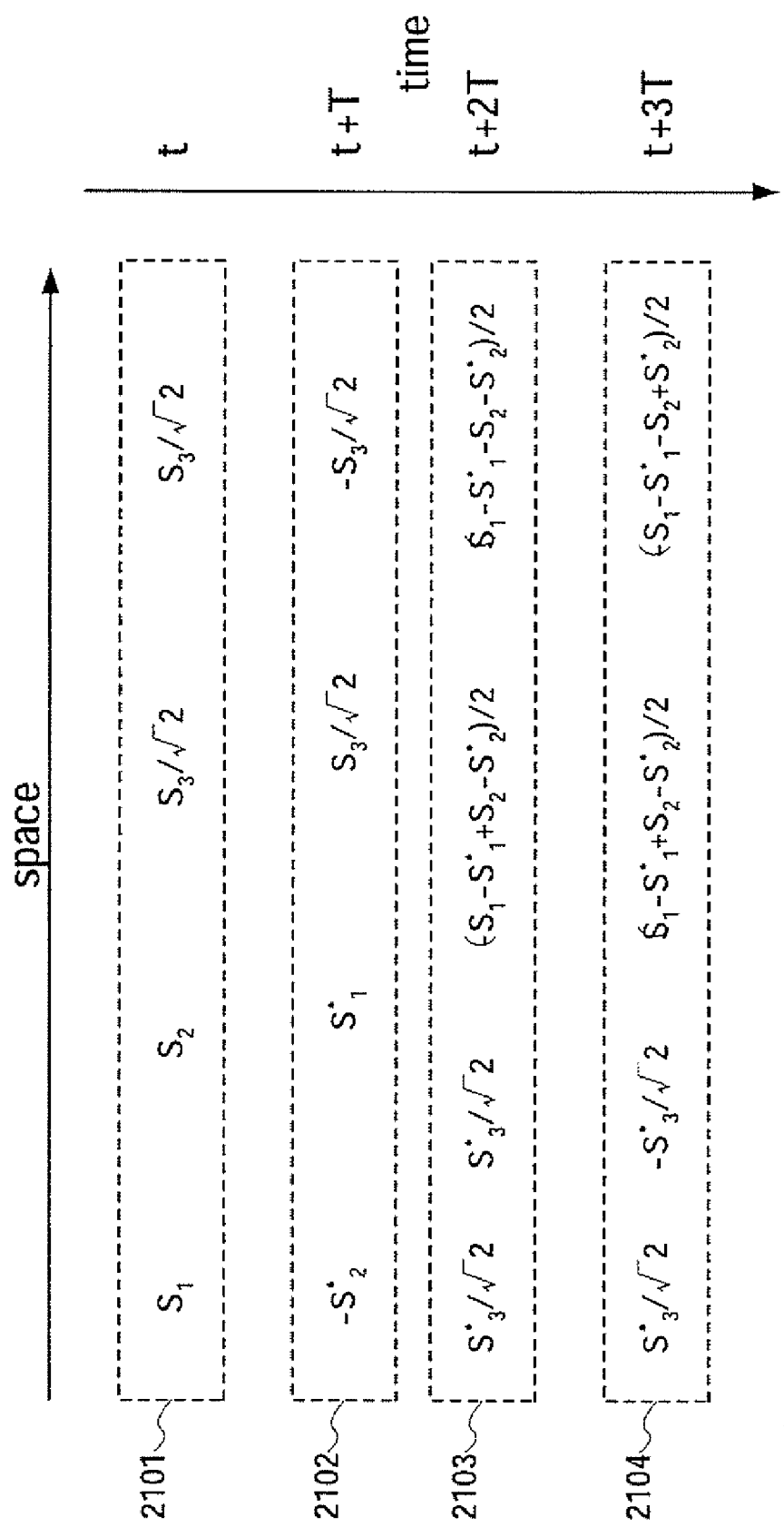
FIG. 21 is a view illustrating an example of the space-time coding method in the case of four transmission antennas in Embodiment 9.

FIG. 21 is a view illustrating an example of the space-time coding method in the case of four transmission antennas in this Embodiment. In addition, the space-time coding method is described in "Space-Time Block Coding for Wireless Communications: Performance Results", IEEE JOURNAL ON SELECTED AREAS IN COMMUNICATIONS, pp 451-460, vol. 17, no. 3, March 1999.

In the case of FIG. 21, the base station apparatus transmits signal group 2101 from each of the transmission antennas at time t, transmits signal group 2102 from each of the transmission antennas at time t+T, transmits signal group 2103 from each of the transmission antennas at time t+2T, and further transmits signal group 2104 from each of the transmission antennas at time t+3T.

Figure 22:
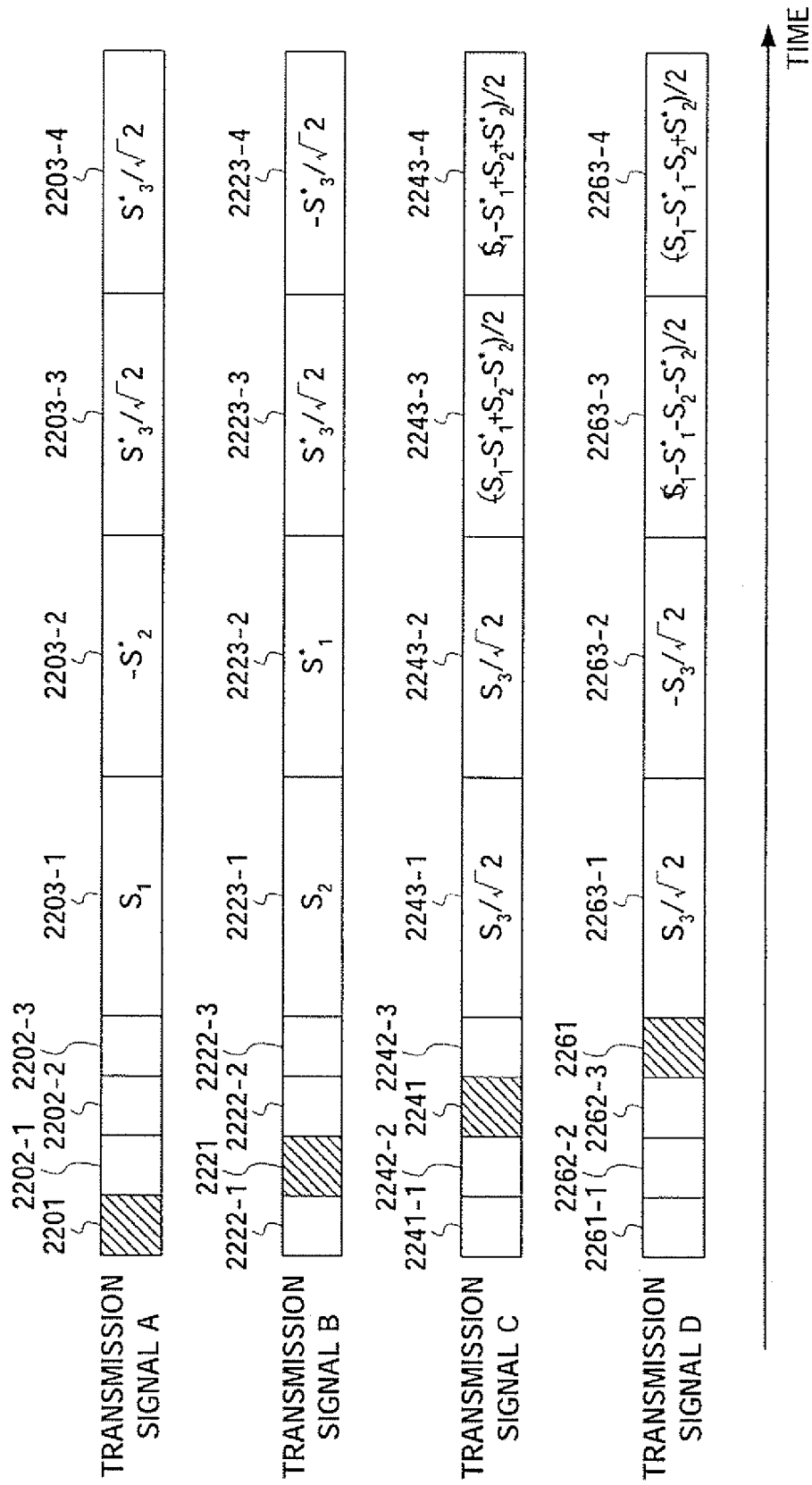
FIG. 22 is a view illustrating an example of frame structures of transmission signals in the case of performing coding as shown in FIG. 21.

FIG. 22 is a view illustrating an example of frame structures of transmission signals of the base station apparatus in the case of performing the coding method as shown in FIG. 21. In addition, in FIG. 22, portions common to FIG. 3 are assigned the same reference numerals as in FIG. 3 to omit descriptions.

In FIG. 22, in the transmission signal A, a frame is comprised of channel estimation symbol 2201, guard symbols 2202-1, 2202-2 and 2202-3, and coded signals 2203-1, 2203-2, 2203-3 and 2203-4 in this order. In the transmission signal B, a frame is comprised of guard symbol 2222-1, channel estimation symbol 2221, guard symbols 2222-2 and 2222-3, and coded signals 2223-1, 2223-2, 2223-3 and 2223-4 in this order. In the transmission signal C, a frame is comprised of guard symbols 2242-1 and 2242-2, channel estimation symbol 2241, guard symbol 2242-3, and coded signals 2243-1, 2243-2, 2243-3 and 2243-4 in this order. In the transmission signal D, a frame is comprised of guard symbols 2262-1, 2262-2 and 2262-3, channel estimation symbol 2261, and coded signals 2263-1, 2263-2, 2263-3 and 2263-4 in this order. By transmitting such frame structures, transmission signal vectors from the transmission antennas become orthogonal to one another, and the communication terminal apparatus is capable of demodulating received signals without amplifying noises.

Figure 23:
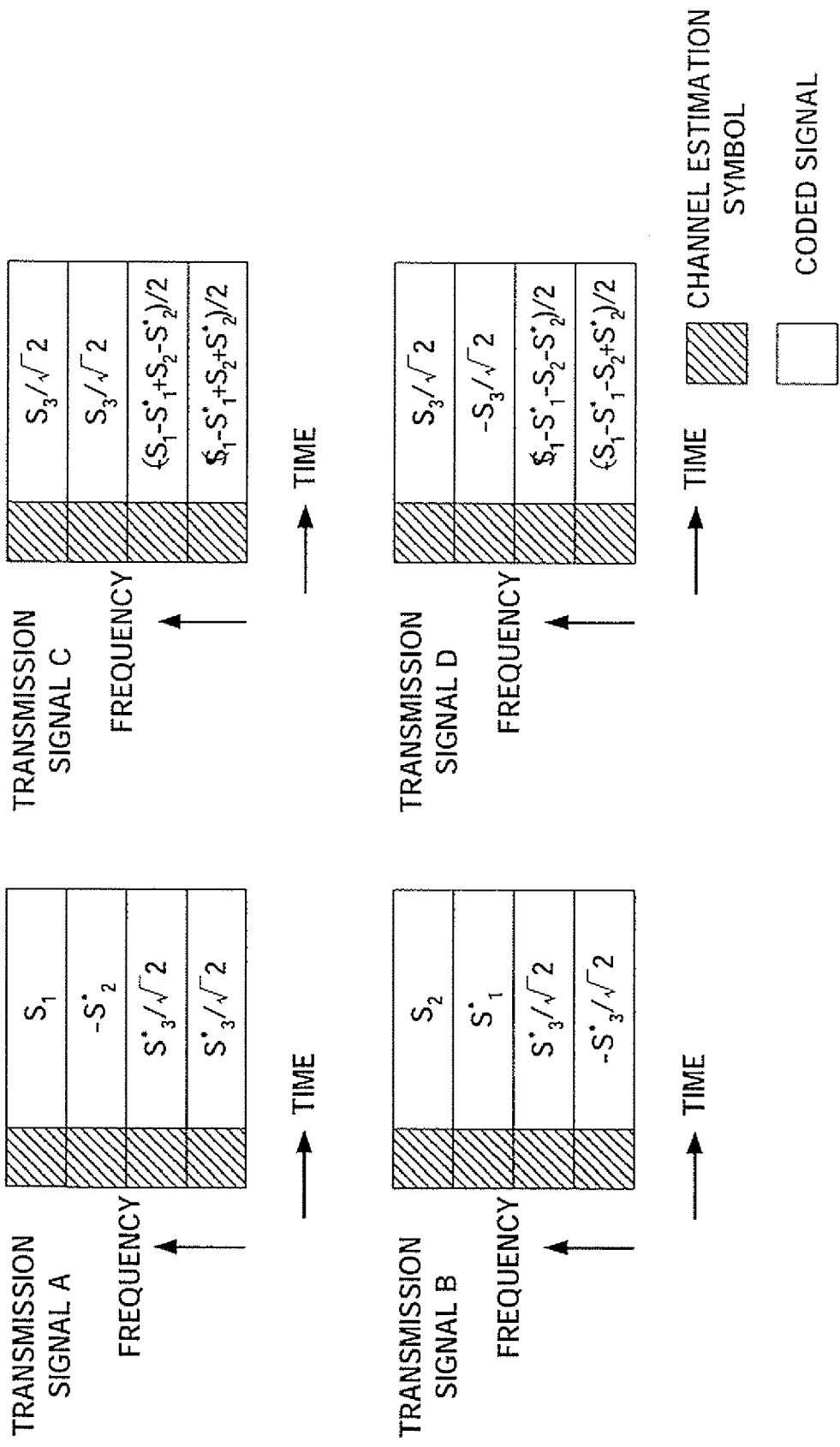
FIG. 23 is a view illustrating an example of frame structures of transmission signals of the base station apparatus in the case where a space-frequency coding method is carried out using four transmission antennas in Embodiment 9.
Figure 24:
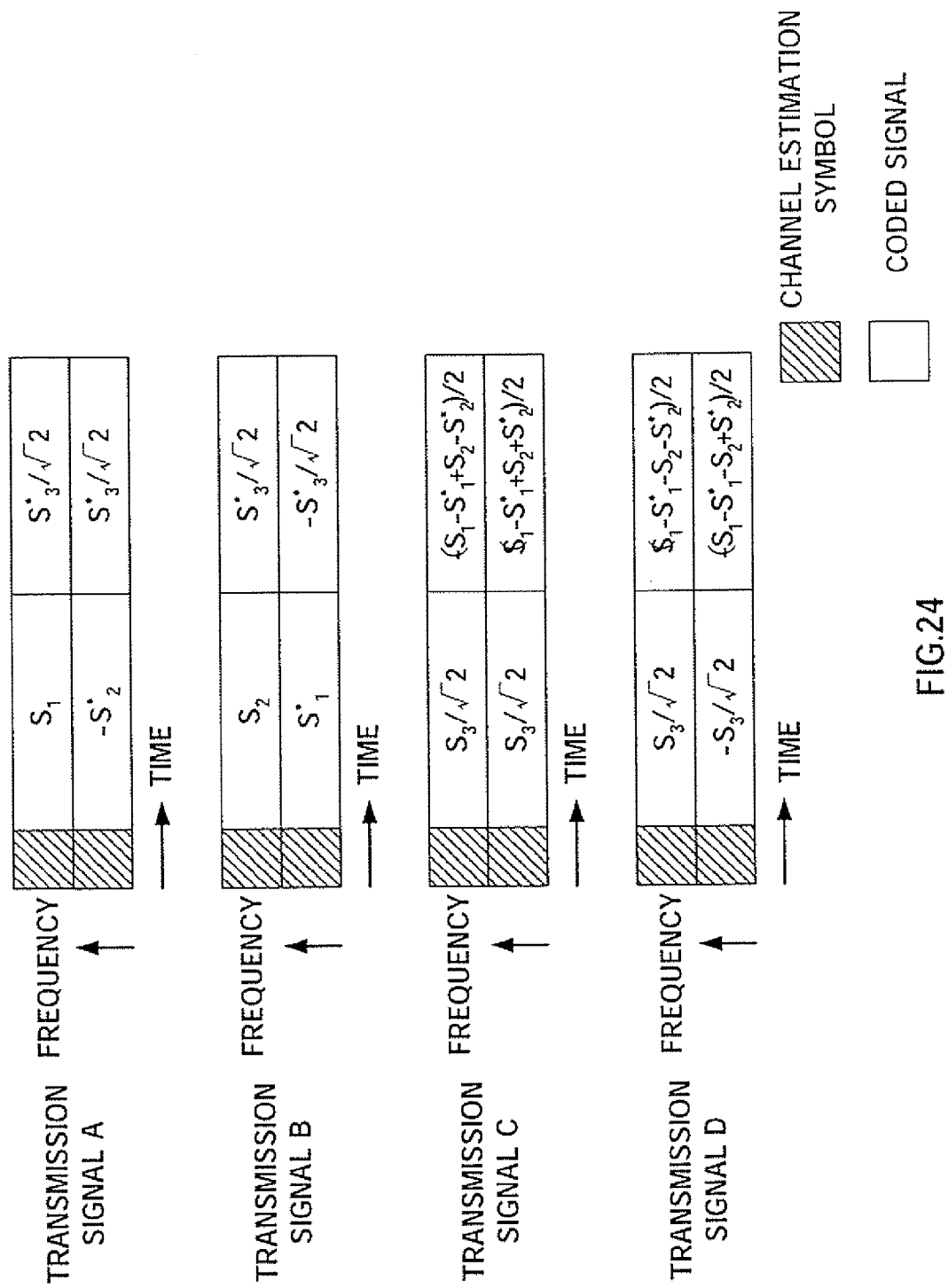
FIG. 24 is a view illustrating an example of frame structures of transmission signals of the base station apparatus in the case where a space-time-frequency coding method is carried out using four transmission antennas in Embodiment 9.

FIG. 23 is a view illustrating an example of frame structures of transmission signals of the base station apparatus in the case where a space-frequency coding method is carried out using four transmission antennas in this Embodiment. Signals are arranged in the time axis direction in FIG. 22, while signals are arranged in the frequency axis direction in FIG. 23. FIG. 24 is a view illustrating an example of frame structures of transmission signals of the base station apparatus in the case where a space-time-frequency coding method is carried out using four transmission antennas in this Embodiment.

Figure 25:
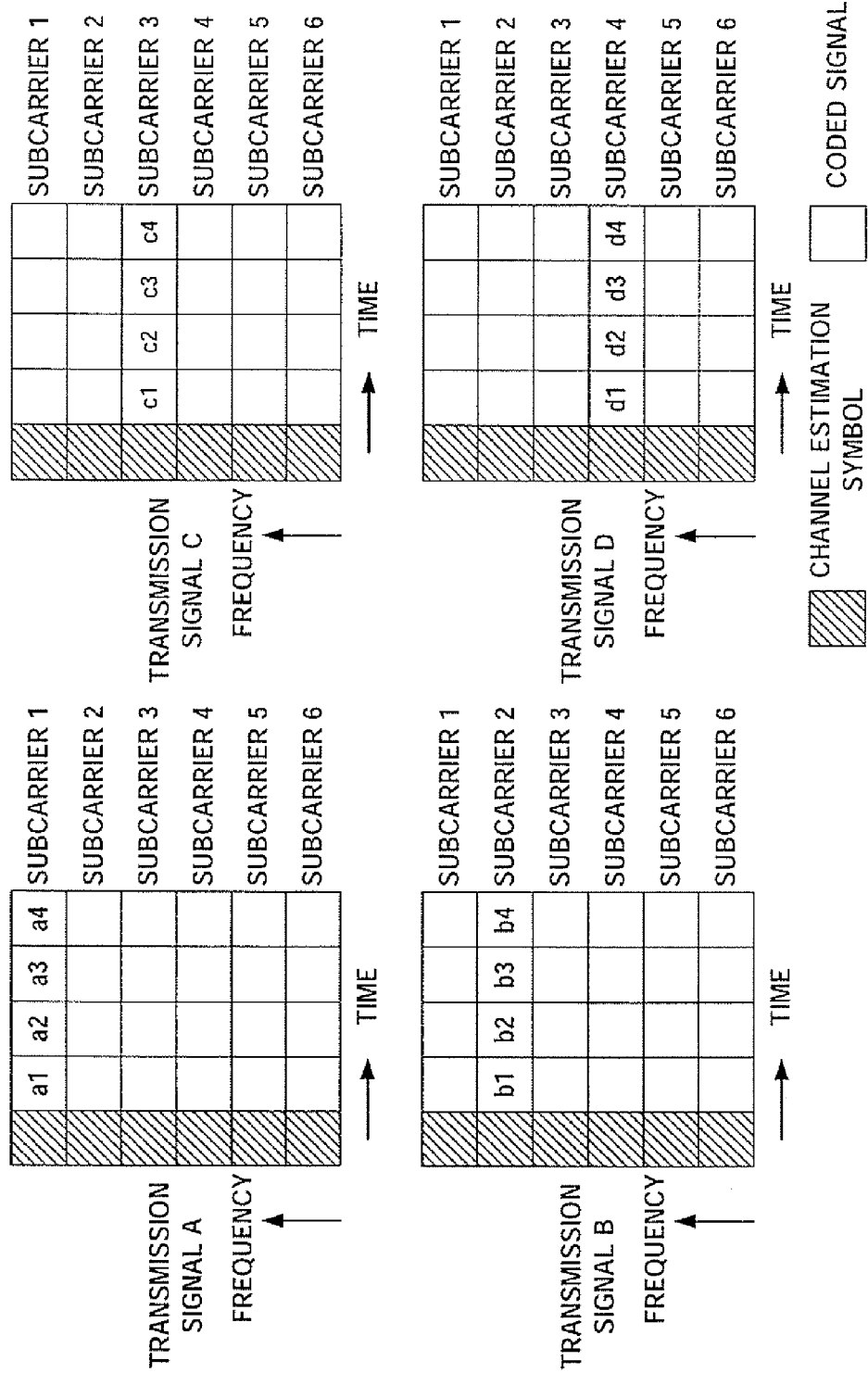
FIG. 25 is a view illustrating an example of frame structures of transmission signals of the base station apparatus in the case where a space-time coding method is carried out using four transmission antennas in Embodiment 9.
Figure 26:
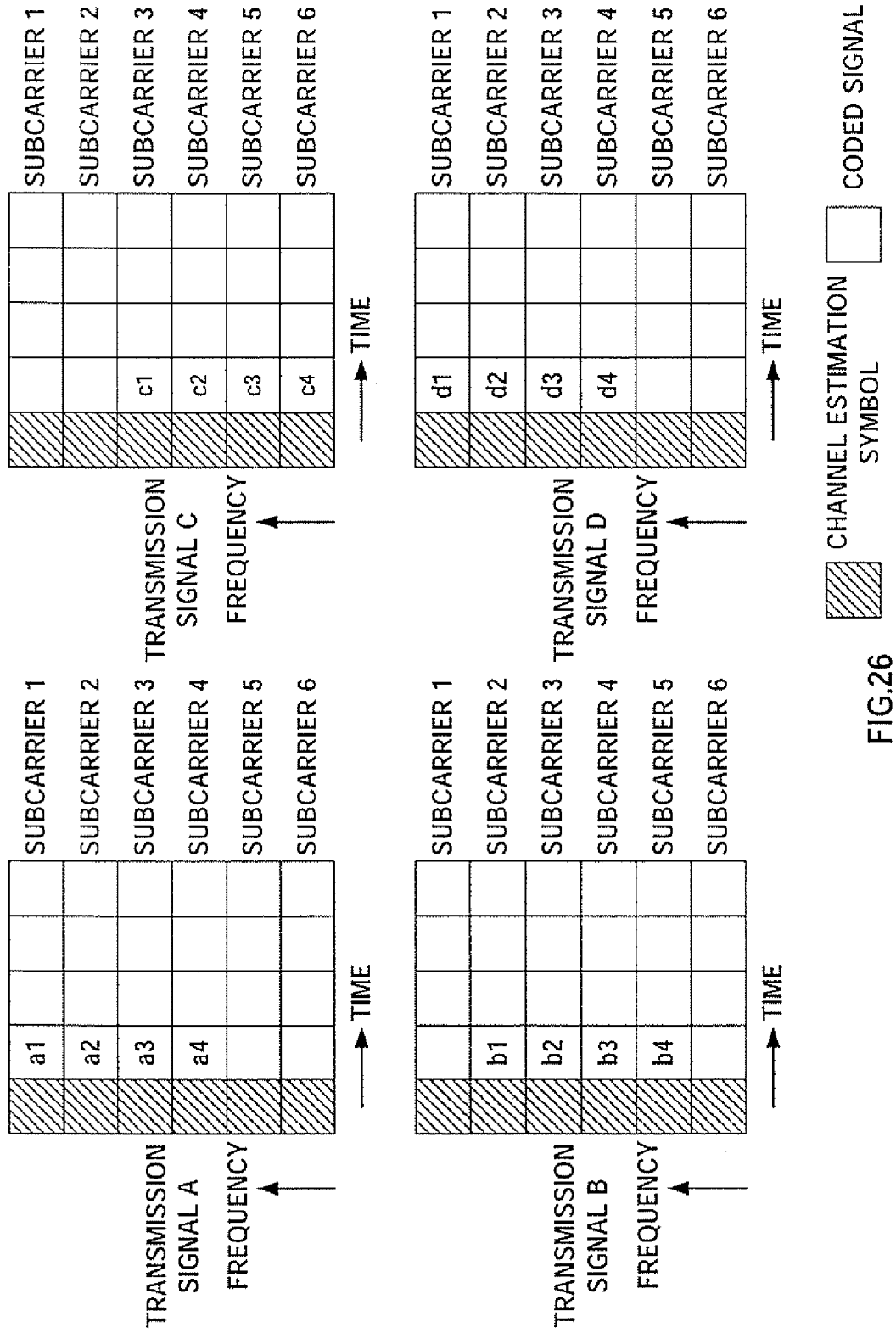
FIG. 26 is a view illustrating an example of frame structures of transmission signals of the base station apparatus in the case where a space-frequency coding method is carried out using four transmission antennas in Embodiment 9.
Figure 27:
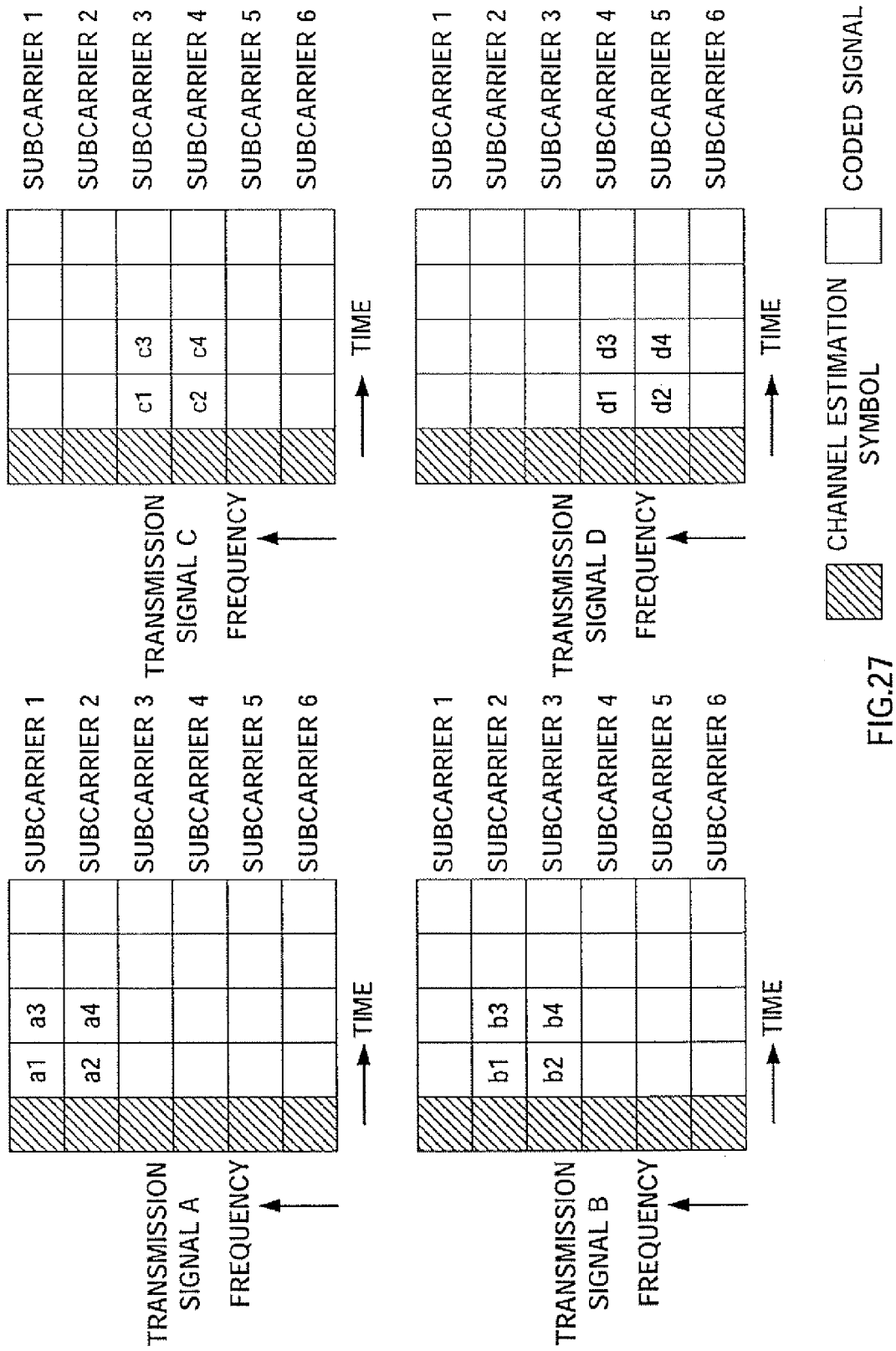
FIG. 27 is a view illustrating an example of frame structures of transmission signals of the base station apparatus in the case where a space-time-frequency coding method is carried out using four transmission antennas in Embodiment 9.

FIG. 25 is a view illustrating an example of frame structures of transmission signals of the base station apparatus in the case where a space-time coding method is carried out using four transmission antennas in this Embodiment. FIG. 26 is a view illustrating an example of frame structures of transmission signals of the base station apparatus in the case where a space-frequency coding method is carried out using four transmission antennas in this Embodiment. FIG. 27 is a view illustrating an example of frame structures of transmission signals of the base station apparatus in the case where a space-time-frequency coding method is carried out using four transmission antennas in this Embodiment.

In descriptions of FIGS. 25 to 27, a1 to a4 represent coded signals of the transmission signal A, b1 to b4 represent coded signals of the transmission signal B, c1 to c4 represent coded signals of the transmission signal C, and d1 to d4 represent coded signals of the transmission signal D.

In the case of four transmission antennas, the base station apparatus selects either of coding methods as shown in FIGS. 25 to 27, based on the difference X between the reception electric field strength of the entire system and the mean effective reception electric field strength.

For example, when the reception electric field strength falls in the subcarrier of the transmission signal A of FIG. 22, the reception quality of the transmission signal A deteriorates, and the reception quality of $S_1$, $S_2$ and $S_3$ deteriorates. In order to solve the problem, coding is carried out on the frequency axis as shown in FIGS. 23 and 26. By this means, for example, even when the reception electric field strength falls in the subcarrier for transmitting information a1 of the transmission signal A, unless the reception electric field strengths fall in the subcarriers for transmitting a2, a3 and a4, it is possible to suppress deterioration of the reception quality of $S_1$, $S_2$ and $S_3$.

When the multi-carrier system such as the OFDM system is used, as shown in FIGS. 24 and 27, it is possible to perform space-time-frequency coding. It is thereby possible to secure the orthogonality or quasi-orthogonality between transmission signal vectors in reception apparatuses. In order to secure the orthogonality or quasi-orthogonality, it is desired to suppress spreading of transmission signal vectors on the time axis and frequency axis as possible to enhance the correlation between channels. For example, transmission signal vectors are spread on the time axis when symbols are arranged only on the time axis as shown in FIG. 22, while transmission signal vectors are spread on the frequency axis when symbols are arranged only on the frequency axis as shown in FIG. 23, and it is thus difficult to secure the orthogonality and quasi orthogonality. Therefore, in order to secure a higher degree of the orthogonality and quasi orthogonality, it is preferred to perform coding on the time-frequency axes direction as shown in FIG. 27. The switching is made, for example, based on predetermined two thresholds. It is thus possible to ensure the reception quality of $S_1$, $S_2$ and $S_3$.

Thus, in the system where multi antennas is used in both transmission and reception, by switching the communication method or varying the coding method based on the reception electric field strength of the entire system and the effective reception electric field strength, it is possible to perform the control in consideration of relative relationships between channels, and it is thereby possible to improve the reception quality.

Herein, a large difference between the mean effective reception electric field strength and the reception electric field strength of the entire system and means that a difference is large between eigenvalues and that correlation of vectors is high in the channel matrix. When the correlation between channels is thus high, in terms of effective use of signal power, it is not efficient to demultiplex and demodulate multiplexed signals.

Figure 28:
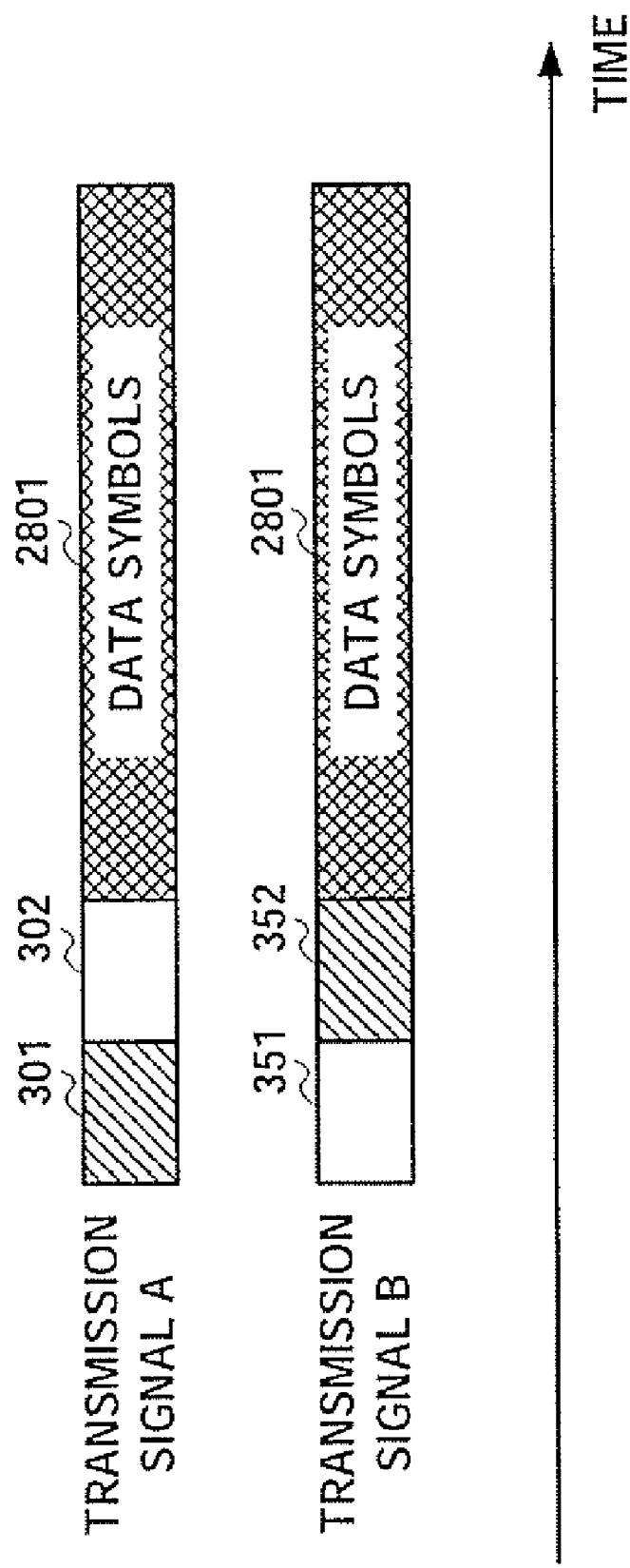
FIG. 28 is a view illustrating an example of frame structures of transmission signals of the base station apparatus in Embodiment 9.

Hence, in this Embodiment, in coding communications, coding section 1801 substitutes frame structures where transmission signals A and B have same data symbols 2801 as shown in FIG. 28 for frame structures as shown in FIG. 20. In this way, since signals are transmitted using channels with high correlation, it is possible to obtain the path diversity effect, use efficiently the signal power, and reserve the desired reception quality. At this point, it is possible to transmit signals from only a single antenna as at time 3 and 4 shown in FIG. 15. In this case, the path diversity effect is not obtained, but the signal power can also be used efficiently.

However, in this case, the transmission rate is half that of the case of transmitting different data symbols using the transmission signals A and B. Then, by using the high signal power, for example, the modulation scheme of the transmission signal is varied to increase the modulation level, or coding rate R is increased, and it is thereby possible to perform transmission without decreasing the transmission rate of the transmission signals.

In addition, this Embodiment describes space-time coding as a coding method, but the present invention is not limited to such a method, and is capable of being carried into practice similarly using other coding methods such as convolutional code, turbo code, and LDPC (Low Density Parity Check).

Further, Embodiment 9 is capable of being combined with either Embodiment 1, 3, 5 or 7.

Embodiment 10

Embodiment 10 describes the case where in single-carrier communications, MIMO communications and coding communications is switched based on the reception electric field strength of the entire system and effective reception electric field strength.

Figure 29:
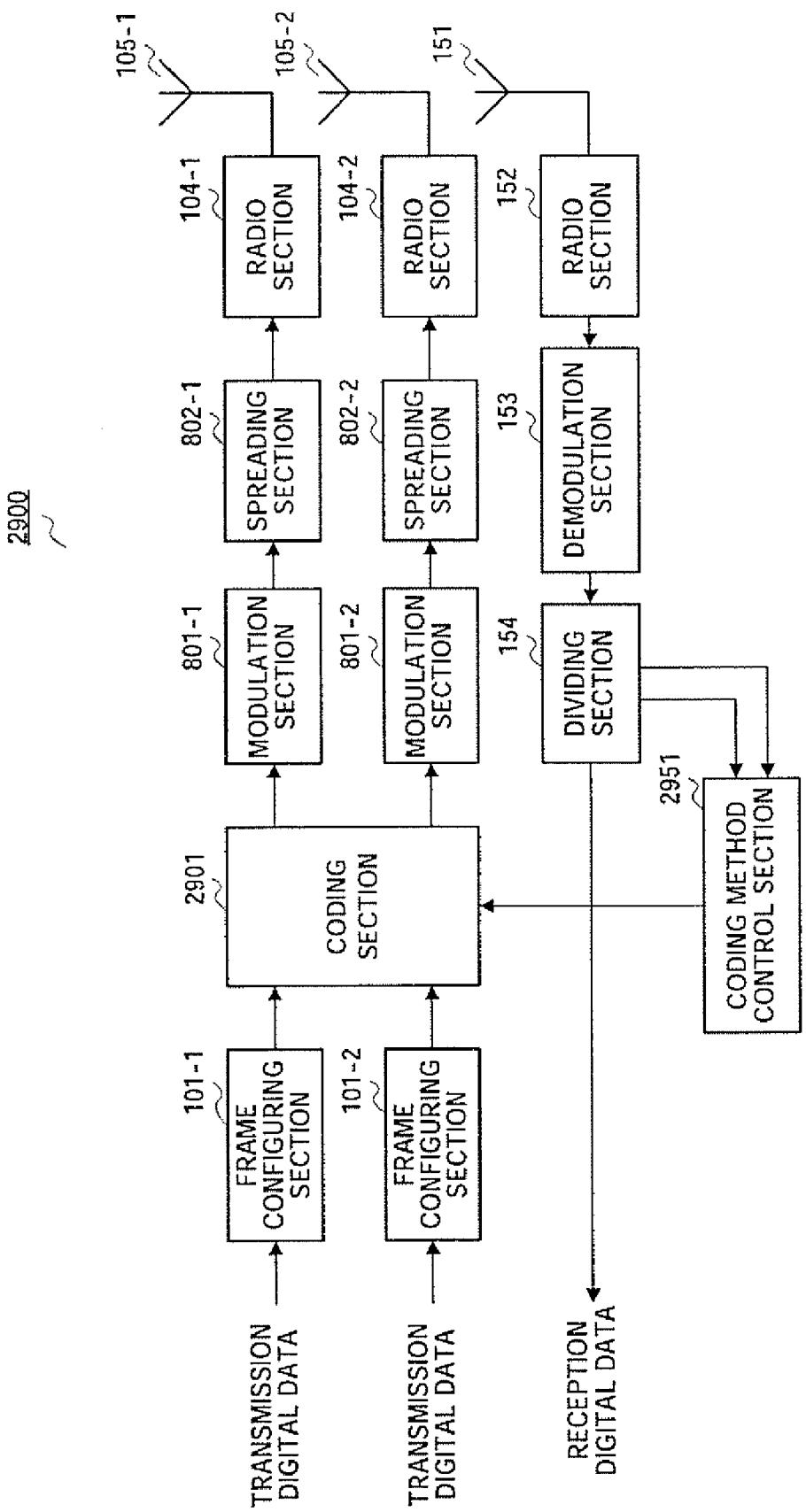
FIG. 29 is a block diagram illustrating a configuration of a base station apparatus according to Embodiment 10.

FIG. 29 is a block diagram illustrating a configuration of a base station apparatus according to Embodiment 10. In addition, in base station apparatus 2900 as shown in FIG. 29, structural sections common to base station apparatus 800 as shown in FIG. 8 are assigned the same reference numerals as in FIG. 8 to omit descriptions.

Base station apparatus 2900 as shown in FIG. 29 has the same configuration as that of base station apparatus 800 as shown in FIG. 8 except that modulation scheme control section 155 is eliminated and that coding method control section 2951 and coding section 2901 are added.

Dividing section 154 outputs the first and second information symbols to coding method control section 2951.

Coding method control section 2951 receives the first and second information symbols, reads the reception electric field strength of the entire system from the first information symbol, and further reads a value of the mean effective reception electric field strength from the second information symbol. Then, based on the values, coding method control section 2951 determines whether to perform MIMO communications or coding communications. More specifically, coding method control section 2951 calculates a difference X between the reception electric field strength of the entire system and the mean effective reception electric field strength, and determines to perform MIMO communications when the difference X is less than a predetermined threshold, while determining to perform coding communications when the difference X is more than or equal to the predetermined threshold. Then, coding method control section 2951 outputs a communication method instruction signal for instructing the determined communication method to coding section 2901.

Each of frame configuring sections 101-1 and 101-2 receives as its input transmission digital data, inserts a channel estimation symbol and guard symbol to the transmission digital data to generate a transmission digital signal, and outputs the signal to coding section 2901.

Coding section 2901 receives the transmission digital signal, performs coding processing when the coding communications is instructed by the communication method instruction signal from coding method control section 2951, and outputs the coded transmission digital signal to modulation sections 801-1 and 801-2. Meanwhile, coding section 2901 receives the transmission digital signal, does not perform the coding processing when MIMO communications is instructed by the communication method instruction signal from coding method control section 2951, and outputs the transmission digital signal to modulation sections 801-1 and 802-2.

The communication terminal apparatus of this Embodiment has the same configuration as that of communication terminal apparatus 900 in FIG. 9 as described in Embodiment 2 except details of the processing in signal processing section 206.

At the time of coding communications, for example, signal processing section 206 in the communication terminal apparatus calculates an inverse matrix of the channel matrix of eq. (2), multiplies the both sides of eq. (2) by the inverse matrix from the left side to decode, and demodulates the transmission signals.

Thus, in the system where multi antennas is used in both transmission and reception, by varying the coding method based on the reception electric field strength of the entire system and the effective reception electric field strength, it is possible to perform the control in consideration of relative relationships between channels, and it is thereby possible to improve the reception quality.

In addition, Embodiment 10 is capable of being combined with either Embodiment 2, 4, 6 or 8.

Each of the above-mentioned Embodiments describes the case where the base station apparatus transmits signals from multi transmission antennas, while the communication terminal apparatus receives the signals using multi received signals. However, the present invention establishes itself also in the inverse case in the base station apparatus and communication terminal apparatus.

Further, each of the above-mentioned Embodiments describes the case where the communication terminal apparatus transmits the first and second information symbols to the base station apparatus, and based on the first and second information symbols, the base station apparatus controls parameters of the modulation scheme or the like. However, the present invention establishes itself also in the case where the communication terminal apparatus determines in the frame configuring sections a modulation scheme or the like based on the first and second information symbols, and transmits information indicative of the determined modulation scheme or the like to the base station apparatus.

Figure 30:
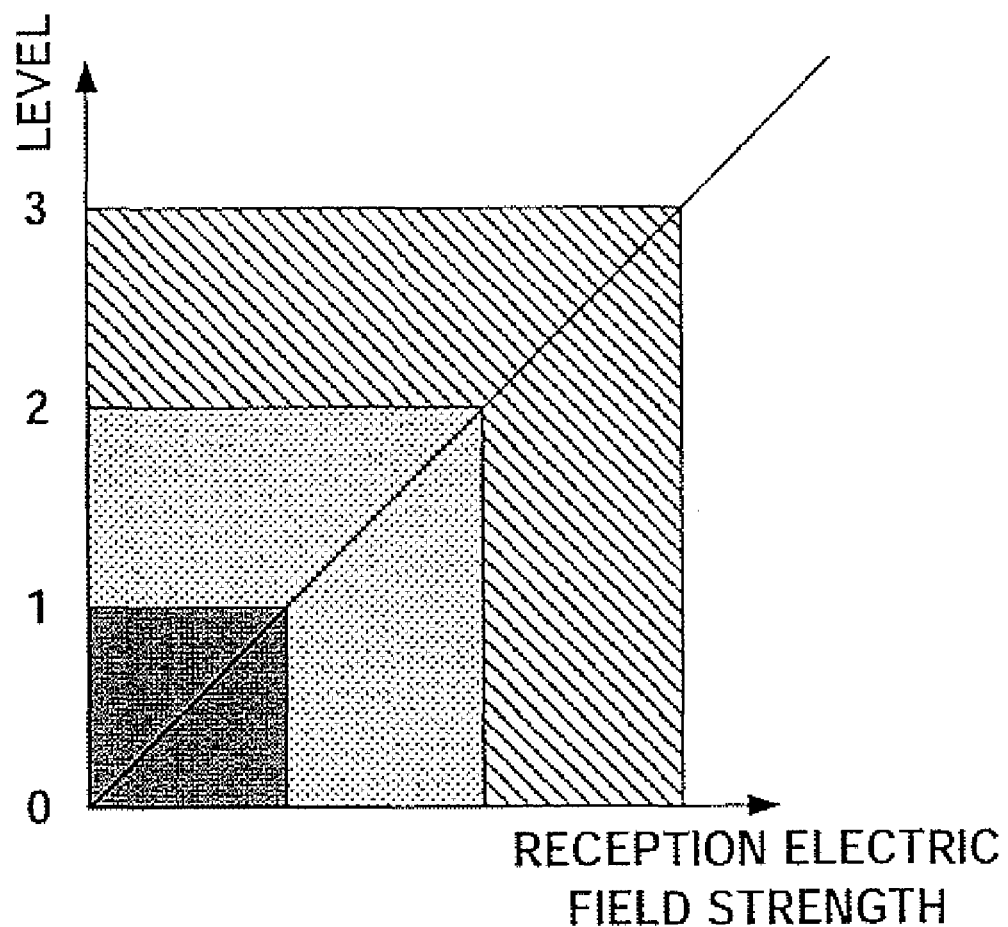
FIG. 30 is a view illustrating the relationship between the reception electric field strength and level.

Furthermore, in the present invention, the communication terminal apparatus may beforehand determine levels of the mean effective reception electric field strength and the reception electric field strength of the entire system, and transmit results of determination to the base station apparatus. For example, as shown in FIG. 30, the level is divided into four stages, "0" to "3", and the communication terminal apparatus determines respective levels of the mean effective reception electric field strength and the reception electric field strength of the entire system, and transmits results of determination to the base station apparatus as the first and second information symbols. The base station apparatus controls parameters of the modulation scheme or the like, based on the levels of the mean effective reception electric field strength and the reception electric field strength of the entire system. It is thereby possible to reduce the number of bits of the first and second information symbols, thus enabling improved transmission efficiency. For example, when the level is provided with four stages, each of the first and second information symbols can be represented by two bits.

Moreover, in the present invention, in addition to the effective reception electric field strength, other factors such as status of multi-path, Doppler frequency and interfering power may be considered to determine the modulation scheme or the like.

Embodiment 11

Embodiment 11 describes the case where in multi-carrier communications using MIMO, transmission antennas are switched based on the reception electric field strength of the entire system and effective reception electric field strength.

Figure 31:
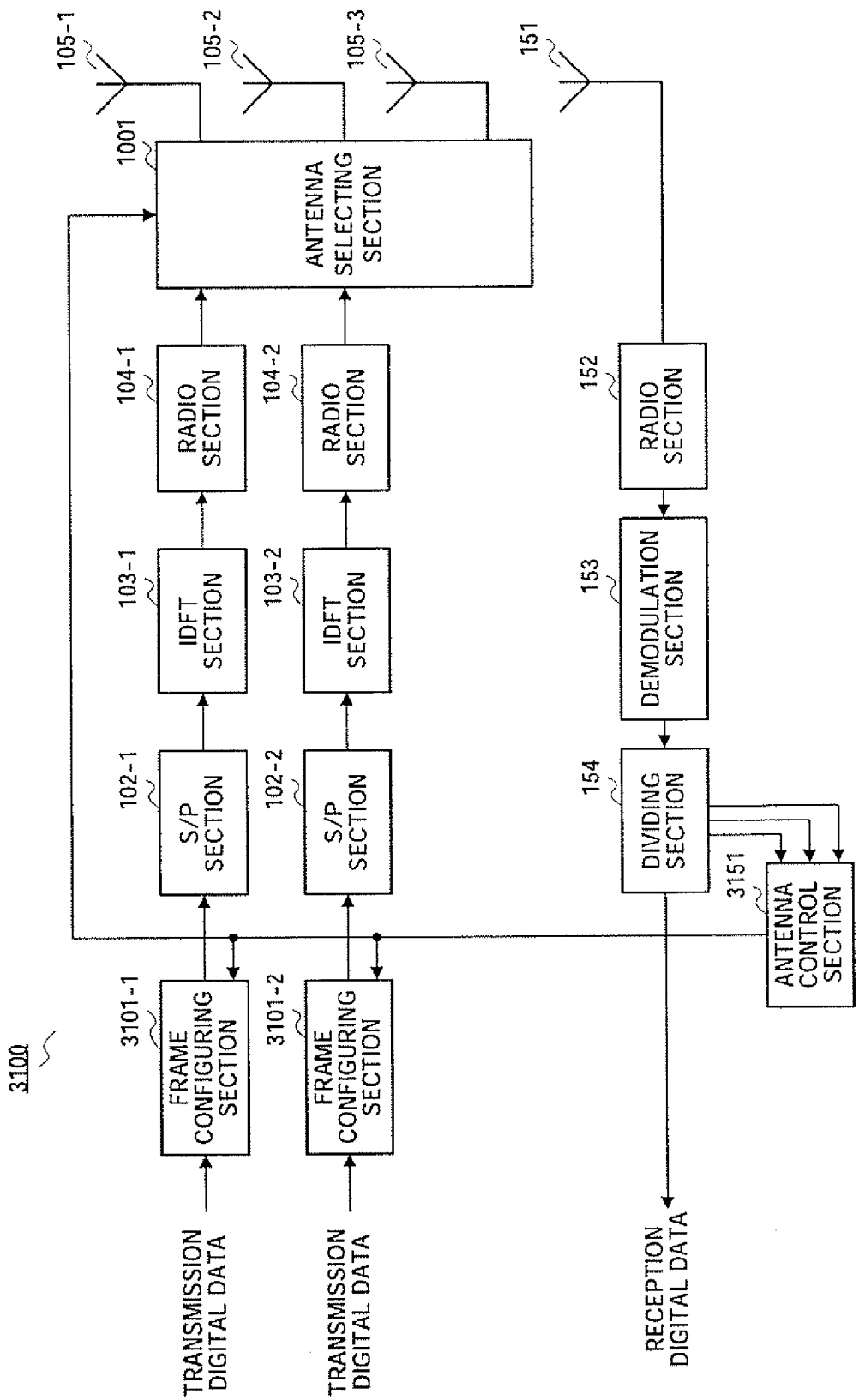
FIG. 31 is a block diagram illustrating a configuration of a base station apparatus according to Embodiment 11.

FIG. 31 is a block diagram illustrating a configuration of a base station apparatus according to Embodiment 11. In addition, in base station apparatus 3100 as shown in FIG. 31, structural sections common to base station apparatus 1000 as shown in FIG. 10 are assigned the same reference numerals as in FIG. 10 to omit descriptions.

Base station apparatus 3100 as shown in FIG. 31 has the same configuration as that of base station apparatus 1000 as shown in FIG. 10 except that functions of antenna control section 3151 and frame configuring sections 3101-1 and 3101-2 differ from those of antenna control section 1051 and frame configuring sections 101-1 and 101-2.

Each of frame configuring sections 3101-1 and 3101-2 generates an antenna identification information symbol indicating a transmission antenna determined by antenna control section 3151, receives transmission digital data, inserts a channel estimation symbol, guard symbol and antenna identification information symbol to the transmission digital data to generate a transmission digital signal, and outputs the signal to S/P section 102-1 or 102-2, respectively.

Figure 32:
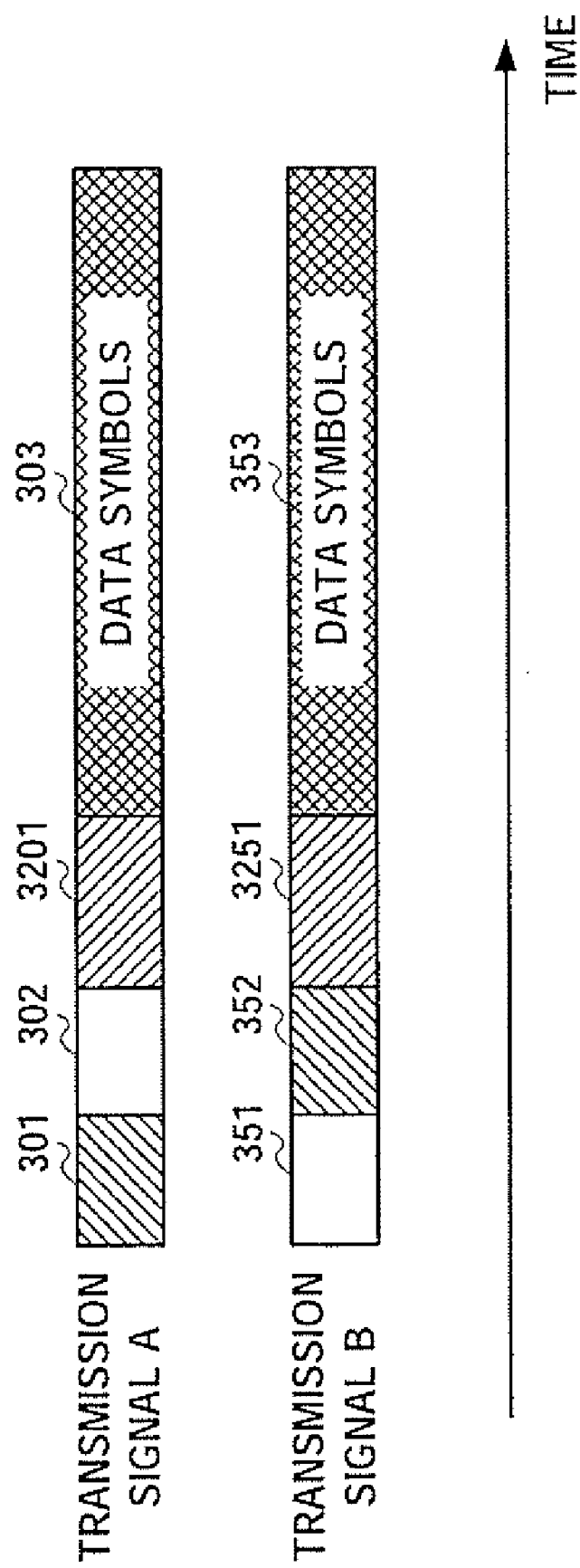
FIG. 32 is a view illustrating an example of frame structures of transmission signals of the base station apparatus according to Embodiment 11.

FIG. 32 is a view illustrating an example of frame structures of transmission signals of base station apparatus 3100. In FIG. 3, in the transmission signal A, a frame is comprised of channel estimation symbol 301, guard symbol 302, antenna identification information symbol 3201 and data symbols 303 in this order. Meanwhile, in the transmission signal B, a frame is comprised of guard symbol 351, channel estimation symbol 352, antenna identification information symbol 3251 and data symbols 353 in this order.

The communication terminal apparatus of this Embodiment has the same configuration as that of communication terminal apparatus 200 in FIG. 2 as described in Embodiment 1 except that details of the processing in data dividing sections 204-1 and 204-2 and frame configuring section 254 are different. Data dividing sections 204-1 and 204-2 output the antenna identification information to frame configuring section 254, and frame configuring section 254 inserts the first and second information symbols and antenna identification symbol to the transmission digital data, and generates a transmission digital signal.

Figure 33:
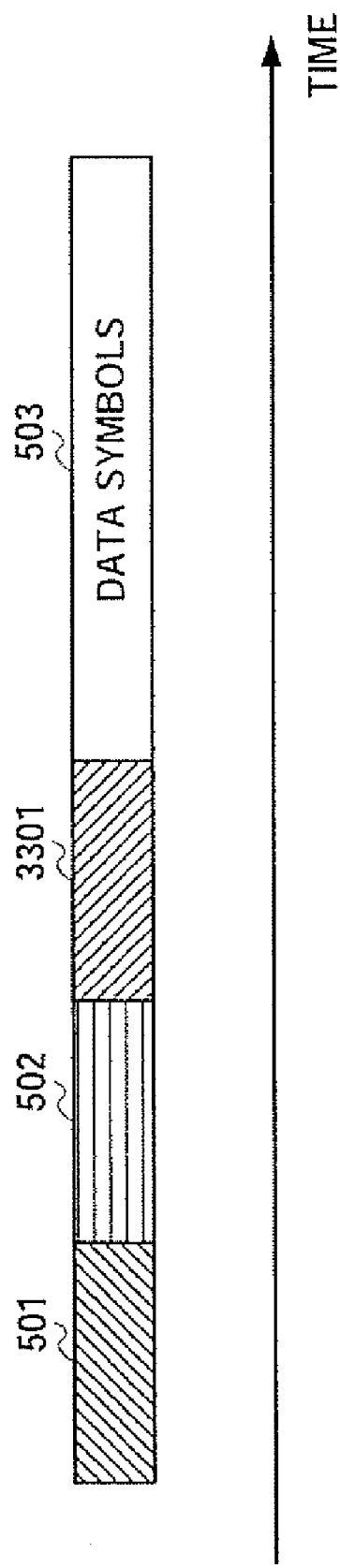
FIG. 33 is a view illustrating an example of a frame structure of a transmission signal of a communication terminal apparatus according to Embodiment 11.

FIG. 33 is a view illustrating an example of a frame structure of a transmission signal of the communication terminal apparatus according to this Embodiment. In FIG. 33, in the transmission signal, a frame is comprised of first information symbol 501, second information symbol 502, antenna identification information symbol 3301 and data symbols 503 in this order.

Dividing section 154 in FIG. 31 divides the reception digital signal into data symbols (reception digital data), first information symbol, second information symbol, and antenna identification information symbol, and outputs the first information symbol, second information symbol, and antenna identification information symbol to antenna control section 3151.

Antenna control section 3151 receives the first and second information symbols and antenna identification information symbol, reads the reception electric field strength of the entire system from the first information symbol, and further reads a value of the mean effective reception electric field strength from the second information symbol. Then, antenna control section 3151 determines whether or not to switch transmission antennas based on the values, and determines transmission antennas. More specifically, antenna control section 3151 calculates a difference X between the reception electric field strength of the entire system and the mean effective reception electric field strength, and determines that transmission antennas are not switched when the difference X is less than a predetermined threshold, while determining that the transmission antennas are switched when the difference X is more than or equal to the predetermined threshold. Then, antenna control section 3151 outputs a transmission antenna instruction signal for instructing the determined transmission antennas to antenna selecting section 1001, and frame configuring sections 3101-1 and 3101-2.

At this point, after performing switching of transmission antennas, antenna control section 3151 does not switch transmission antennas until an antenna identification information symbol is input which indicates transmission antennas subsequent to the switching, even when the difference X is more than or equal to the predetermined threshold. By this means, it is possible to prevent useless antenna switching, enabling the communication terminal apparatus to efficiently use the reception electric field strength.

Figure 34:
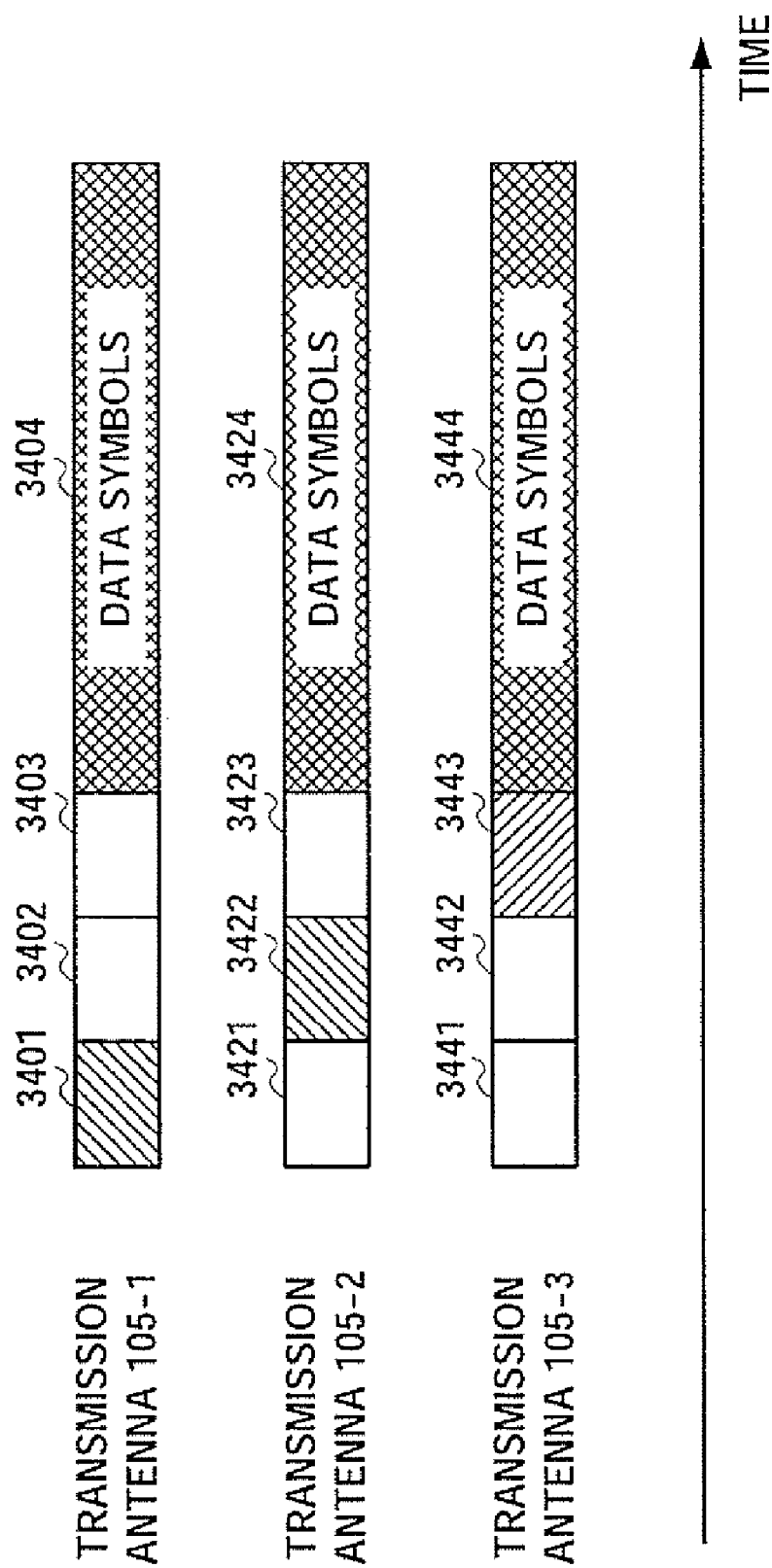
FIG. 34 is a view illustrating an example of frame structures of transmission signals of the base station apparatus according to Embodiment 11.

In addition, in the present invention, frame structures of transmission signals of the base station apparatus are not limited to those as shown in FIG. 32. For example, the base station apparatus may transmit signals in frame structures as shown in FIG. 34. In FIG. 34, a frame of a signal transmitted from transmission antenna 105-1 is comprised of channel estimation symbol 3401, guard symbol 3402, guard symbol 3403, and data symbols 3404 in this order. Further, a frame of a signal transmitted from transmission antenna 105-2 is comprised of guard symbol 3421, channel estimation symbol 3422, guard symbol 3423 and data symbols 3424 in this order. Furthermore, a frame of a signal transmitted from transmission antenna 105-3 is comprised of guard symbol 3441, guard symbol 3442, channel estimation symbol 3443, and data symbols 3444 in this order.

In the case of FIG. 34, there are three groups of transmission antennas, G1(105-1 and 105-2), G2(105-2 and 105-3) and G3(105-3 and 105-1). The communication terminal apparatus receives channel estimation symbols in this order (G1, G2 and G3), calculates mean effective reception electric field strengths and reception electric field strengths of the entire system based on the channel estimation symbols, and sends back signals to the base station apparatus without changing the order. Using the mean effective reception electric field strengths and reception electric field strengths of the entire system, an antenna determining section of the base station apparatus compares values without changing the order in which the signals are transmitted, and is capable of determining a group that maximizes the reception quality of the received signal from among three antenna groups.

Figure 35:
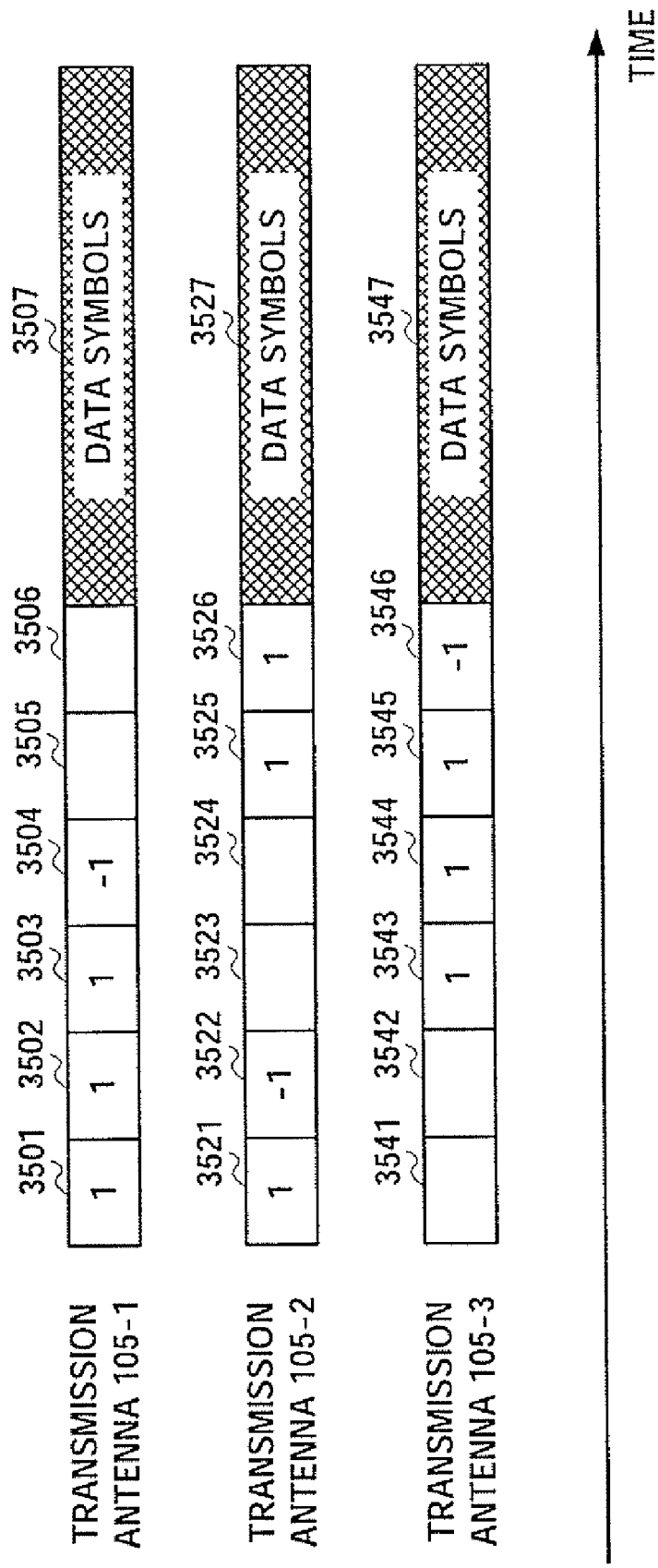
FIG. 35 is a view illustrating another example of frame structures of transmission signals of the base station apparatus according to Embodiment 11.

Further, in the present invention, signals may be transmitted in frame structures as shown in FIG. 35. In FIG. 35, a frame of a signal transmitted from transmission antenna 105-1 is comprised of channel estimation symbols 3501, 3502, 3503 and 3504, guard symbols 3505 and 3506, and data symbols 3507 in this order. Further, a frame of a signal transmitted from transmission antenna 105-2 is comprised of channel estimation symbols 3521 and 3522, guard symbols 3523 and 3524, channel estimation symbols 3525 and 3526, and data symbols 3527 in this order. Furthermore, a frame of a signal transmitted from transmission antenna 105-3 is comprised of guard symbols 3541 and 3542, channel estimation symbols 3543, 3544, 3545 and 3546, and data symbols 3547 in this order. FIG. 35 illustrates a method of transmitting signals orthogonal to one another in two out of three transmission antennas. For example, two signals of (1,1) and (1,−1) satisfy the orthogonal relationship. Orthogonal signals can be divided in a communication terminal apparatus that receives the signals.

In the above-mentioned configuration, channel estimation symbols and guard symbols are only required to enable separation of channels, and to have a structure enabling identification of a group of transmission antennas transmitting modulated signals received in a reception apparatus or identification of the order that the signals are transmitted, and for example, the order thereof may be exchanged.

In this way, by using channel estimation symbols as identification information of transmission signals, it is possible to switch transmission antennas without providing a transmission frame with the antenna identification information and channel number information.

Embodiment 12

Embodiment 12 describes the case where in single-carrier communications using MIMO, transmission antennas are switched based on the reception electric field strength of the entire system and effective reception electric field strength.

Figure 36:
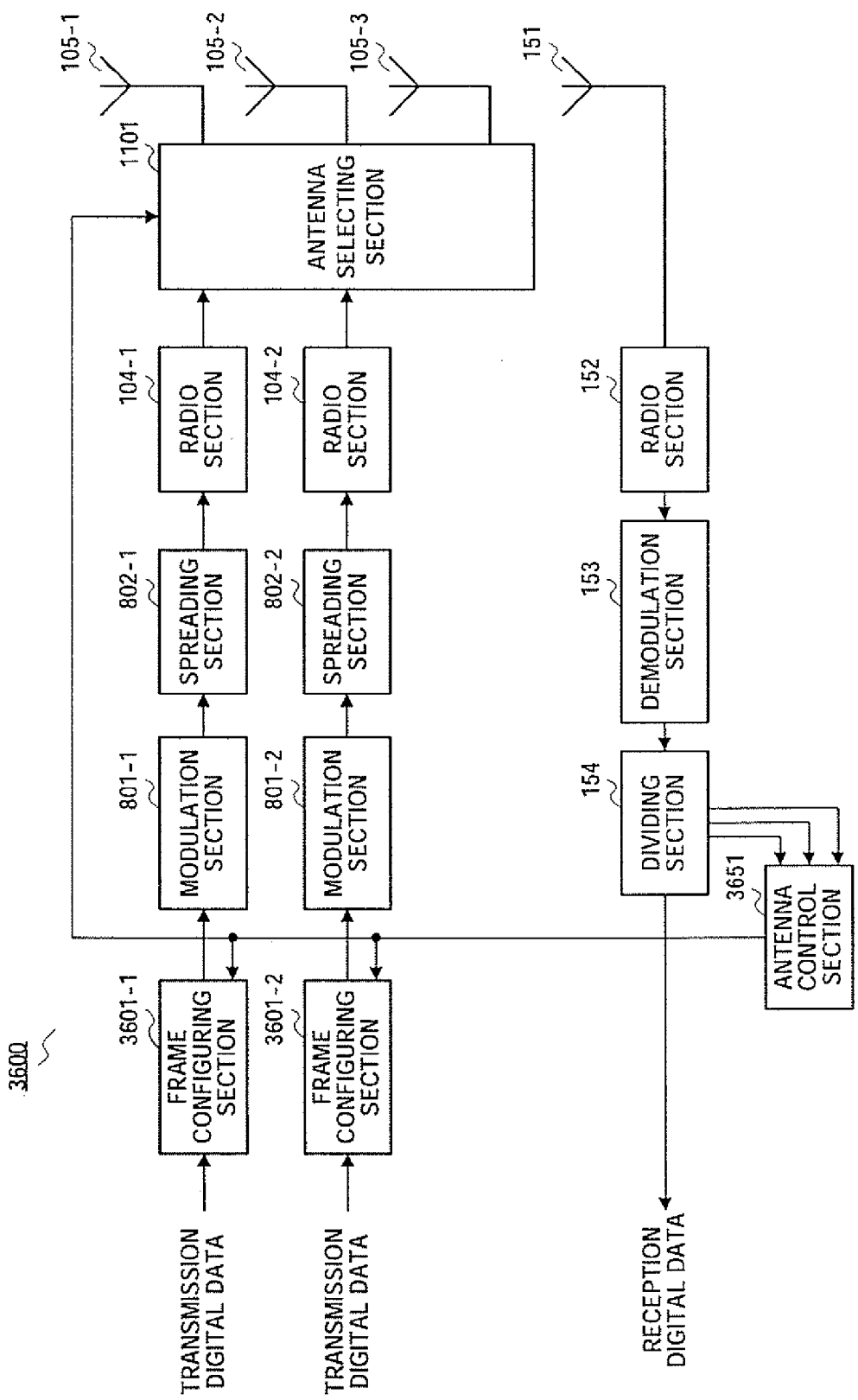
FIG. 36 is a block diagram illustrating a configuration of a base station apparatus according to Embodiment 12.

FIG. 36 is a block diagram illustrating a configuration of a base station apparatus according to Embodiment 12. In addition, in base station apparatus 3600 as shown in FIG. 36, structural sections common to base station apparatus 1100 as shown in FIG. 11 are assigned the same reference numerals as in FIG. 11 to omit descriptions.

Base station apparatus 3600 as shown in FIG. 36 has the same configuration as that of base station apparatus 1100 as shown in FIG. 11 except that functions of antenna control section 3651 and frame configuring sections 3601-1 and 3601-2 differ from those of antenna control section 1151 and frame configuring sections 101-1 and 101-2.

Each of frame configuring sections 3601-1 and 3601-2 generates an antenna identification information symbol indicating a transmission antenna determined by antenna control section 3651, receives transmission digital data, inserts a channel estimation symbol, guard symbol and antenna identification information symbol to the transmission digital data to generate a transmission digital signal, and outputs the signal to modulation section 801-1 or 802-2, respectively.

A communication terminal apparatus of this Embodiment has the same configuration as that of communication terminal apparatus 200 in FIG. 2 as described in Embodiment 1 except that details of the processing in data dividing sections 204-1 and 204-2 and frame configuring section 254. Data dividing sections 204-1 and 204-2 output the antenna identification information to frame configuring section 254, and frame configuring section 254 inserts the first and second information symbols and antenna identification information to the transmission digital data, and generates a transmission digital signal.

Dividing section 154 in FIG. 36 divides the reception digital signal into data symbols (reception digital data), first information symbol, second information symbol, and antenna identification information symbol, and outputs the first information symbol, second information symbol, and antenna identification information symbol to antenna control section 3651.

Antenna control section 3651 receives the first and second information symbols and antenna identification information symbol, reads the reception electric field strength of the entire system from the first information symbol, and further reads a value of the mean effective reception electric field strength from the second information symbol. Then, antenna control section 3651 determines whether or not to switch transmission antennas based on the values, and determines transmission antennas. More specifically, antenna control section 3651 calculates a difference X between the reception electric field strength of the entire system and the mean effective reception electric field strength, and determines that transmission antennas are not switched when the difference X is less than a predetermined threshold, while determining that the transmission antennas are switched when the difference X is more than or equal to the predetermined threshold. Then, antenna control section 3651 outputs a transmission antenna instruction signal for instructing the determined transmission antennas to antenna selecting section 1001, and frame configuring sections 3601-1 and 3601-2.

At this point, after performing switching of transmission antennas, antenna control section 3651 does not switch transmission antennas until an antenna identification information symbol is input which indicates transmission antennas subsequent to the switching, even when the difference X is more than or equal to the predetermined threshold. By this means, it is possible to prevent useless antenna switching, enabling the communication terminal apparatus to efficiently use the reception electric field strength.

Embodiment 13

Embodiment 13 describes the case where in multi-carrier communications, antenna characteristics are varied based on the reception electric field strength of the entire system and effective reception electric field strength.

Figure 37:
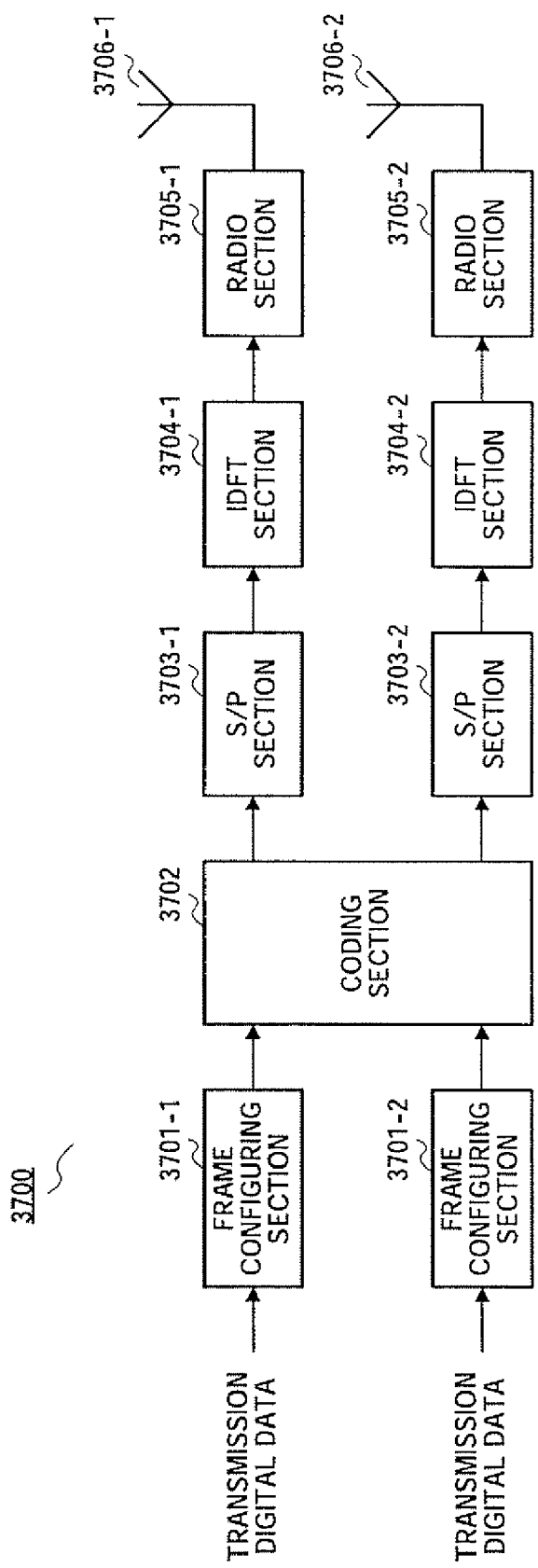
FIG. 37 is a block diagram illustrating a configuration of a transmission apparatus according to Embodiment 13.

FIG. 37 is a block diagram illustrating a configuration of a transmission apparatus according to Embodiment 13. In FIG. 37, transmission apparatus 3700 has frame configuring sections 3701-1 and 3701-2, coding section 3702, S/P sections 3703-1 and 3703-2, IDFT sections 3704-1 and 3704-2, radio sections 3705-1 and 3705-2, and transmission antennas 3706-1 and 3706-2. Each of frame configuring sections 3701-1 and 3701-2 receives as its input transmission digital data, inserts a channel estimation symbol and guard symbol to the transmission digital data to generate a transmission digital signal, and outputs the signal to coding section 3702.

Coding section 3702 receives the transmission digital signal to perform coding processing, and outputs the coded transmission digital signal to S/P section 3703-1 or 3703-2.

S/P section 3703-1 receives the coded transmission digital signal, performs serial/parallel transform processing, further performs modulation processing, and outputs parallel modulated signals to IDFT section 3704-1. S/P section 3703-2 receives the transmission digital signal, performs the serial/parallel transform processing, further performs the modulation processing, and outputs parallel modulated signals to IDFT section 3704-2.

IDFT section 3704-1 receives the parallel modulated signals, performs IDFT processing on the signals to generate a transmission baseband signal, and outputs the signal to radio section 3705-1. IDFT section 3704-2 receives the parallel modulated signals, performs the IDFT processing on the signals to generate a transmission baseband signal, and outputs the signal to radio section 3705-2.

Radio section 3705-1 receives the transmission baseband signal, upconverts the baseband signal to generate a transmission signal A, and transmits the radio signal from transmission antenna 3706-1. Radio section 3705-2 receives the transmission baseband signal, upconverts the baseband signal to generate a transmission signal B, and transmits the radio signal from transmission antenna 3706-2.

Described in the foregoing is the explanation of each component of transmission apparatus 3700 according to this Embodiment.

Frame structures of the transmission signals of transmission apparatus 3700 are the same as shown in FIG. 20.

Figure 38:
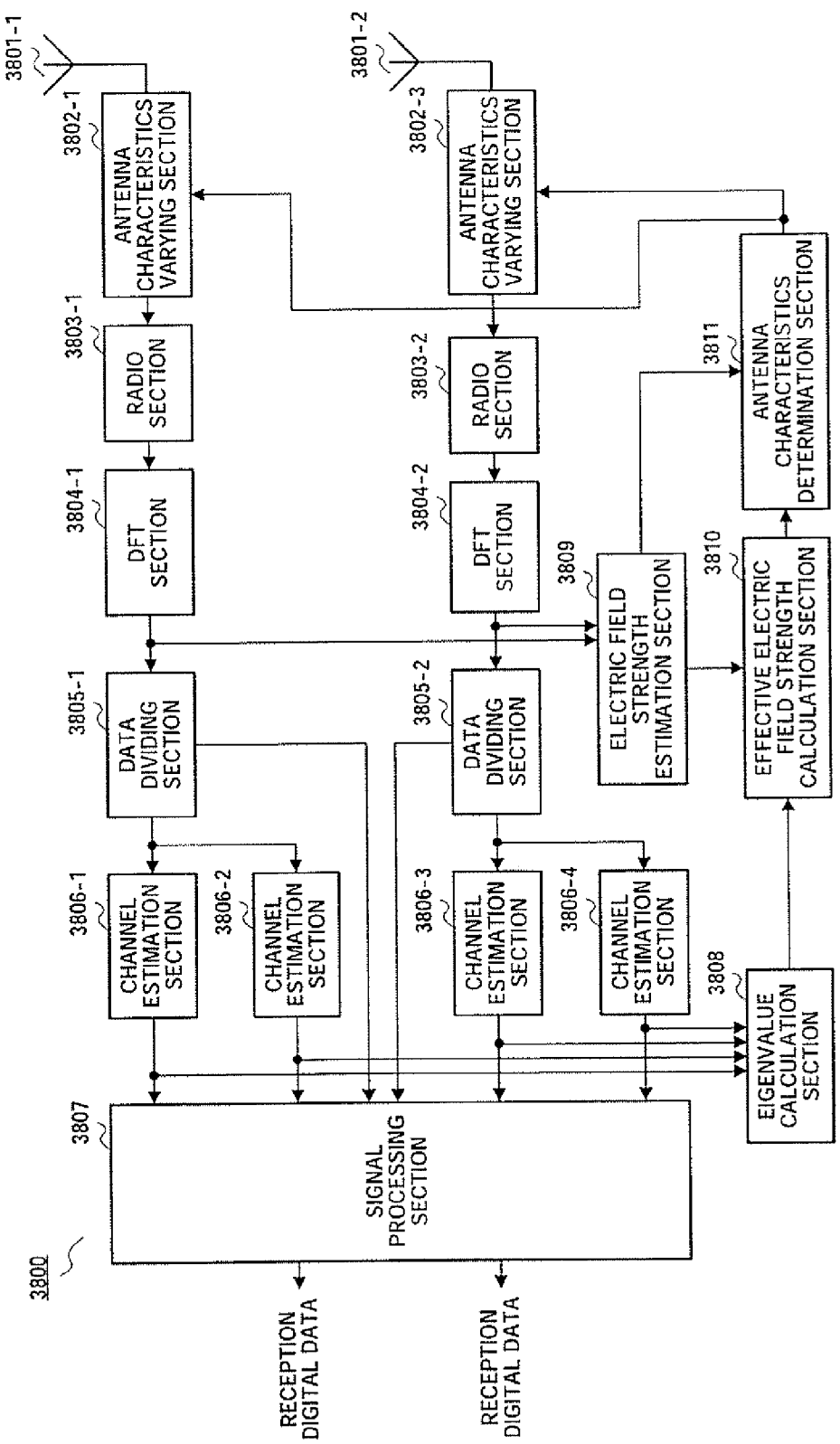
FIG. 38 is a block diagram illustrating a configuration of a reception apparatus according to Embodiment 13.

Next, with reference to a block diagram in FIG. 38, a configuration of a reception apparatus according to this Embodiment will be described below which performs wireless communications with the transmission apparatus as shown in FIG. 37. In FIG. 38, reception apparatus 3800 has reception antennas 3801-1 and 3801-2, antenna characteristic varying sections 3802-1 and 3802-2, radio sections 3803-1 and 3803-2, DFT sections 3804-1 and 3804-2, data dividing sections 3805-1 and 3805-2, channel estimation sections 3806-1 to 3806-4, signal processing section 3807, eigenvalue calculation section 3808, electric field strength estimation section 3809, effective electric field strength calculation section 3810, antenna characteristics determination section 3811.

Antenna characteristics varying section 3802-1 varies antenna characteristics of reception antenna 3801-1 when antenna characteristics determination section 3811 determines that it is required to vary the antenna characteristics, and outputs a signal received in reception antenna 3801-1 to radio section 3803-1. Antenna characteristics varying section 3802-2 varies antenna characteristics of reception antenna 3801-2 when antenna characteristics determination section 3811 determines that it is required to vary the antenna characteristics, and outputs a signal received in reception antenna 3801-2 to radio section 3803-2. In addition, factors considered as the antenna characteristics include the directivity, polarization and an installation place of the antenna.

Radio section 3803-1 receives the received signal, downcoverts the signal to generate a reception baseband signal, and outputs the resultant to DFT section 3804-1. Radio section 3802-2 receives the received signal, downcoverts the signal to generate a reception baseband signal, and outputs the resultant to DFT section 3804-2.

DFT section 3804-1 receives the reception baseband signal, and performs DFT processing on the signal to output to data dividing section 3805-1. DFT section 3804-2 receives the reception baseband signal, and performs the DFT processing on the signal to output to data dividing section 3805-2.

Data dividing section 3805-1 divides the reception baseband signal that is received in reception antenna 3801-1 and subjected to the DFT processing into a channel estimation symbol of the transmission signal A, a channel estimation symbol of the transmission signal B and data symbols, outputs the channel estimation symbol of the transmission signal A to channel estimation section 3806-1, outputs the channel estimation symbol of the transmission signal B to channel estimation section 3806-2, and further outputs the data symbols to signal processing section 3807. Data dividing section 3805-2 divides the reception baseband signal that is received in reception antenna 3801-2 and subjected to the DFT processing into a channel estimation symbol of the transmission signal A, a channel estimation symbol of the transmission signal B and data symbols, outputs the channel estimation symbol of the transmission signal A to channel estimation section 3806-3, outputs the channel estimation symbol of the transmission signal B to channel estimation section 3806-4, and further outputs the data symbols to signal processing section 3807.

Channel estimation section 3806-1 receives the channel estimation symbol of the transmission signal A received in reception antenna 3801-1, performs channel estimation of the transmission signal A, and outputs channel estimation values to signal processing section 3807 and eigenvalue calculation section 3808. Channel estimation section 3806-2 receives the channel estimation symbol of the transmission signal B received in reception antenna 3801-1, performs channel estimation of the transmission signal B, and outputs channel estimation values to signal processing section 3807 and eigenvalue calculation section 3808. Channel estimation section 3806-3 receives the channel estimation symbol of the transmission signal A received in reception antenna 3801-2, performs channel estimation of the transmission signal A, and outputs channel estimation values to signal processing section 3807 and eigenvalue calculation section 3808. Channel estimation section 3806-4 receives the channel estimation symbol of the transmission signal B received in reception antenna 3801-2, performs channel estimation of the transmission signal B, and outputs channel estimation values to signal processing section 3807 and eigenvalue calculation section 3808.

For example, signal processing section 3807 calculates an inverse matrix of the channel matrix of eq. (2), multiplies the both sides of eq. (2) by the inverse matrix from the left side to decode, and demodulates the transmission signals $S_1$ and $S_2$.

At this point, signal processing section 3807 does not need to always use data from both antennas 3801-1 and 3801-2, and is capable of demodulating the transmission signals $S_1$ and $S_2$ using data from either antenna. In addition, in the case of using both data, diversity gain is obtained, and it is thus possible to improve the reception quality.

Eigenvalue calculation section 3808 receives channel estimation values of the transmission signals A and B, calculates an eigenvalue corresponding to a matrix formed of channel estimation values, and outputs the eigenvalue to effective electric field strength calculation section 3810.

Electric field strength estimation section 3809 receives the DFT-processed reception baseband signal, estimates the reception electric field strength that is a square of amplitude of each reception baseband signal, adds estimated reception electric field strengths to average, and obtains the reception electric field strength of the entire system. Electric field strength estimation section 3809 outputs the reception electric field strength corresponding to each reception baseband signal to effective electric field strength calculation section 3810, and outputs the reception electric field strength of the entire system to antenna characteristics determination section 3811.

Effective electric field strength calculation section 3810 receives the reception electric field strength corresponding to each reception baseband signal and the eigenvalue, multiplies each reception electric field strength by the minimum power of the eigenvalue to obtain the effective reception electric field strength, averages effective reception electric field strengths to obtain the mean effective reception electric field strength, and outputs the mean effective reception electric field strength to antenna characteristics determination section 3811.

Antenna characteristics determination section 3811 determines that it is required to vary the antenna characteristics when a difference X, between the mean effective reception electric field strength and the reception electric field strength of the entire system, is more than a predetermined threshold. Then, antenna characteristics determination section 3811 outputs a result of determination to antenna characteristics varying sections 3802-1 and 3802-2.

In addition, antenna characteristics determination section 3811 may determine whether or not to vary the antenna characteristics based on the eigenvalue. For example, in this case, antenna characteristics determination section 3811 calculates the eigenvalue of each subcarrier, adds maximum values of the eigenvalues, further adds minimum values of the eigenvalues, calculates a difference between the added maximum values and minimum values, and in the case where the difference is larger than a predetermined threshold, determines that it is required to vary characteristics of the reception antenna, because in such a case channel correlation is increased, it is difficult to demultiplex the multiplexed signal to demodulate, and reception characteristics thus deteriorate.

Described in the foregoing is the explanation of each component of transmission apparatus 3800 according to this Embodiment.

Thus, in the system where multi antennas is used in both transmission and reception, by varying characteristics of a reception antenna when necessary based on the reception electric field strength of the entire system and the effective reception electric field strength, it is possible to reserve the desired reception quality.

In addition, in the case of applying this Embodiment to single-carrier communications, in transmission apparatus 3700 as shown in FIG. 37, each of S/P sections 3703-1 and 3703-2 is replaced with a modulation section, and each of TDFT sections 3704-1 and 3704-2 is replaced with a spreading section. Further, reception apparatus 3800 as shown in FIG. 38, each of DFT sections 3804-1 and 3804-2 is replaced with a despreading section.

Embodiment 14

Embodiment 14 describes the case where in multi-carrier communications using MIMO, a reception apparatus varies antenna characteristics based on the reception electric field strength of the entire system and effective reception electric field strength.

Figure 39:
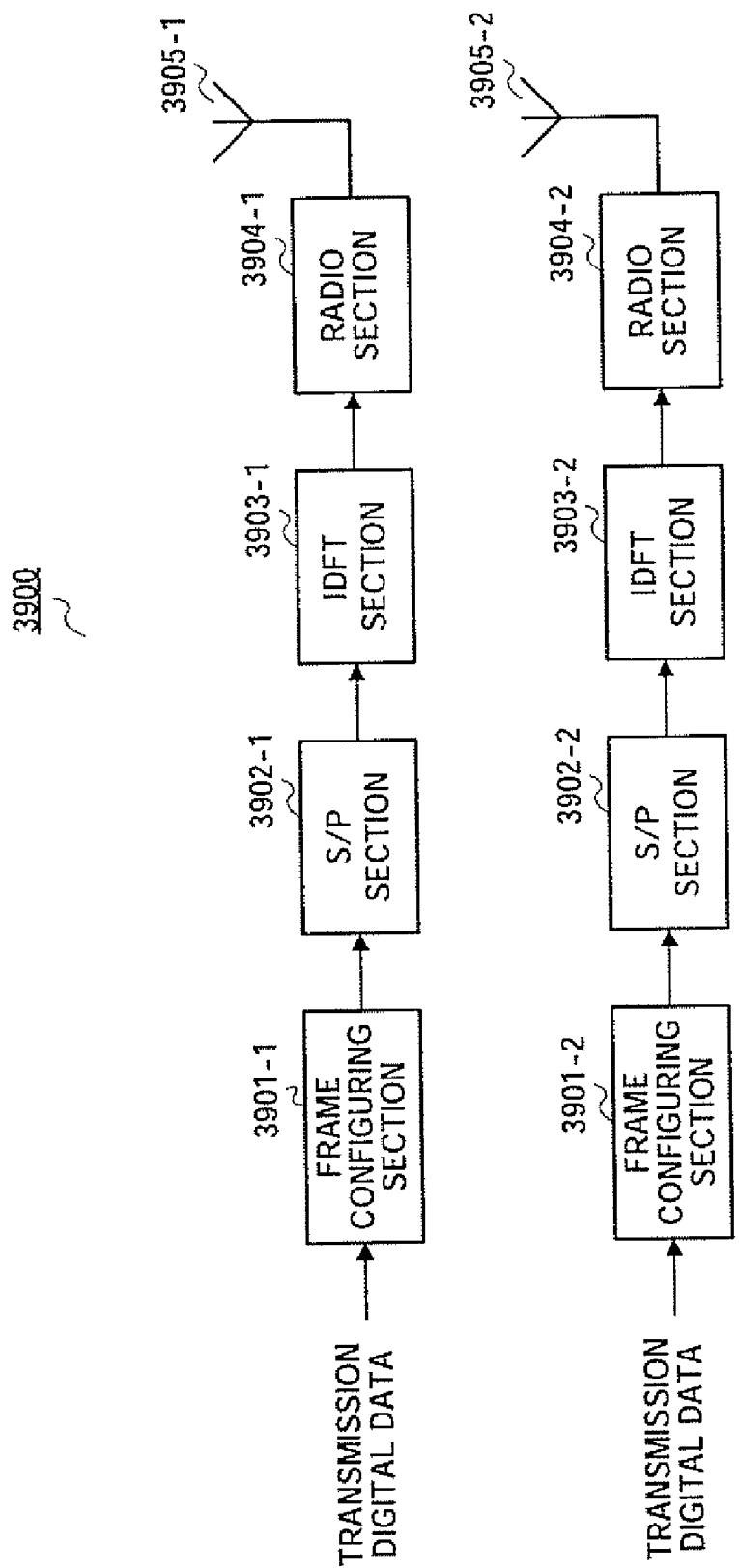
FIG. 39 is a block diagram illustrating a configuration of a transmission apparatus according to Embodiment 14.

FIG. 39 is a block diagram illustrating a configuration of a transmission apparatus according to Embodiment 14. In FIG. 39, transmission apparatus 3900 has frame configuring sections 3901-1 and 3901-2, S/P sections 3902-1 and 3902-2, IDFT sections 3903-1 and 3903-2, radio sections 3904-1 and 3904-2, and transmission antennas 3905-1 and 3905-2.

Each of frame configuring sections 3901-1 and 3901-2 receives as its input transmission digital data, inserts a channel estimation symbol and guard symbol to the transmission digital data to generate a transmission digital signal, and outputs the signal to S/P section 3902-1 or 3902-2, respectively.

S/P section 3902-1 receives the transmission digital signal, performs serial/parallel transform processing, further performs modulation processing, and outputs parallel modulated signals to IDFT section 3903-1. S/P section 3902-2 receives the transmission digital signal, performs the serial/parallel transform processing, further performs the modulation processing, and outputs parallel modulated signals to IDFT section 3903-2.

IDFT section 3903-1 receives the parallel modulated signals, performs IDFT processing on the signals to generate a transmission baseband signal, and outputs the signal to radio section 3904-1. IDFT section 3903-2 receives the parallel modulated signals, performs the IDFT processing on the signals to generate a transmission baseband signal, and outputs the signal to radio section 3904-2.

Radio section 3904-1 receives the transmission baseband signal, upconverts the baseband signal to generate a transmission signal A, and transmits the radio signal from transmission antenna 3905-1. Radio section 3904-2 receives the transmission baseband signal, upconverts the baseband signal to generate a transmission signal B, and transmits the radio signal from transmission antenna 3905-2.

Described in the foregoing is the explanation of each component of transmission apparatus 3900 according to this Embodiment.

Frame structures of the transmission signals of transmission apparatus 3900 are the same as shown in FIG. 3.

Figure 40:
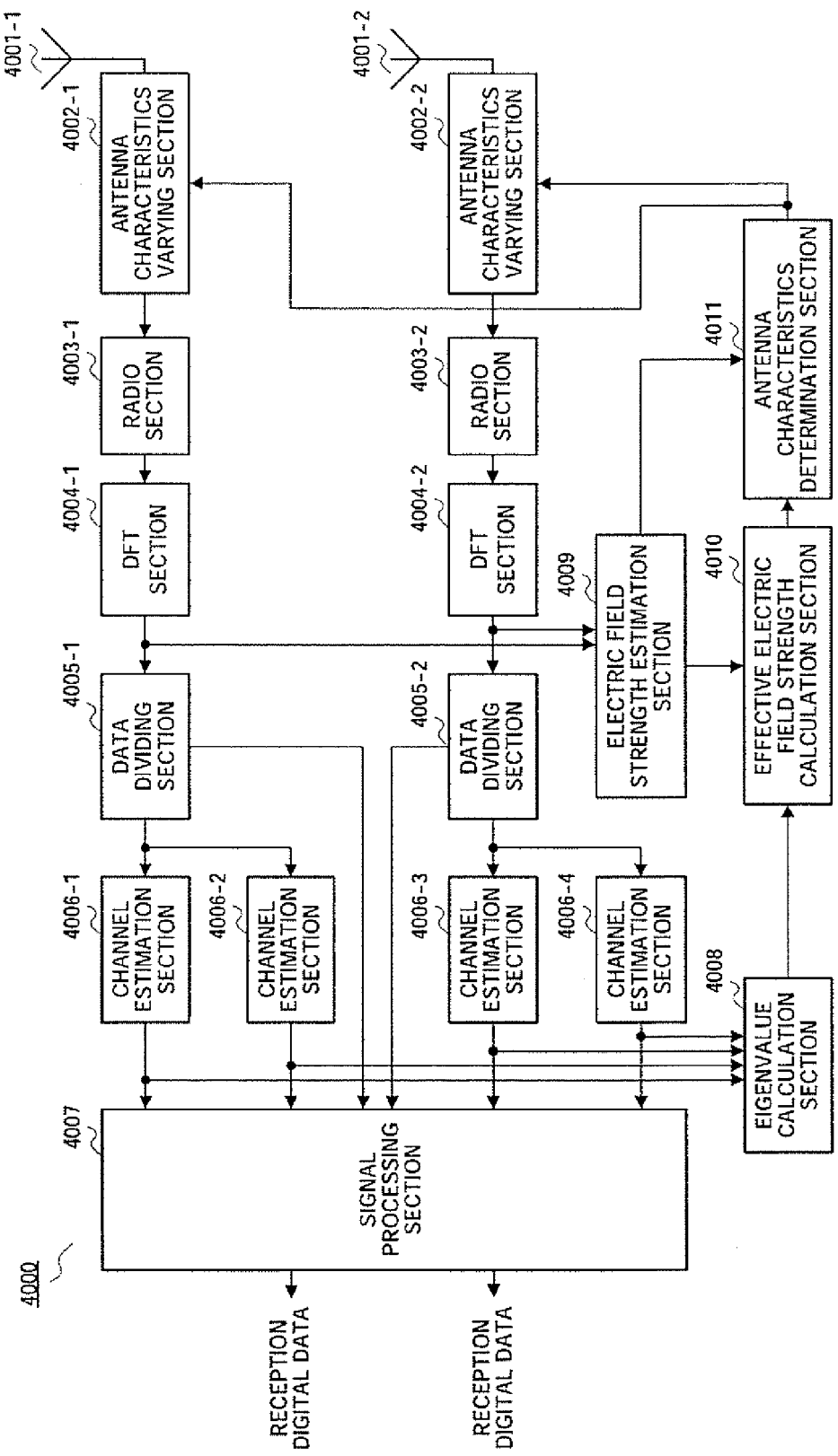
FIG. 40 is a block diagram illustrating a configuration of a reception apparatus according to Embodiment 14.

Next, with reference to a block diagram in FIG. 40, a configuration of a reception apparatus according to this Embodiment will be described below which performs wireless communications with the transmission apparatus as shown in FIG. 39. In FIG. 40, reception apparatus 4000 has reception antennas 4001-1 and 4001-2, antenna characteristic varying sections 4002-1 and 4002-2, radio sections 4003-1 and 4003-2, DFT sections 4004-1 and 4004-2, data dividing sections 4005-1 and 4005-2, channel estimation sections 4006-1 to 4006-4, signal processing section 4007, eigenvalue calculation section 4008, electric field strength estimation section 4009, effective electric field strength calculation section 4010, antenna characteristics determination section 4011.

Antenna characteristics varying section 4002-1 varies antenna characteristics of reception antenna 1001-1 when antenna characteristics determination section 4011 determines that it is required to vary the antenna characteristics, and outputs a signal received in reception antenna 4001-2 to radio section 4003-1. Antenna characteristics varying section 4002-2 varies antenna characteristics of reception antenna 4001-2 when antenna characteristics determination section 4011 determines that it is required to vary the antenna characteristics, and outputs a signal received in reception antenna 4001-2 to radio section 4003-2. Radio section 4003-1 receives the received signal, downcoverts the signal to generate a reception baseband signal, and outputs the resultant to DFT section 4004-1. Radio section 4003-2 receives the received signal, downcoverts the signal to generate a reception baseband signal, and outputs the resultant to DFT section 4004-2.

DFT section 4004-1 receives the reception baseband signal, and performs DFT processing on the signal to output to data dividing section 4005-1. DFT section 4004-2 receives the reception baseband signal, and performs the DFT processing on the signal to output to data dividing section 4005-2.

Data dividing section 4005-1 divides the reception baseband signal that is received in reception antenna 4001-1 and subjected to the DFT processing into a channel estimation symbol of the transmission signal A, a channel estimation symbol of the transmission signal B and data symbols, outputs the channel estimation symbol of the transmission signal A to channel estimation section 4006-1, outputs the channel estimation symbol of the transmission signal B to channel estimation section 4006-2, and further outputs the data symbols to signal processing section 4007. Data dividing section 4005-2 divides the reception baseband signal that is received in reception antenna 4001-2 and subjected to the DFT processing into a channel estimation symbol of the transmission signal A, a channel estimation symbol of the transmission signal B and data symbols, outputs the channel estimation symbol of the transmission signal A to channel estimation section 4006-3, outputs the channel estimation symbol of the transmission signal B to channel estimation section 4006-4, and further outputs the data symbols to signal processing section 4007.

Channel estimation section 4006-1 receives the channel estimation symbol of the transmission signal A received in reception antenna 4001-1, performs channel estimation of the transmission signal A, and outputs channel estimation values to signal processing section 4007 and eigenvalue calculation section 4008. Channel estimation section 4006-2 receives the channel estimation symbol of the transmission signal B received in reception antenna 4001-1, performs channel estimation of the transmission signal B, and outputs channel estimation values to signal processing section 4007 and eigenvalue calculation section 4008. Channel estimation section 4006-3 receives the channel estimation symbol of the transmission signal A received in reception antenna 4001-2, performs channel estimation of the transmission signal A, and outputs channel estimation values to signal processing section 4007 and eigenvalue calculation section 4008. Channel estimation section 4006-4 receives the channel estimation symbol of the transmission signal B received in reception antenna 4001-2, performs channel estimation of the transmission signal B, and outputs channel estimation values to signal processing section 4007 and eigenvalue calculation section 4008.

Signal processing section 4007 demodulates the data symbols using the channel estimation values, and generates reception digital data.

Eigenvalue calculation section 4008 receives channel estimation values of the transmission signals A and B, calculates an eigenvalue corresponding to a matrix formed of channel estimation values, and outputs the eigenvalue to effective electric field strength calculation section 4010.

Electric field strength estimation section 4009 receives the DFT-processed reception baseband signal, estimates the reception electric field strength that is a square of amplitude of each reception baseband signal, adds estimated reception electric field strengths to average, and obtains the reception electric field strength of the entire system. Electric field strength estimation section 4009 outputs the reception electric field strength corresponding to each reception baseband signal to effective electric field strength calculation section 4010, and outputs the reception electric field strength of the entire system to antenna characteristics determination section 4011.

Effective electric field strength calculation section 4010 receives the reception electric field strength corresponding to each reception baseband signal and the eigenvalue, multiplies each reception electric field strength by the minimum power of the eigenvalue to obtain the effective reception electric field strength, averages effective reception electric field strengths to obtain the mean effective reception electric field strength, and outputs the mean effective reception electric field strength to antenna characteristics determination section 4011.

Antenna characteristics determination section 4011 determines that it is required to vary the antenna characteristics when a difference X, between the mean effective reception electric field strength and the reception electric field strength of the entire system, is more than a predetermined threshold. Then, antenna characteristics determination section 4011 outputs a result of determination to antenna characteristics varying sections 4002-1 and 4002-2.

In addition, antenna characteristics determination section 4011 may determine whether or not to vary the antenna characteristics based on the eigenvalue. For example, in this case, antenna characteristics determination section 4011 calculates the eigenvalue of each subcarrier, adds maximum values of the eigenvalues, further adds minimum values of the eigenvalues, calculates a difference between the added maximum values and minimum values, and in the case where the difference is larger than a predetermined threshold, determines that it is required to vary characteristics of the reception antenna, because in such a case channel correlation is increased, it is difficult to demultiplex the multiplexed signal to demodulate, and reception characteristics thus deteriorate.

Described in the foregoing is the explanation of each component of transmission apparatus 4000 according to this Embodiment.

Thus, in the system where multi antennas is used in both transmission and reception, by varying characteristics of a reception antenna when necessary based on the reception electric field strength of the entire system and the effective reception electric field strength, it is possible to reserve the desired reception quality.

In addition, in the case of applying this Embodiment to single-carrier communications, in transmission apparatus 3900 as shown in FIG. 39, each of S/P sections 3902-1 and 3902-2 is replaced with a modulation section, and each of IDFT sections 3903-1 and 3903-2 is replaced with a spreading section. Further, reception apparatus 4000 as shown in FIG. 40, each of DFT sections 4004-1 and 4004-2 is replaced with a despreading section.

Embodiment 15

Embodiment 15 describes the case where in multi-carrier communications, a reception apparatus switches reception antennas based on the reception electric field strength of the entire system and effective reception electric field strength. In addition, a configuration of a transmission apparatus of this Embodiment is the same as that of transmission apparatus 3700 in FIG. 37 as described in Embodiment 13, and descriptions thereof are omitted.

Figure 41:
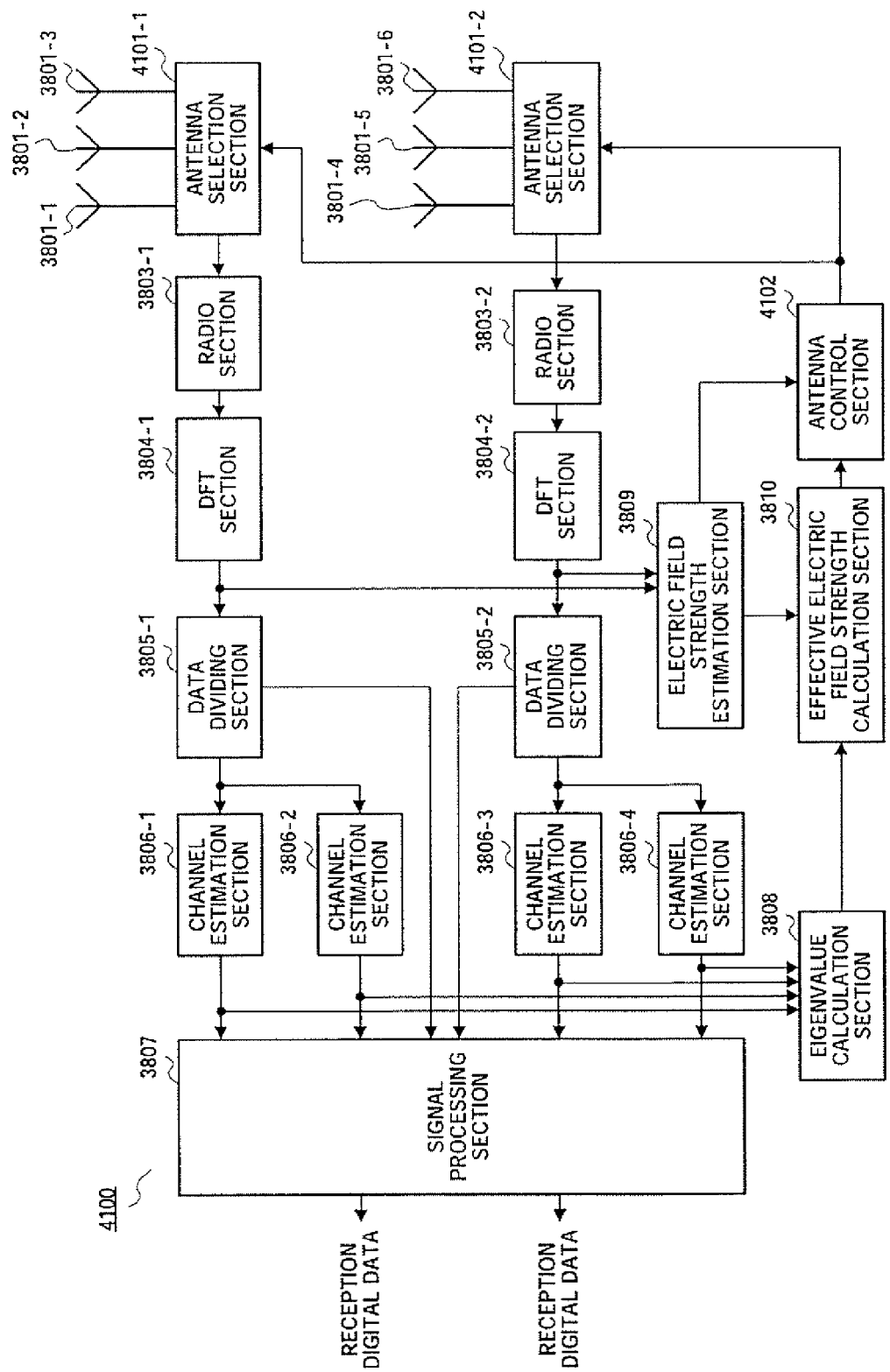
FIG. 41 is a block diagram illustrating a configuration of a reception apparatus according to Embodiment 15.

FIG. 41 is a block diagram illustrating a configuration of a reception apparatus according to Embodiment 15. In addition, in reception apparatus 4100 as shown in FIG. 41, structural sections common to reception apparatus 3800 as shown in FIG. 38 are assigned the same reference numerals as in FIG. 38 to omit descriptions.

Reception apparatus 4100 as shown in FIG. 41 has the same configuration as that of reception apparatus 3800 as shown in FIG. 38 except that antenna characteristics varying sections 3802-1 and 3802-2 and antenna characteristics determination section 3811 are eliminated, and antenna selecting sections 4101-1 and 4101-2 and antenna control section 4102 are added. Further, reception apparatus 4100 as shown in FIG. 41 has multi reception antennas, 3801-1 to 3801-6.

Antenna control section 4102 determines that it is required to switch reception antennas when a difference X, between the mean effective reception electric field strength and the reception electric field strength of the entire system, is more than a predetermined threshold. Then, antenna control section 4102 outputs a result of determination to antenna selecting sections 4101-1 and 4101-2.

In addition, antenna control section 4102 may select a reception antenna based on the eigenvalue. For example, in this case, antenna control section 4102 calculates the eigenvalue of each subcarrier, adds maximum values of the eigenvalues, further adds minimum values of the eigenvalues, calculates a difference between the added maximum values and minimum values, and in the case where the difference is larger than a predetermined threshold, determines that it is required to switch reception antennas, because in such a case channel correlation is increased, it is difficult to demultiplex the multiplexed signal to demodulate, and reception characteristics thus deteriorate.

Antenna selecting section 41011 selects a reception antenna from among reception antennas 3801-1 to 3801-3, and outputs a signal received in the selected antenna to radio section 3803-1. Antenna selecting section 4101-2 selects a reception antenna from among reception antennas 3801-4 to 3801-6, and outputs a signal received in the selected antenna to radio section 3803-2. Further, antenna selecting sections 4101-1 and 4101-2 switch reception antennas when antenna control section 4102 determines that it is required to switch reception antennas. In addition, as a method of switching reception antennas, there is considered a method of selecting a reception antenna with the highest reception electric field strength.

Thus, in the system where multi antennas is used in both transmission and reception, by switching reception antennas when necessary based on the reception electric field strength of the entire system and the effective reception electric field strength, it is possible to reserve the reception quality.

In addition, this Embodiment describes the case where a signal received in a selected reception antenna is downconverted to generate a reception baseband signal, but the present invention is not limited to such a case. It may be possible to downcovert signals received in reception antennas to generate reception baseband signals, respectively, and select a signal from the signals.

Moreover, in the case of applying this Embodiment to single-carrier communications, in transmission apparatus 3700 as shown in FIG. 37, each of S/P sections 3703-1 and 3703-2 is replaced with a modulation section, and each of IDFT sections 3704-1 and 3704-2 is replaced with a spreading section. Further, reception apparatus 4100 as shown in FIG. 41, each of DFT sections 3804-1 and 3804-2 is replaced with a despreading section.

Embodiment 16

Embodiment 16 describes the case where in multi-carrier communications using MIMO, a reception apparatus switches reception antennas based on the reception electric field strength of the entire system and effective reception electric field strength. In addition, a configuration of a transmission apparatus of this Embodiment is the same as that of transmission apparatus 3900 in FIG. 39 as described in Embodiment 14, and descriptions thereof are omitted.

Figure 42:
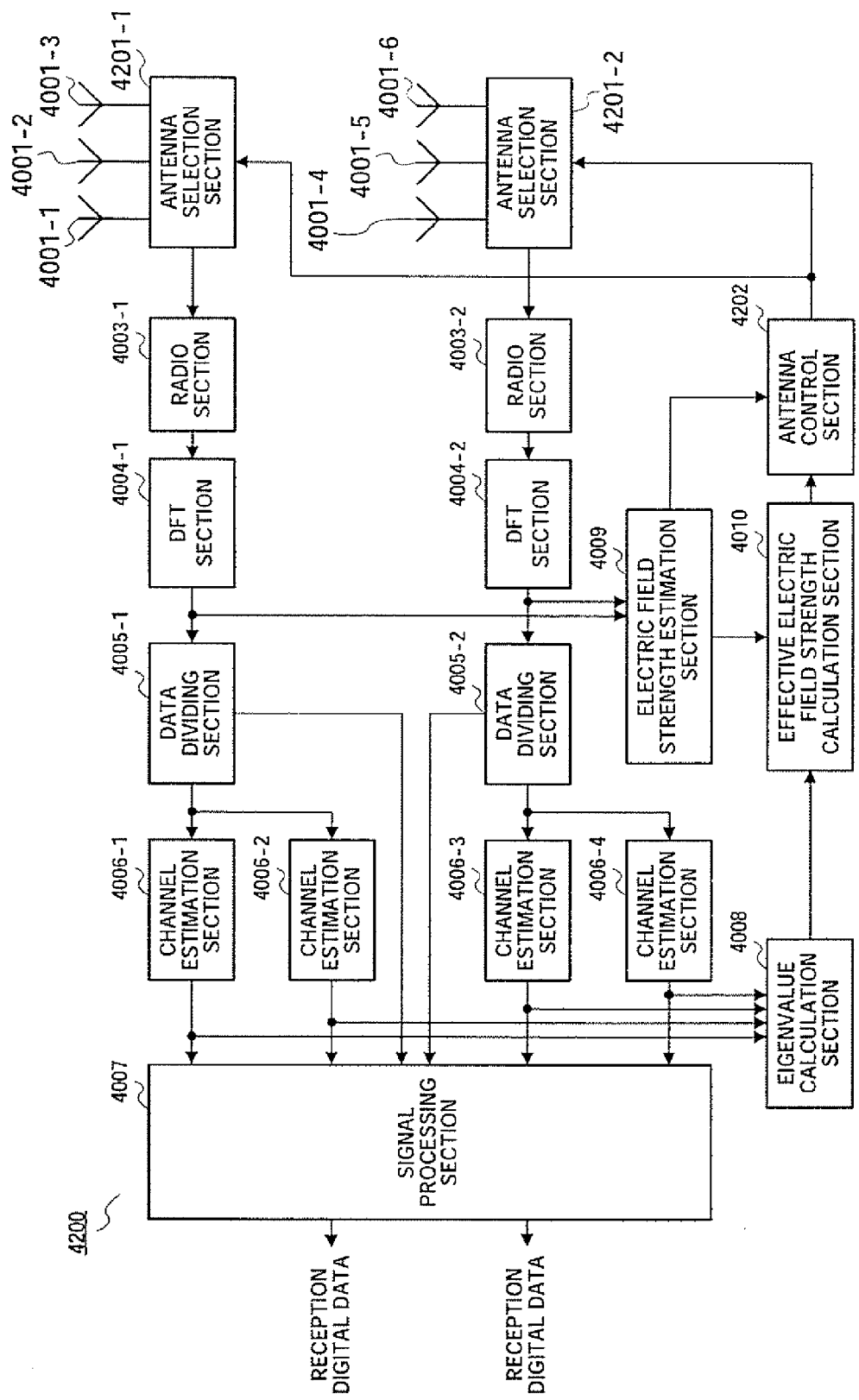
FIG. 42 is a block diagram illustrating a configuration of a reception apparatus according to Embodiment 16.

FIG. 42 is a block diagram illustrating a configuration of a reception apparatus according to Embodiment 16. In addition, in reception apparatus 4200 as shown in FIG. 42, structural sections common to reception apparatus 4000 as shown in FIG. 40 are assigned the same reference numerals as in FIG. 40 to omit descriptions.

Reception apparatus 4200 as shown in FIG. 42 has the same configuration as that of reception apparatus 4000 as shown in FIG. 40 except that antenna characteristics varying sections 4002-1 and 4002-2 and antenna characteristics determination section 4011 are eliminated, and antenna selecting sections 4201-1 and 4201-2 and antenna control section 4202 are added. Further, reception apparatus 4200 as shown in FIG. 42 has multi reception antennas, 4001-1 to 4001-6.

Antenna control section 4202 determines that it is required to switch reception antennas when a difference X, between the mean effective reception electric field strength and the reception electric field strength of the entire system, is more than a predetermined threshold. Then, antenna control section 4202 outputs a result of determination to antenna selecting sections 4201-1 and 4201-2.

In addition, antenna control section 4202 may select a reception antenna based on the eigenvalue. For example, in this case, antenna control section 4202 calculates the eigenvalue of each subcarrier, adds maximum values of the eigenvalues, further adds minimum values of the eigenvalues, calculates a difference between the added maximum values and minimum values, and in the case where the difference is larger than a predetermined threshold, determines that it is required to switch reception antennas, because in such a case channel correlation is increased, it is difficult to demultiplex the multiplexed signal to demodulate, and reception characteristics thus deteriorate.

Antenna selecting section 4201-1 selects a reception antenna from among reception antennas 4001-1 to 4001-3, and outputs a signal received in the selected antenna to radio section 4003-1. Antenna selecting section 4201-2 selects a reception antenna from among reception antennas 4001-4 to 4001-6, and outputs a signal received in the selected antenna to radio section 4003-2. Further, antenna selecting sections 4201-1 and 4201-2 switch reception antennas when antenna control section 4202 determines that it is required to switch reception antennas.

Thus, in the system where multi antennas is used in both transmission and reception, by switching reception antennas when necessary based on the reception electric field strength of the entire system and the effective reception electric field strength, it is possible to reserve the reception quality.

In addition, this Embodiment describes the case where a signal received in a selected reception antenna is downconverted to generate a reception baseband signal, but the present invention is not limited to such a case. It may be possible to downcovert signals received in reception antennas to generate reception baseband signals, respectively, and select a signal from the signals.

Moreover, in the case of applying this Embodiment to single-carrier communications, in transmission apparatus 3900 as shown in FIG. 39, each of S/P sections 3902-1 and 39023-2 is replaced with a modulation section, and each of IDFT sections 3903-1 and 3903-2 is replaced with a spreading section. Further, reception apparatus 4200 as shown in FIG. 42, each of DFT sections 4004-1 and 4004-2 is replaced with a despreading section.

Embodiment 17

Embodiment 17 describes the case where in multi-carrier communications using MIMO, antenna characteristics are varied based on the reception electric field strength of the entire system and effective reception electric field strength. In addition, a configuration of a communication terminal apparatus of this Embodiment is the same as that of communication terminal apparatus 200 in FIG. 2 as described in Embodiment 1, and descriptions thereof are omitted.

Figure 43:
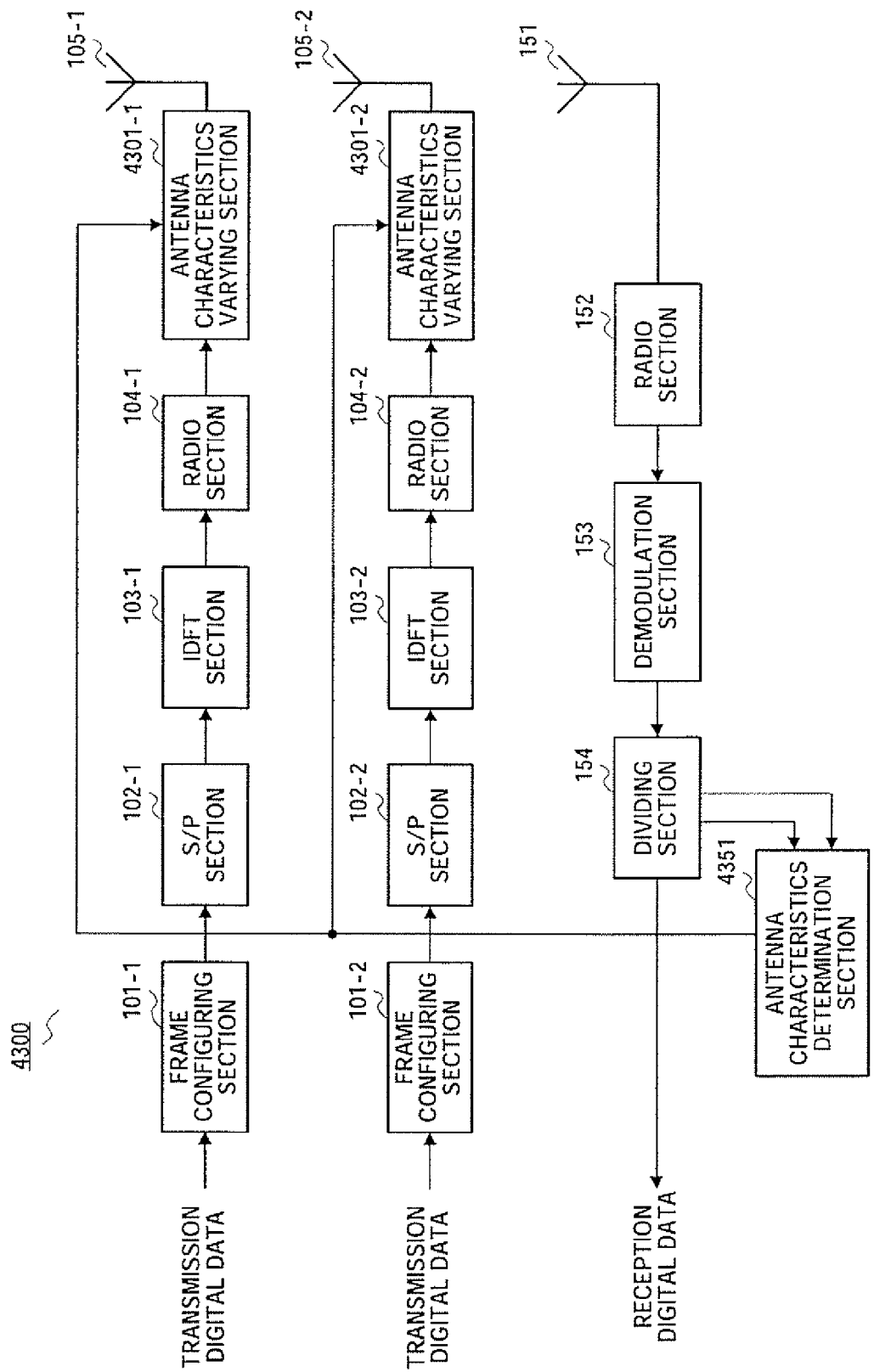
FIG. 43 is a block diagram illustrating a configuration of a base station apparatus according to Embodiment 17.

FIG. 43 is a block diagram illustrating a configuration of a base station apparatus according to Embodiment 17. In addition, in base station apparatus 4300 as shown in FIG. 43, structural sections common to base station apparatus 100 as shown in FIG. 1 are assigned the same reference numerals as in FIG. 1 to omit descriptions.

Base station apparatus 4300 as shown in FIG. 43 has the same configuration as that of base station apparatus 100 as shown in FIG. 1 except that modulation scheme control section 155 is eliminated and that antenna characteristics determination section 4351 and antenna characteristics varying sections 4301-1 and 4301-2 are added.

Dividing section 154 outputs the first and second information symbols to antenna characteristics determination section 4351.

Antenna characteristics determination section 4351 receives the first and second information symbols, reads the reception electric field strength of the entire system from the first information symbol, and further reads a value of the mean effective reception electric field strength from the second information symbol. Then, antenna characteristics determination section 4351 determines that it is required to vary antenna characteristics when the difference X, between the mean effective reception electric field strength and the reception electric field strength of the entire system, is more than a predetermined threshold. Then, antenna characteristics determination section 4351 outputs a control signal (hereinafter, referred to as an "antenna characteristics determination signal") indicating a result of determination to antenna characteristics varying sections 4301-1 and 4301-2.

Radio section 104-1 receives the transmission baseband signal, upconverts the baseband signal to generate a transmission signal A, and outputs the signal to antenna characteristics varying section 4301-1. Radio section 104-2 receives the transmission baseband signal, upconverts the baseband signal to generate a transmission signal B, and outputs the signal to antenna characteristics varying section 4301-2.

Antenna characteristics varying section 4301-1 varies antenna characteristics of transmission antenna 105-1 when antenna characteristics determination section 4351 determines that it is required to vary antenna characteristics, and transmits the transmission signal A by wireless communications. Antenna characteristics varying section 4301-2 varies antenna characteristics of transmission antenna 105-2 when antenna characteristics determination section 4351 determines that it is required to vary antenna characteristics, and transmits the transmission signal B by wireless communications.

Thus, in the system where multi antennas is used in both transmission and reception, by varying antenna characteristics based on the reception electric field strength of the entire system and the effective reception electric field strength, it is possible to perform the control in consideration of relative relationships between channels, and it is thereby possible to improve the reception quality.

Embodiment 18

Embodiment 18 describes the case where in single-carrier communications using MIMO, antenna characteristics are varied based on the reception electric field strength of the entire system and effective reception electric field strength. In addition, a configuration of a communication terminal apparatus of this Embodiment is the same as that of communication terminal apparatus 900 in FIG. 9 as described in Embodiment 2, and descriptions thereof are omitted.

Figure 44:
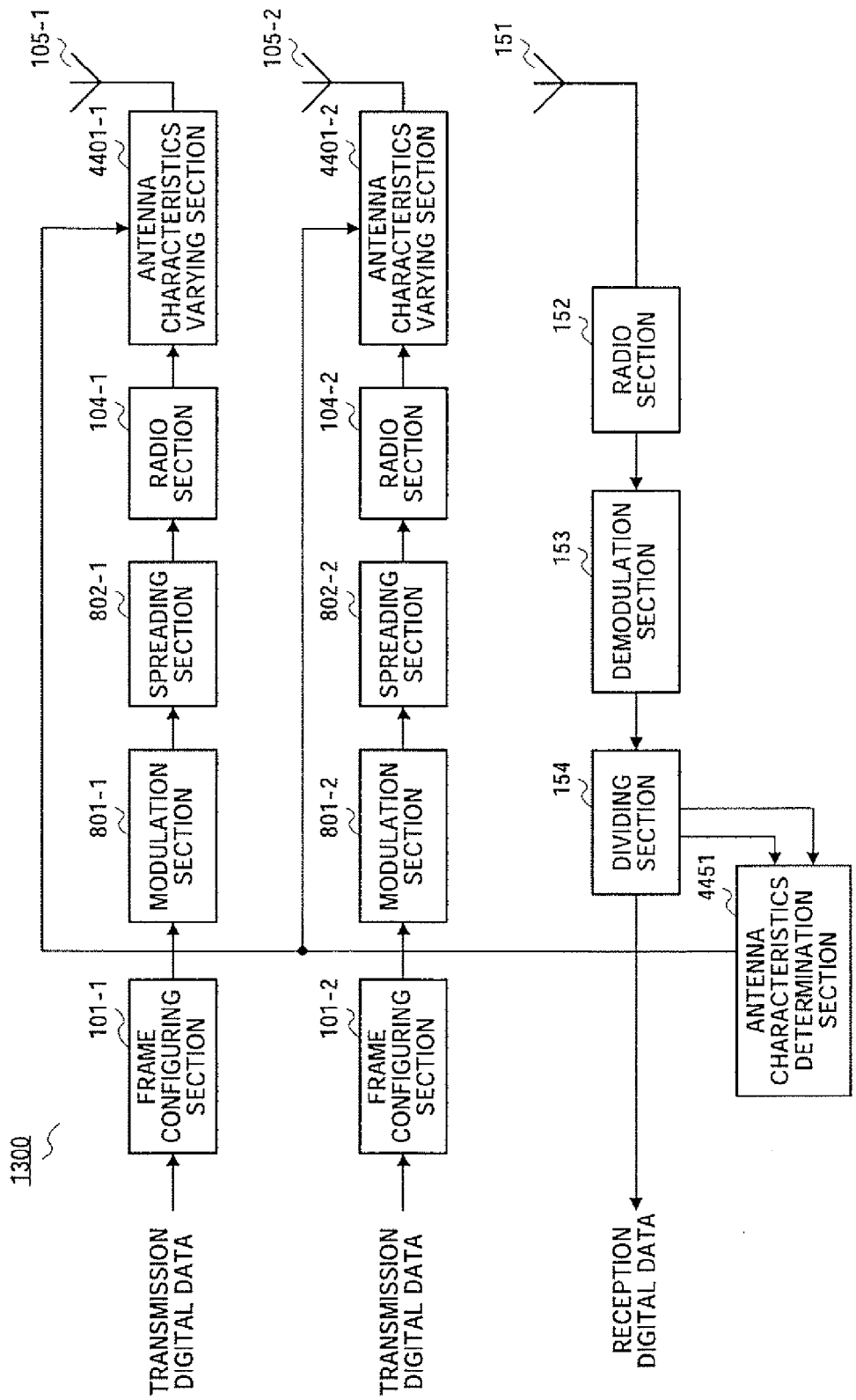
FIG. 44 is a block diagram illustrating a configuration of a base station apparatus according to Embodiment 18.

FIG. 44 is a block diagram illustrating a configuration of a base station apparatus according to Embodiment 18. In addition, in base station apparatus 4400 as shown in FIG. 44, structural sections common to base station apparatus 800 as shown in FIG. 8 are assigned the same reference numerals as in FIG. 8 to omit descriptions.

Base station apparatus 4400 as shown in FIG. 44 has the same configuration as that of base station apparatus 800 as shown in FIG. 8 except that modulation scheme control section 155 is eliminated and that antenna characteristics determination section 4451 and antenna characteristics varying sections 4401-1 and 4401-2 are added.

Dividing section 154 outputs the first and second information symbols to antenna characteristics determination section 4451.

Antenna characteristics determination section 4451 receives the first and second information symbols, reads the reception electric field strength of the entire system from the first information symbol, and further reads a value of the mean effective reception electric field strength from the second information symbol. Then, antenna characteristics determination section 4451 determines that it is required to vary antenna characteristics when the difference X, between the mean effective reception electric field strength and the reception electric field strength of the entire system, is more than a predetermined threshold. Then, antenna characteristics determination section 4451 outputs an antenna characteristics determination signal indicating a result of determination to antenna characteristics varying sections 4401-1 and 4401-2.

Radio section 104-1 receives the transmission baseband signal, upconverts the baseband signal to generate a transmission signal A, and outputs the signal to antenna characteristics varying section 4401-1. Radio section 104-2 receives the transmission baseband signal, upconverts the baseband signal to generate a transmission signal B, and outputs the signal to antenna characteristics varying section 4401-2.

Antenna characteristics varying section 4401-1 varies antenna characteristics of transmission antenna 105-1 when antenna characteristics determination section 4451 determines that it is required to vary antenna characteristics, and transmits the transmission signal A by wireless communications. Antenna characteristics varying section 4401-2 varies antenna characteristics of transmission antenna 105-2 when antenna characteristics determination section 4451 determines that it is required to vary antenna characteristics, and transmits the transmission signal B by wireless communications.

Thus, in the system where multi antennas is used in both transmission and reception, by varying antenna characteristics based on the reception electric field strength of the entire system and the effective reception electric field strength, it is possible to perform the control in consideration of relative relationships between channels, and it is thereby possible to improve the reception quality.

In the present invention, there are no limitations in the number of transmission antennas and the number of reception antennas. Further, in each of the above-mentioned Embodiments, the OFDM system is used as an example of the multi-carrier system, while the CDMA system is used as an example of the single-carrier system. However, the present invention is not limited to those examples.

Further, while in each of the above-mentioned Embodiments the reception electric field strength is estimated from a DCT-processed signal or despread signal, the present invention is not limited in the method of estimating the reception electric field strength.

Furthermore, in each of the above-mentioned Embodiments, parameters are controlled based on the difference between the mean effective reception electric field strength and the reception electric field strength of the entire system. However, the present invention is not limited thereto, and for example, parameters may be controlled by a method using the mean effective reception electric field strength, for example, a ratio between the mean effective reception electric field strength and the reception electric field strength of the entire system.

Moreover, in the present invention, parameters may be controlled based on a difference in eigenvalue corresponding to the difference between the mean effective reception electric field strength and the reception electric field strength of the entire system.

As is apparent from the foregoing, according to the preset invention, in the system where multi antennas is used in both transmission and reception, by controlling parameters of a modulation scheme or the like based on the reception electric field strength of the entire system and the effective reception electric field strength, it is possible to control the parameters of the modulation scheme or the like in consideration of relative relationships between channels, and it is thereby possible to improve the reception quality.

This application is based on the Japanese Patent Applications No. 2002-342019 filed on Nov. 26, 2002, No. 2002-354102 filed on Dec. 5, 2002, No. 2003-8002 filed on Jan. 16, 2003, No. 2003-41133 filed on Feb. 19, 2003 and No. 2003-78037 filed on Mar. 20, 2003, entire contents of which are expressly incorporated by reference herein.

INDUSTRIAL APPLICABILITY

The present invention is suitable for use in a communication apparatus in a system where wireless communications is carried out using multi antennas in both transmission and reception.

The invention claimed is:

1. A communication method of a base station apparatus having a plurality of transmission antennas, the base station apparatus transmitting to and receiving from a communication terminal apparatus having a plurality of antennas, a plurality of modulated signals, over a shared common frequency band, the method comprising:
receiving a feedback signal transmitted from the communication terminal apparatus by using the plurality of transmission antennas, the feedback signal including channel quality information and antenna identification information, the channel quality information indicating a downlink channel quality, the antenna identification information specifying at least one of the plurality of transmission antennas of the base station apparatus;
calculating a difference between a reception electric field strength of the entire system and a mean effective reception electric field strength, and determining that transmission antennas are not switched when the difference is less than a predetermined threshold, while determining that the transmission antennas are switched when the difference is more than or equal to the predetermined threshold;
selecting at least one transmission antenna, from among the plurality of transmission antennas of the base station apparatus, based on the feedback signal;
transmitting a signal toward the communication terminal apparatus by using the selected at least one transmission antenna, the transmitted signal including antenna identification information specifying the selected at least one transmission antenna of the base station apparatus; and
after selecting the at least one transmission antenna, not switching transmission antennas until the base station apparatus receives antenna identification information from the communication terminal;
wherein the base station transmits signals in a frame structure comprised of a channel estimation symbol, a guard symbol and data symbols in one of plurality of different orders, the communication terminal calculates the mean effective reception electric field strength and reception electric field strength of the entire system based on the channel estimation symbols and sends the signals back to the base station without changing the order, and
the base station compares values without changing the order in which the signals are transmitted and determines a group that maximizes the reception quality of the received signal from among the plurality of different orders.

2. The communication method according to claim 1, wherein the signal transmitted from the base station apparatus comprises an antenna identification information symbol specifying the selected at least one transmission antenna, a channel estimation symbol and a data symbol.

3. The communication method according to claim 1, wherein the feedback signal is used at the base station apparatus to select a combination of transmission antennas from among the plurality of transmission antennas for transmission of the signal.

4. The communication method according to claim 3, wherein the signal transmitted from the base station apparatus comprises an antenna identification information symbol specifying the selected combination of transmission antennas, a channel estimation symbol and a data symbol.

5. The communication method according to claim 1, further comprising dividing the channel quality information from the antenna identification information in the received feedback signal, and the selecting uses the divided channel quality information and the antenna identification information.

6. A communication method of a base station apparatus having a plurality of transmission antennas, the base station apparatus transmitting to and receiving from a communication terminal apparatus having a plurality of antennas, a plurality of modulated signals, over a shared common frequency band, the method comprising:
receiving a feedback signal transmitted from the communication terminal apparatus by using the plurality of transmission antennas, the feedback signal including channel quality information and antenna identification information, the channel quality information indicating a downlink channel quality, the antenna identification information specifying at least one of the plurality of transmission antennas of the base station apparatus;
calculating a difference between a reception electric field strength of the entire system and a mean effective reception electric field strength, and determining that transmission antennas are not switched when the difference is less than a predetermined threshold, while determining that the transmission antennas are switched when the difference is more than or equal to the predetermined threshold;
selecting at least one transmission antenna, from among the plurality of transmission antennas of the base station apparatus, based on the feedback signal;
transmitting a signal toward the communication terminal apparatus by using the selected at least one transmission antenna, the transmitted signal including antenna identification information specifying the selected at least one transmission antenna of the base station apparatus; and
dividing the channel quality information from the antenna identification information in the received feedback signal, and selecting the divided channel quality and the antenna identification information, wherein the selecting comprises determining a difference between the divided channel quality information;
wherein the base station transmits signals in a frame structure comprised of a channel estimation symbol, a guard symbol and data symbols in one of plurality of different orders, the communication terminal calculates the mean effective reception electric field strength and reception electric field strength of the entire system based on the channel estimation symbols and sends the signal back to the base station without changing the order, and
the base station compares values without changing the order in which the signals are transmitted and determines a group that maximizes the reception quality of the received signal from among the plurality of different orders.

7. The communication method according to claim 6, wherein the signal transmitted from the base station apparatus comprises an antenna identification information symbol specifying the selected at least one transmission antenna, a channel estimation symbol and a data symbol.

8. The communication method according to claim 6, wherein the feedback signal is used at the base station apparatus to select a combination of transmission antennas from among the plurality of transmission antennas for transmission of the signal.

9. The communication method according to claim 8, wherein the signal transmitted from the base station apparatus comprises an antenna identification information symbol specifying the selected combination of transmission antennas, a channel estimation symbol and a data symbol.

10. A communication method of a base station apparatus having a plurality of transmission antennas, the base station apparatus transmitting to and receiving from a communication terminal apparatus having a plurality of antennas, a plurality of modulated signals, over a shared common frequency band, the method comprising:

receiving a feedback signal transmitted from the communication terminal apparatus by using the plurality of transmission antennas, the feedback signal including channel quality information and antenna identification information, the channel quality information indicating a downlink channel quality, the antenna identification information specifying at least one of the plurality of transmission antennas of the base station apparatus;

calculating a difference between a reception electric field strength of the entire system and a mean effective reception electric field strength, and determining that transmission antennas are not switched when the difference is less than a predetermined threshold, while determining that the transmission antennas are switched when the difference is more than or equal to the predetermined threshold;

selecting at least one transmission antenna, from among the plurality of transmission antennas of the base station apparatus, based on the feedback signal;

transmitting a signal toward the communication terminal apparatus by using the selected at least one transmission antenna, the transmitted signal including antenna identification information specifying the selected at least one transmission antenna of the base station apparatus; and the selecting comprises determining whether or not to switch from present transmission antennas based upon a difference between two different measures of reception electric field strength, wherein the base station transmits signals in a frame structure comprised of a channel estimation symbol, a guard symbol and data symbols in one of plurality of different orders, the communication terminal calculates the mean effective reception electric field strength and reception electric field strength of the entire system based on the channel estimation symbols and sends the signals back to the base station without changing the order, and the base station compares values without changing the order in which the signals are transmitted and determines a group that maximizes the reception quality of the received signal from among the plurality of different orders.

11. The communication method according to claim 10, wherein the two different measures of reception electric field strength comprise a reception electric field strength of the entire system and a mean effective reception electric field strength.

12. The communication method according to claim 10, the feedback signal including a first information symbol related to a value of a reception electric field strength of the entire system, and a second information symbol related to a value of a mean effective reception electric field strength.

13. The communication method according to claim 12, the selecting comprising calculating a difference between the first information symbol and the second information symbol, and switching from present transmission antennas when the difference is greater than a predetermined threshold.

14. The communication method according to claim 12, wherein the reception electric field strength of the entire system and the mean effective reception electric field strength are determined based upon channel estimation symbols of the transmission antennas.

15. The communication method according to claim 10, wherein, upon the selecting determining that the present transmission antennas should be switched, the antennas are not switched until an antenna identification information symbol, identifying the selected transmission antennas, is received.

* * * * *